US012533428B2

(12) United States Patent
Cheung et al.

(10) Patent No.: US 12,533,428 B2
(45) Date of Patent: Jan. 27, 2026

(54) MULTIMODAL FLUORINE-CY3/5/7-DOTA-HAPTEN COMPOSITIONS, DIAGNOSTICS, FLUORESCENCE GUIDED SURGERY AND RADIOIMMUNOTHERAPY

(71) Applicants: Memorial Sloan Kettering Cancer Center, New York, NY (US); Cornell University, Ithaca, NY (US)

(72) Inventors: Nai-Kong V. Cheung, New York, NY (US); Steven M. Larson, New York, NY (US); Sarah Cheal, New York, NY (US); Richard Ting, Ithaca, NY (US); Hari Krishna Kommidi, Ithaca, NY (US); Feifei An, Ithaca, NY (US); Brian Santich, New York, NY (US)

(73) Assignees: Memorial Sloan Kettering Cancer Center, New York, NY (US); Cornell University, Ithaca, NY (US)

( * ) Notice: Subject to any disclaimer, the term of this patent is extended or adjusted under 35 U.S.C. 154(b) by 882 days.

(21) Appl. No.: 17/790,079

(22) PCT Filed: Dec. 30, 2020

(86) PCT No.: PCT/US2020/067414
§ 371 (c)(1),
(2) Date: Jun. 29, 2022

(87) PCT Pub. No.: WO2021/138390
PCT Pub. Date: Jul. 8, 2021

(65) Prior Publication Data
US 2023/0095707 A1 Mar. 30, 2023

Related U.S. Application Data

(60) Provisional application No. 62/956,045, filed on Dec. 31, 2019.

(51) Int. Cl.
*A61K 51/04* (2006.01)
*A61K 49/00* (2006.01)
*C07K 16/30* (2006.01)
*C07K 16/32* (2006.01)
*C07K 16/44* (2006.01)
*A61K 39/00* (2006.01)

(52) U.S. Cl.
CPC ...... *A61K 51/0482* (2013.01); *A61K 49/0032* (2013.01); *A61K 49/0054* (2013.01); *A61K 51/0495* (2013.01); *A61K 51/0497* (2013.01); *C07K 16/3084* (2013.01); *C07K 16/32* (2013.01); *C07K 16/44* (2013.01); *A61K 2039/505* (2013.01); *C07K 2317/31* (2013.01)

(58) Field of Classification Search
CPC ............ A61K 49/0054; A61K 49/0032; A61K 51/0482
See application file for complete search history.

(56) References Cited

U.S. PATENT DOCUMENTS

2015/0258217 A1  9/2015  Caravan et al.

FOREIGN PATENT DOCUMENTS

CA   2900363 A1   9/2014

OTHER PUBLICATIONS

International Search Report and Written Opinion on PCT/US2020/067414, dated Mar. 26, 2021 (8 pages).
Punia et al. "Protein Biomaterials for Theranostic Applications" Mol. Syst. Des. Eng., Nov. 1-3, 2019. vol. 4, pp. 1074-1094, especially: p. 20, Figure 15A, (M)-DOTA-Bn.
Wei et al. "ImmunoPET: Concept, Design, and Applications". Chem. Rev. 2020, vol. 120(8), pp. 3787-3851, entire document.

*Primary Examiner* — James W Rogers
(74) *Attorney, Agent, or Firm* — Foley & Lardner LLP

(57) ABSTRACT

The present disclosure provides compositions and methods for the detection, and treatment of cancer. Specifically, the compositions of the present technology include multimodal fluorine-cyanine-DOTA-hapten compositions that may be complexed with a radioisotope (e.g., $^{175}$Lu). Also disclosed herein are methods of using the fluorine-cyanine-DOTA-hapten compositions of the present technology in diagnostic imaging as well as pretargeted radioimmunotherapy.

20 Claims, 24 Drawing Sheets

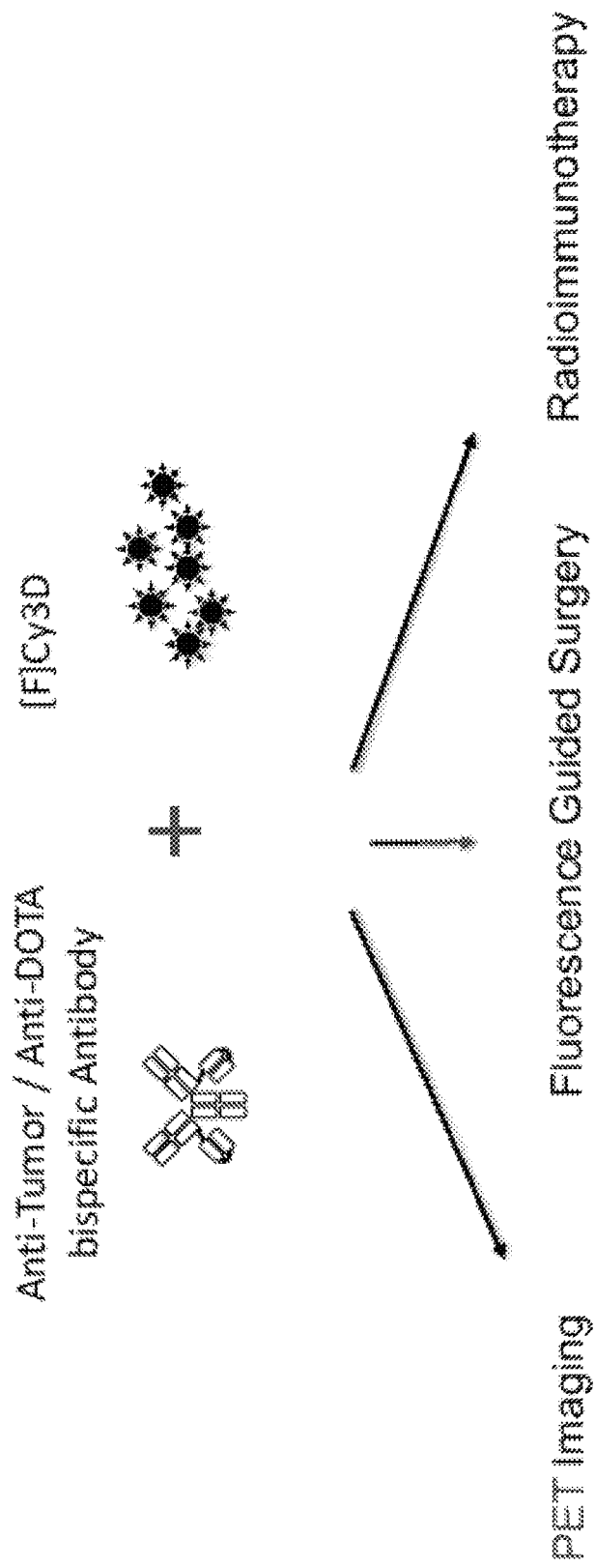
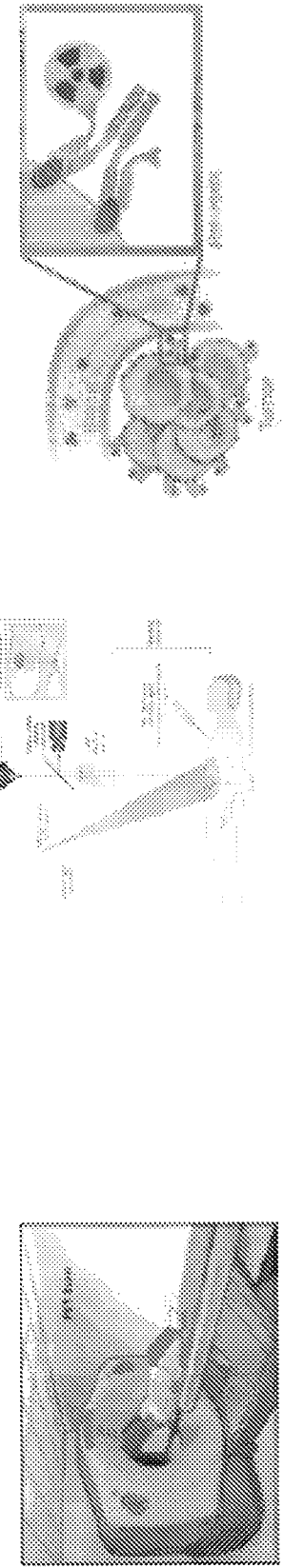
FIG. 1

¹H NMR spectrum (DMSO-d6, 500 MHz, 21 °C) of Compound 4

¹³C NMR spectrum (DMSO-d6, 125 MHz, 21 °C) of Compound 4

$^1$H NMR spectrum (DMSO-d6, 500 MHz, 21 °C) of Compound 5

$^{19}$F NMR (DMSO-d6, 470 MHz, 21 °C, TFA reference) of Compound

¹H NMR spectrum (DMSO-d6, 500 MHz, 21 °C) of Compound 6

¹⁹F NMR (DMSO-d6, 470 MHz, 21 °C, TFA reference) of Compound 6

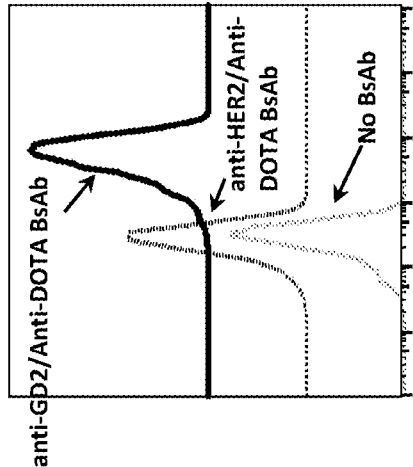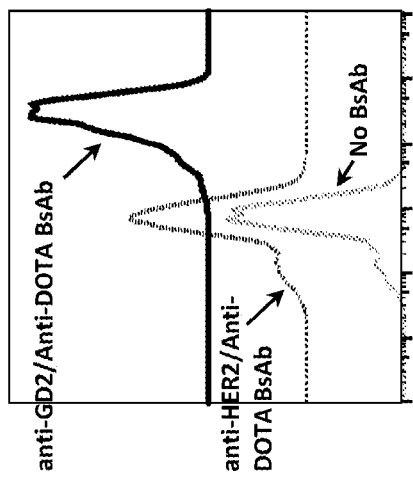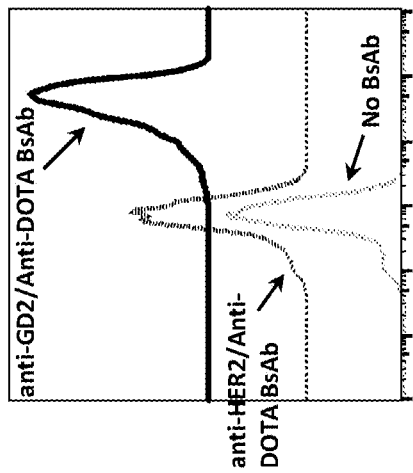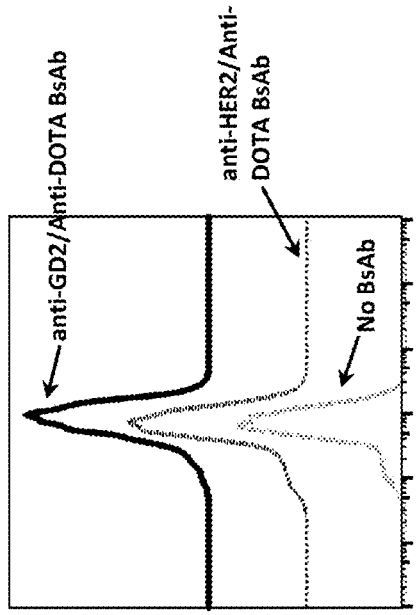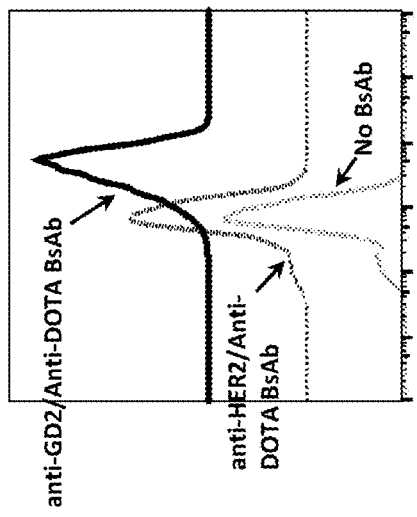
FIG. 11

| | Buffer | $\lambda_{max}$ (nm) (2-3) µM Solution | ε (M⁻¹ cm⁻¹) (2-3) µM solution) | Excitation (nm) | Emission (nm) | Stokes shift (nm) | Quantum yield (φ) |
|---|---|---|---|---|---|---|---|
| Compound 1 | 1× PBS | 550 | 203,703 | 550 | 559 | 9 | 0.04 |
| [¹⁸F]-Compound 6 | 1× PBS | 550 | 220,000 | 550 | 574 | 24 | 0.08 |
| Compound 1 | EtOH | 559 | 223,600 | 560 | 575 | 16 | 0.09 |
| [¹⁸F]-Compound 6 | EtOH | 558 | 223,200 | 560 | 574 | 16 | 0.16 |

FIG. 20

| Test # | Initial Volume of Compound 6 in DMSO (7 mM) | Activity of $^{18}$F to Compound 6 | Amount of reacted [$^{18}$F]-Compound 6 | Volume of 1.0 M Pyridazine-HCl pH= 2.5 | Isolated activity of [$^{18}$F]-Compound 6 | Total time of synthesis | Decay uncorrected yield | Specific activity assuming 60% yield of [$^{18}$F]-Compound 6 (Ci/µmol) |
|---|---|---|---|---|---|---|---|---|
| 1 | 10 µL | 35 mCi | 100 nmol | 10 µL | 5.4 mCi | 70 min | 15.4% | 0.09 |
| 2 | 10 µL | 40 mCi | 100 nmol | 10 µL | 5.2 mCi | 70 min | 13.0% | 0.087 |
| 3 | 10 µL | 38 mCi | 80 nmol | 10 µL | 4.6 mCi | 70 min | 12.1% | 0.096 |
| 4 | 10 µL | 65 mCi | 80 nmol | 10 µL | 10.6 mCi | 75 min | 16.3% | 0.220 |
| 5 | 10 µL | 70 mCi | 80 nmol | 10 µL | 11.5 mCi | 75 min | 16.4% | 0.239 |
| 6 | 10 µL | 39 mCi | 80 nmol | 10 µL | 6.0 mCi | 75 min | 15.3% | 0.125 |
| 7 | 10 µL | 40 mCi | 80 nmol | 10 µL | 4.2 mCi | 75 min | 10.5% | 0.087 |
| 8 | 10 µL | 36 mCi | 80 nmol | 10 µL | 4.1 mCi | 75 min | 11.3% | 0.085 |

FIG. 21

MULTIMODAL FLUORINE-CY3/5/7-DOTA-HAPTEN COMPOSITIONS, DIAGNOSTICS, FLUORESCENCE GUIDED SURGERY AND RADIOIMMUNOTHERAPY

CROSS-REFERENCE TO RELATED APPLICATIONS

This application is a U.S. National Stage Application under 35 U.S.C. § 371 of International Patent Application No. PCT/US2020/067414, filed on Dec. 30, 2020, claims the benefit of and priority to U.S. Provisional Appl. No. 62/956, 045 filed Dec. 31, 2019, the disclosure of which is incorporated by reference herein in its entirety.

GOVERNMENT SUPPORT

This invention was made with government support under grant number EB013904 awarded by the National Institute of Biomedical Imaging and Bioengineering (NIBIB)/National Institutes of Health (NIH). The government has certain rights in the invention.

TECHNICAL FIELD

The present technology relates generally to compositions including multimodal fluorine-cyanine-DOTA-hapten compositions and methods of using the same in diagnostic imaging as well as pretargeted radioimmunotherapy.

BACKGROUND

The following description of the background of the present technology is provided simply as an aid in understanding the present technology and is not admitted to describe or constitute prior art to the present technology.

The unrivaled utility and popularity of fluorodeoxyglucose ($^{18}$FDG) in imaging cancer is driven by the fact that it can uniquely identify tissues with heightened metabolic rates non-invasively, without regard to a patient's gender, race or age. Adverse drug reactions requiring medical intervention have never been associated with an $^{18}$FDG PET scan. The utility of the $^{18}$FDG PET is so robust that the results of a single scan can dictate treatment approach, whether it is surgical intervention in a stage II curable cancer or palliative care in a refractory, and sometimes terminal, stage III or IV cancer. Unfortunately, $^{18}$FDG is not therapeutic, and an $^{18}$FDG scan will only indicate whether a cancer is growing. An $^{18}$FDG scan cannot predict a cancer's response to radiotherapeutic, chemotherapeutic, or surgical intervention. The only sure way to cure cancer is to obtain and exploit precise molecular targeting information on a cancer. These characteristics can be determined by biopsy, unfortunately a biopsy provides information on the biopsied lesion, and not its metastases, which may exhibit heterogeneity from a primary lesion. Additionally, many sites in an individual can be difficult to biopsy, e.g., cancers in the brain or pancreas.

Conventional antibody based imaging modalities involve direct modification of the targeting antibody (or proteins or ligands). However, large proteins like antibodies (IgG) have slow blood clearance (half-life measured in days), reducing the imaging contrast in highly vascular tissues where there is a large blood pool (Zeglis & Lewis, *Dalton Trans* 40, 6168-6195 (2011); Histed, S. N. et al. *Nucl Med Commun* 33, 349-361 (2012)). These limitations affect both their utility in nuclear imaging as well as their utility as visual guides for tracking viable tumor at the time of surgical resection. Many antibody and antibody derivatives that have been reengineered for better pharmacokinetic distribution exist, including antibody fragments, nanobodies, diabodies, llama bodies, shark and camelid antibodies. However, the large molecular weights or hydrophobic nature of these reengineered protein derivatives cause hepatic accumulation, thus making them incompatible with alpha or beta emitter radiotherapy (Sands & Jones, *J Nucl Med* 28, 390-398 (1987)). Other non-antibody (non-receptor specific) based imaging approaches are limited by their lack of specificity (Histed, S. N. et al. *Nucl Med Commun* 33, 349-361 (2012)).

Accordingly, there is a need for effective tools that simultaneously image, treat, monitor, target, and measure tumor response, which are both scalable and applicable consistently across a large spectrum of different tissue or tumor targets.

Summary of the Present Technology

In one aspect, the present disclosure provides a compound of Formula I

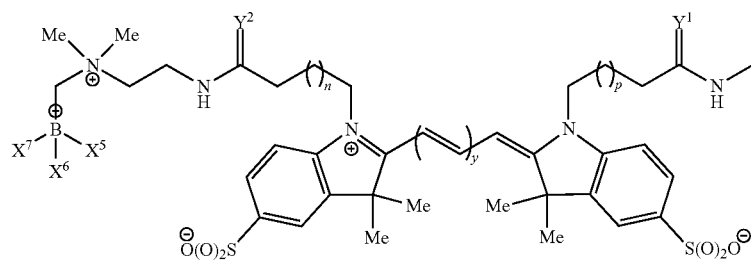
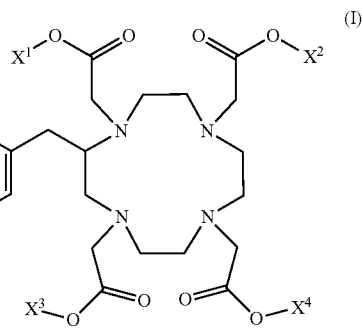

or a pharmaceutically acceptable salt thereof, wherein $X^1$, $X^2$, $X^3$, and $X^4$ are each independently a lone pair of electrons (i.e. providing an oxygen anion); $X^5$, $X^6$, and $X^7$ are each independently $^{18}$F or $^{19}$F; $Y^1$ and $Y^2$ are each independently O or S; n is 1, 2, 3, 4, 5, 6, 7, 8, 9, or 10; p is 1, 2, 3, 4, 5, 6, 7, 8, 9, or 10; and y is 1, 2, or 3.

In any embodiment herein, the compound of Formula I may be a compound according to Formula IA

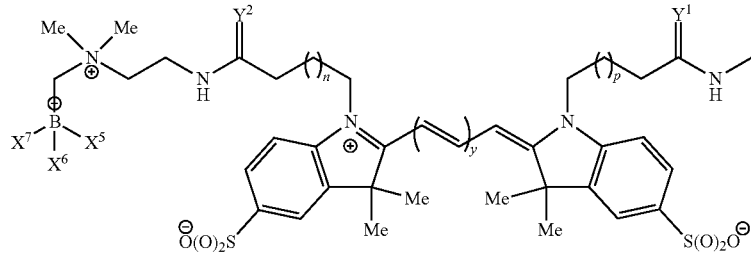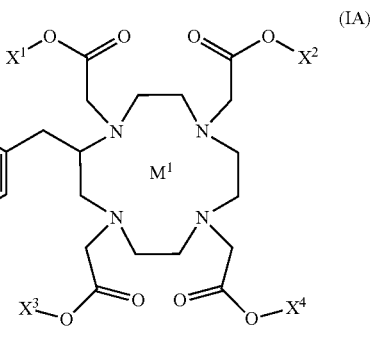

(IA)

or a pharmaceutically acceptable salt thereof, wherein $M^1$ is $^{175}Lu^{3+}$, $^{77}Lu^{3+}$, $^{63}Tm^{3+}$, $^{165}Tm^{3+}$, $^{166}Tm^{3+}$, $^{168}Tm^{3+}$, $^{169}Tm^{3+}$, $^{170}Tm^{3+}$, $^{171}Tm^{3+}$, $^{172}Tm^{3+}$, $^{173}Tm^{3+}$, $^{165}Ho^{3+}$, $^{166}Ho^{3+}$, $^{167}Ho^{3+}$, $^{169}Er^{3+}$, $^{171}Er^{3+}$, $^{172}Er^{3+}$, $^{157}Dy^{3+}$, $^{155}Dy^{3+}$, $^{152}Dy^{3+}$, $^{153}Dy^{3+}$, $^{165}Dy^{3+}$, $^{166}Dy^{3+}$, $^{162}Dy^{3+}$, $^{163}Dy^{3+}$, $^{141}Pr^{3+}$, $^{142}Pr^{3+}$, $^{143}Pr^{3+}$, $^{145}Pr^{3+}$, $^{64}Cu^{2+}$, $^{67}Cu^{3+}$, $^{45}Sc^{3+}$, $^{69}Ga^{3+}$, $^{71}Ga^{3+}$, $^{86}Y^{3+}$, $^{89}Y^{3+}$, $^{90}Y^{3+}$, $^{113}In^{3+}$, $^{115}In^{3+}$, $^{139}La^{3+}$, $^{136}Ce^{3+}$, $^{138}Ce^{3+}$, $^{140}Ce^{3+}$, $^{142}Ce^{3+}$, $^{151}Eu^{3+}$, $^{153}Eu^{3+}$, $^{159}Tb^{3+}$, $^{154}Gd^{3+}$, $^{155}Gd^{3+}$, $^{156}Gd^{3+}$, $^{157}Gd^{3+}$, $^{158}Gd^{3+}$, or $^{160}Gd^{3+}$. In any embodiment herein, it may be that the compound is of Formula IA and $Y^1$ and $Y^2$ each independently are O. In any embodiment herein, it may be that the compound is of Formula IA and $M^1$ is $^{175}Lu^{3+}$ or $^{177}Lu^{3+}$.

In any embodiment herein, the compound of Formula I may be a compound according to Formula IB or Formula IC or a pharmaceutically acceptable salt thereof. In any embodiment herein, it may be that the compound is of Formula IB and $Y^1$ and $Y^2$ each independently are O. In any embodiment herein, it may be that the compound is of Formula IC and $Y^1$ and $Y^2$ each independently are O. In any embodiment herein, it may be that the compound is of Formula IC and $M^1$ is $^{175}Lu^{3+}$ or $^{177}Lu^{3+}$.

In one aspect, the present disclosure provides a method for detecting solid tumors in a subject in need thereof comprising (a) administering to the subject an effective amount of a complex comprising a compound of Formula I, Formula IA, Formula IB, or Formula IC, and a multispecific (e.g., bispecific) antibody or antigen binding fragment thereof that binds to the compound and a tumor associated antigen, wherein the complex is configured to localize to a solid tumor expressing the tumor associated antigen recognized by the multispecific (e.g., bispecific) antibody or antigen binding fragment of the complex; and (b) detecting

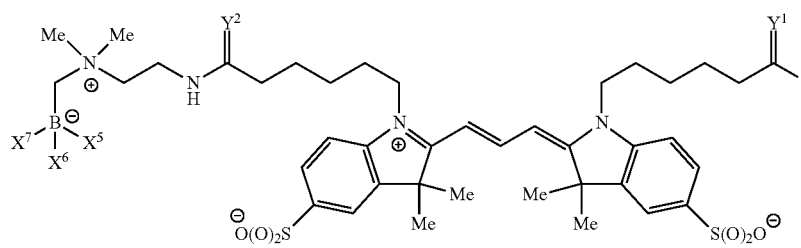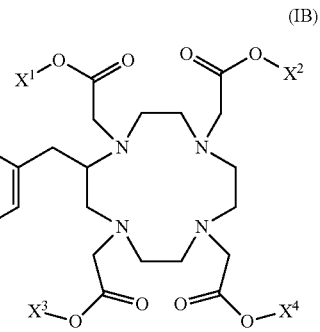

(IB)

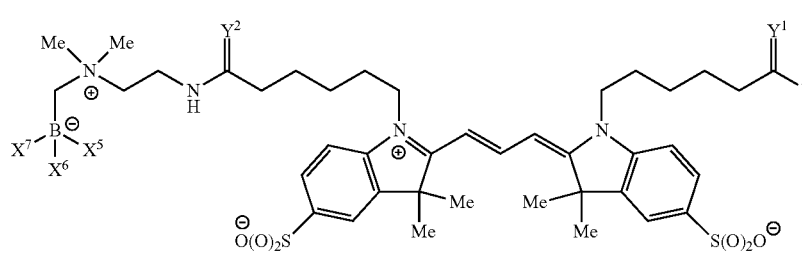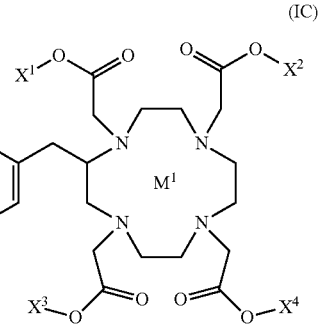

(IC)

the presence of solid tumors in the subject by detecting radioactive levels or fluorescence levels emitted by the complex that are higher than a reference value. In some embodiments, the subject is human. Additionally, the method further comprises determining the location and/or stage (e.g., Stage I, Stage II, Stage III, or Stage IV) of the solid tumors.

In one aspect, the present disclosure provides a method for determining surgical tissue margins in a subject comprising (a) administering to the subject an effective amount of a complex comprising a compound of Formula I, Formula IA, Formula IB, or Formula IC, and a multispecific (e.g., bispecific) antibody or antigen binding fragment thereof that binds to the compound and a tumor associated antigen, wherein the complex is configured to localize to a solid tumor expressing the tumor associated antigen recognized by the multispecific (e.g., bispecific) antibody or antigen binding fragment of the complex; and (b) determining surgical tissue margins in the subject by detecting radioactive levels or fluorescence levels emitted by the complex that are higher than a reference value. In some embodiments, the subject is human.

In another aspect, the present disclosure provides a method for selecting a subject for pretargeted radioimmunotherapy comprising (a) administering to the subject an effective amount of a complex comprising a compound of Formula I, Formula IA, Formula IB, or Formula IC, and a multispecific (e.g., bispecific) antibody or antigen binding fragment thereof that binds to the compound and a tumor associated antigen, wherein the complex is configured to localize to a solid tumor expressing the tumor associated antigen recognized by the multispecific (e.g., bispecific) antibody or antigen binding fragment of the complex; (b) detecting radioactive levels or fluorescence levels emitted by the complex; and (c) selecting the subject for pretargeted radioimmunotherapy when the radioactive levels or fluorescence levels emitted by the complex are higher than a reference value. In some embodiments, the subject is human.

In any of the preceding embodiments of the methods disclosed herein, the subject is diagnosed with, or is suspected of having cancer. The cancer may be breast cancer, colorectal cancer, cervical cancer, ovarian cancer, liver cancer, bladder cancer, hepatoma, hepatocellular carcinoma, brain cancer, lung cancer, gastric or stomach cancer, pancreatic cancer, thyroid cancer, kidney or renal cancer, prostate cancer, melanoma, sarcomas, carcinomas, Wilms tumor, endometrial cancer, glioblastoma, squamous cell cancer, astrocytomas, salivary gland carcinoma, vulvar cancer, penile carcinoma, and head-and-neck cancer. In certain embodiments, the brain cancer is a pituitary adenoma, a meningioma, a neuroblastoma, or a craniopharyngioma.

In another aspect, the present disclosure provides a method for detecting brain disease in a subject in need thereof comprising (a) administering to the subject an effective amount of a complex comprising a compound of Formula I, Formula IA, Formula IB, or Formula IC, and a multispecific (e.g., bispecific) antibody or antigen binding fragment thereof that binds to the compound and a neuronal tissue antigen, wherein the complex is configured to localize to a brain region expressing the neuronal tissue antigen recognized by the multispecific (e.g., bispecific) antibody or antigen binding fragment of the complex; and (b) detecting the presence of brain disease in the subject by detecting radioactive levels or fluorescence levels emitted by the complex that are higher than a reference value. Examples of brain disease include, but are not limited to, Alzheimer's disease, brain cancer or metastases, Parkinson's disease, depression, anxiety, encephalopathy, dementia, and stroke. In some embodiments, the subject is human.

In yet another aspect, the present disclosure provides a method for detecting cardiovascular disease in a subject in need thereof comprising (a) administering to the subject an effective amount of a complex comprising a compound of Formula I, Formula IA, Formula IB, or Formula IC, and a multispecific (e.g., bispecific) antibody or antigen binding fragment thereof that binds to the compound and a cardiac tissue antigen, wherein the complex is configured to localize to cardiac tissue expressing the cardiac tissue antigen recognized by the multispecific (e.g., bispecific) antibody or antigen binding fragment of the complex; and (b) detecting the presence of cardiovascular disease in the subject by detecting radioactive levels or fluorescence levels emitted by the complex that are higher than a reference value. Examples of cardiovascular disease include, but are not limited to, arteriosclerosis or atherosclerosis. In some embodiments, the subject is human.

In any and all embodiments of the methods disclosed herein, the radioactive levels emitted by the complex are detected using positron emission tomography or single photon emission computed tomography. Additionally or alternatively, in some embodiments of the methods disclosed herein, the fluorescence levels emitted by the complex are detected using fluorescent imaging.

In any and all embodiments of the methods disclosed herein, the complex is administered into the cerebral spinal fluid or blood of the subject. Additionally or alternatively, in some embodiments of the methods disclosed herein, the complex is administered intravenously, intramuscularly, intraarterially, intrathecally, intracapsularly, intraorbitally, intradermally, intraperitoneally, transtracheally, subcutaneously, intracerebroventricularly, orally or intranasally.

Additionally or alternatively, in some embodiments of the methods disclosed herein, the radioactive levels or fluorescence levels emitted by the complex are detected between 4 hours to 6 months after the complex is administered. In certain embodiments of the methods disclosed herein, the radioactive levels emitted by the complex are expressed as the percentage injected dose per gram tissue (% ID/g). In some embodiments, the ratio of radioactive levels or fluorescence levels between a tumor and normal tissue is about 2:1, 3:1, 4:1, 5:1, 6:1, 7:1, 8:1, 9:1, 10:1, 15:1, 20:1, 25:1, 30:1, 35:1, 40:1, 45:1, 50:1, 55:1, 60:1, 65:1, 70:1, 75:1, 80:1, 85:1, 90:1, 95:1 or 100:1.

In another aspect, the present disclosure provides a method for increasing tumor sensitivity to radiation therapy in a subject diagnosed with cancer comprising (a) administering an effective amount of an anti-DOTA or anti-cyanine multispecific (e.g., bispecific) antibody or antigen binding fragment thereof to the subject, wherein the anti-DOTA or anti-cyanine multispecific (e.g., bispecific) antibody or antigen binding fragment is configured to localize to a tumor expressing a tumor associated antigen; and (b) administering an effective amount of a compound of Formula I, Formula IA, Formula IB, or Formula IC to the subject, wherein the compound is configured to bind to the anti-DOTA or anti-cyanine multispecific (e.g., bispecific) antibody or antigen binding fragment. In some embodiments, the subject is human.

The compound of Formula I, Formula IA, Formula IB, or Formula IC may be administered at any time between 1 minute to 4 or more days following administration of the anti-DOTA or anti-cyanine multispecific (e.g., bispecific) antibody or antigen binding fragment. Additionally or alternatively, in some embodiments, the method further comprises administering an effective amount of a clearing agent to the subject prior to administration of the compound of Formula I, Formula IA, Formula IB, or Formula IC. In some embodiments, the clearing agent is a 500 kD aminodextran-DOTA conjugate (e.g., 500 kD dextran-DOTA-Bn (Y), 500 kD dextran-DOTA-Bn (Lu), or 500 kD dextran-DOTA-Bn (In) etc.), a glycodendrimer-based clearing agent (CA), α-thio-N-acetylgalactosamine-16-DOTA-$Y^{3+}$, galactose-albumin-DOTA-$Y^{3+}$, or a polystyrene bead coated with DOTA-$Y^{3+}$-conjugated albumin.

Additionally or alternatively, in some embodiments of the method, the anti-DOTA or anti-cyanine multispecific (e.g., bispecific) antibody or antigen binding fragment and/or the compound of Formula I, Formula IA, Formula IB, or Formula IC is administered intravenously, intramuscularly, intraarterially, intrathecally, intracapsularly, intraorbitally, intradermally, intraperitoneally, transtracheally, subcutaneously, intracerebroventricularly, orally or intranasally.

In one aspect, the present disclosure provides a method for increasing tumor sensitivity to radiation therapy in a subject diagnosed with cancer comprising administering to the subject an effective amount of a complex comprising a compound of Formula I, Formula IA, Formula IB, or Formula IC and a multispecific (e.g., bispecific) antibody or antigen binding fragment thereof that recognizes and binds to the compound and a tumor associated antigen, wherein the complex is configured to localize to a tumor expressing the tumor associated antigen recognized by the multispecific (e.g., bispecific) antibody or antigen binding fragment of the complex. The complex may be administered intravenously, intramuscularly, intraarterially, intrathecally, intracapsularly, intraorbitally, intradermally, intraperitoneally, transtracheally, subcutaneously, intracerebroventricularly, orally or intranasally. In some embodiments, the subject is human.

In another aspect, the present disclosure provides a method for treating cancer in a subject in need thereof comprising (a) administering an effective amount of an anti-DOTA or anti-cyanine multispecific (e.g., bispecific) antibody or antigen binding fragment thereof to the subject, wherein the anti-DOTA or anti-cyanine multispecific (e.g., bispecific) antibody or antigen binding fragment is configured to localize to a tumor expressing a tumor associated antigen; and (b) administering an effective amount of a compound of Formula I, Formula IA, Formula IB, or Formula IC to the subject, wherein the compound is configured to bind to the anti-DOTA or anti-cyanine multispecific (e.g., bispecific) antibody or antigen binding fragment. In some embodiments, the subject is human.

Accordingly, in some embodiments, the method further comprises administering an effective amount of a clearing agent to the subject prior to administration of the compound of Formula I, Formula IA, Formula IB, or Formula IC.

Also provided herein are methods for treating cancer in a subject in need thereof comprising administering to the subject an effective amount of a complex comprising a compound of Formula I, Formula IA, Formula IB, or Formula IC and a multispecific (e.g., bispecific) antibody or antigen binding fragment thereof that recognizes and binds to the compound of Formula I, Formula IA, Formula IB, or Formula IC and a tumor associated antigen, wherein the complex is configured to localize to a tumor expressing the tumor associated antigen recognized by the multispecific (e.g., bispecific) antibody or antigen binding fragment of the complex.

The methods for treating cancer may further comprise sequentially, separately, or simultaneously administering to the subject at least one additional therapeutic agent.

In any and all embodiments of the methods disclosed herein, the tumor associated antigen is selected from the group consisting of Poly-sialic acid, GD3, STEAP1, GPA33, HER2/neu, GD2, MAGE-1, MAGE-3, BAGE, GAGE-1, GAGE-2, MUM-1, CDK4, N-acetylglucosaminyltransferase, p15, gp75, beta-catenin, ErbB2, cancer antigen 125 (CA-125), carcinoembryonic antigen (CEA), RAGE, MART (melanoma antigen), MUC-1, MUC-2, MUC-3, MUC-4, MUC-5ac, MUC-16, MUC-17, tyrosinase, Pmel 17 (gp100), GnT-V intron V sequence (N-acetylglucoaminyl-transferase V intron V sequence), Prostate cancer psm, PRAME (melanoma antigen), β-catenin, EBNA (Epstein-Barr Virus nuclear antigen) 1-6, p53, lung resistance protein (LRP) Bcl-2, prostate specific antigen (PSA), Ki-67, CEACAM6, colon-specific antigen-p (CSAp), HLA-DR, CD40, CD74, CD138, EGFR, EGFRvIII, EGP-1, EGP-2, VEGF, PlGF, insulin-like growth factor (ILGF), tenascin, platelet-derived growth factor, IL-6, CD20, CD19, PSMA, CD33, CD123, MET, DLL3, DLL4, CD24, Ang-2, HER3, IGF-1R, CD30, TAG-72, SPEAP, CD45, L1-CAM, Lewis Y (Ley) antigen, E-cadherin, V-cadherin, and EpCAM.

In another aspect, the present disclosure provides a method for determining the efficacy of an anticancer therapy in a subject in need thereof comprising: (a) administering to the subject a complex comprising a compound of Formula I, Formula IA, Formula IB, or Formula IC, and a multispecific (e.g., bispecific) antibody or antigen binding fragment thereof that binds to the compound and a tumor associated antigen at a first time point after the subject has received the anticancer therapy, wherein the complex is configured to localize to a solid tumor expressing the tumor associated antigen recognized by the multispecific (e.g., bispecific) antibody or antigen binding fragment of the complex; (b) detecting radioactive levels or fluorescence levels emitted by the complex at the first time point; (c) administering the complex to the subject at a second time point following step (b); and (d) detecting radioactive levels or fluorescence levels emitted by the complex at the second time point, wherein the anticancer therapy is effective when the radioactive levels or fluorescence levels emitted by the complex at the second time point are reduced compared to the first time point.

Examples of anticancer therapy include the compound of Formula I, Formula IA, Formula IB, or Formula IC, as well as chemotherapy, radiation therapy and surgery. Examples of chemotherapeutic agents include, but are not limited to, nitrogen mustards, ethylenimine derivatives, alkyl sulfonates, nitrosoureas, gemcitabine, triazenes, folic acid analogs, anthracyclines, taxanes, COX-2 inhibitors, topoisomerase inhibitors, pyrimidine analogs, purine analogs, antibiotics, enzyme inhibitors, epipodophyllotoxins, platinum coordination complexes, vinca alkaloids, substituted ureas, methyl hydrazine derivatives, adrenocortical suppressants, hormone antagonists, endostatin, taxols, camptothecins, SN-38, doxorubicin, doxorubicin analogs, antimetabolites, alkylating agents, antimitotics, anti-angiogenic agents, tyrosine kinase inhibitors, mTOR inhibitors, heat shock protein (HSP90) inhibitors, proteosome inhibitors, HDAC inhibitors, pro-apoptotic agents, methotrexate and CPT-11.

In another aspect, the present disclosure provides a method for monitoring cancer progression in a subject in need thereof comprising: (a) administering to the subject a complex comprising a compound of Formula I, Formula IA, Formula IB, or Formula IC, and a multispecific (e.g., bispecific) antibody or antigen binding fragment thereof that binds to the compound and a tumor associated antigen at a first time point, wherein the complex is configured to localize to a solid tumor expressing the tumor associated antigen recognized by the multispecific (e.g., bispecific) antibody or antigen binding fragment of the complex; (b) detecting radioactive levels or fluorescence levels emitted by the complex at the first time point; (c) administering the complex to the subject at a second time point following step (b); and (d) detecting radioactive levels or fluorescence levels emitted by the complex at the second time point, wherein the cancer has metastasized or progressed when the radioactive levels or fluorescence levels emitted by the complex at the second time point are elevated compared to the first time point.

In any and all embodiments of the methods disclosed herein, the cancer is breast cancer, colorectal cancer, cervical cancer, ovarian cancer, liver cancer, bladder cancer, hepatoma, hepatocellular carcinoma, brain cancer, lung cancer, gastric or stomach cancer, pancreatic cancer, thyroid cancer, kidney or renal cancer, prostate cancer, melanoma, sarcomas, carcinomas, Wilms tumor, endometrial cancer, glioblastoma, squamous cell cancer, astrocytomas, salivary gland carcinoma, vulvar cancer, penile carcinoma, or head-and-neck cancer. In certain embodiments, the brain cancer is a pituitary adenoma, a meningioma, a neuroblastoma, or a craniopharyngioma. Additionally or alternatively, in some embodiments, the subject is human.

Also disclosed herein are kits containing components suitable treating, detecting, visualizing and/or monitoring a disease disclosed herein (e.g., cancer, brain disease, cardiovascular disease) in a patient. In one aspect, the kits comprise a compound of Formula I, Formula IA, Formula IB, or Formula IC and instructions for use. In certain embodiments, the kits further comprise at least one anti-DOTA or anti-cyanine multispecific antibody (e.g., a BsAb) or antigen binding fragment. Additionally or alternatively, in some embodiments, the kits further comprise a clearing agent and/or one or more radionuclides. Examples of the one or more radionuclides include is $^{175}Lu^{3+}$, $^{177}Lu^{3+}$, $^{163}Tm^{3+}$, $^{165}Tm^{3+}$, $^{166}Tm^{3+}$, $^{168}Tm^{3+}$, $^{169}Tm^{3+}$, $^{170}Tm^{3+}$, $^{171}Tm^{3+}$, $^{172}Tm^{3+}$, $^{173}Tm^{3+}$, $^{165}Ho^{3+}$, $^{166}Ho^{3+}$, $^{167}Ho^{3+}$, $^{169}Er^{3+}$, $^{171}Er^{3+}$, $^{172}Er^{3+}$, $^{157}Dy^{3+}$, $^{155}Dy^{3+}$, $^{152}Dy^{3+}$, $^{153}Dy^{3+}$, $^{165}Dy^{3+}$, $^{166}Dy^{3+}$, $^{162}Dy^{3+}$, $^{163}Dy^{3+}$, $^{141}Pr^{3+}$, $^{142}Pr^{3+}$, $^{143}Pr^{3+}$, $^{145}Pr^{3+}$, $^{64}Cu^{2+}$, $^{67}Cu^{3+}$, $^{45}Sc^{3+}$, $^{69}Ga^{3+}$, $^{71}Ga^{3+}$, $^{86}Y^{3+}$, $^{89}Y^{3+}$, $^{90}Y^{3+}$, $^{113}In^{3+}$, $^{115}In^{3+}$, $^{139}La^{3+}$, $^{136}Ce^{3+}$, $^{138}Ce^{3+}$, $^{140}Ce^{3+}$, $^{142}Ce^{3+}$, $^{151}Eu^{3+}$, $^{153}Eu^{3+}$, $^{159}Tb^{3+}$, $^{154}Gd^{3+}$, $^{155}Gd^{3+}$, $^{156}Gd^{3+}$, $^{157}Gd^{3+}$, $^{158}Gd^{3+}$, or $^{160}Gd^{3+}$.

BRIEF DESCRIPTION OF THE DRAWINGS

FIG. 1 illustrates the utility of a multimodal small molecule (e.g., fluorine-Cy3-DOTA) for PET imaging, fluorescence guided surgery, and radioimmunotherapy.

FIGS. 10 and 11 show the binding of Compound 6 to GD2-expressing IMR32Luc neuroblastoma cells using an anti-GD2/anti-DOTA BsAb, a control BsAb (anti-HER2/anti-DOTA) or no BsAb.

FIG. 15 summarizes the mean fluorescence (MFI) of each condition and FIG. 16 shows the histogram overlays.

FIG. 20 provides a summary of optical properties of [$^{18}$F]Cy3D ([$^{18}$F]-Compound 6) compared to of CY3.18.OH (Compound 1).

FIG. 21 provides a summary of multiple $^{18}$F radiolabeling of [F]Cy3D (Compound 6).

DETAILED DESCRIPTION

Figure 2:
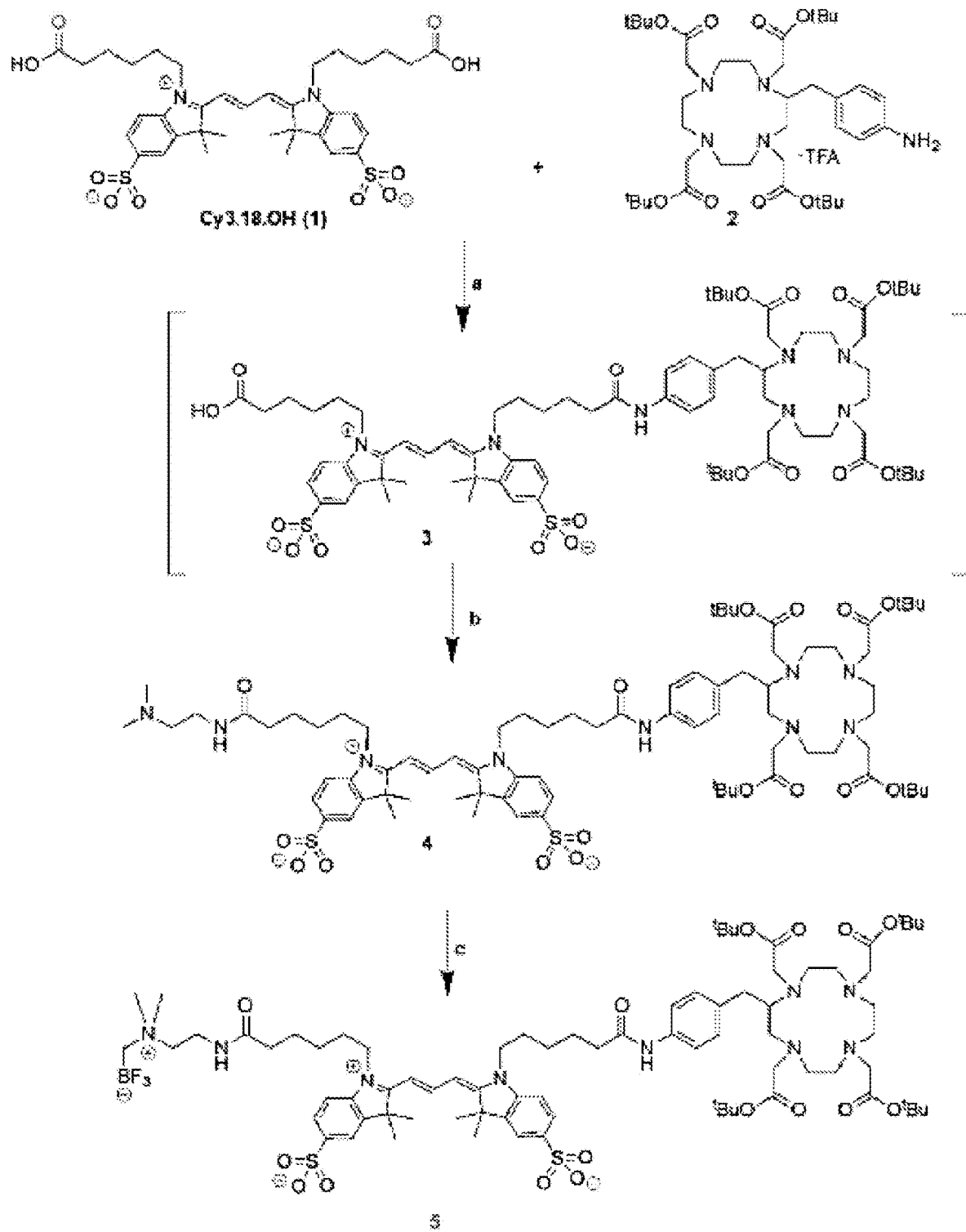
FIG. 2 provides an overview of a representative synthesis of [F]Cy3D and [$^{18F}$]Cy3D (each a compound of the present technology) as described in the working examples.
Figure 2:
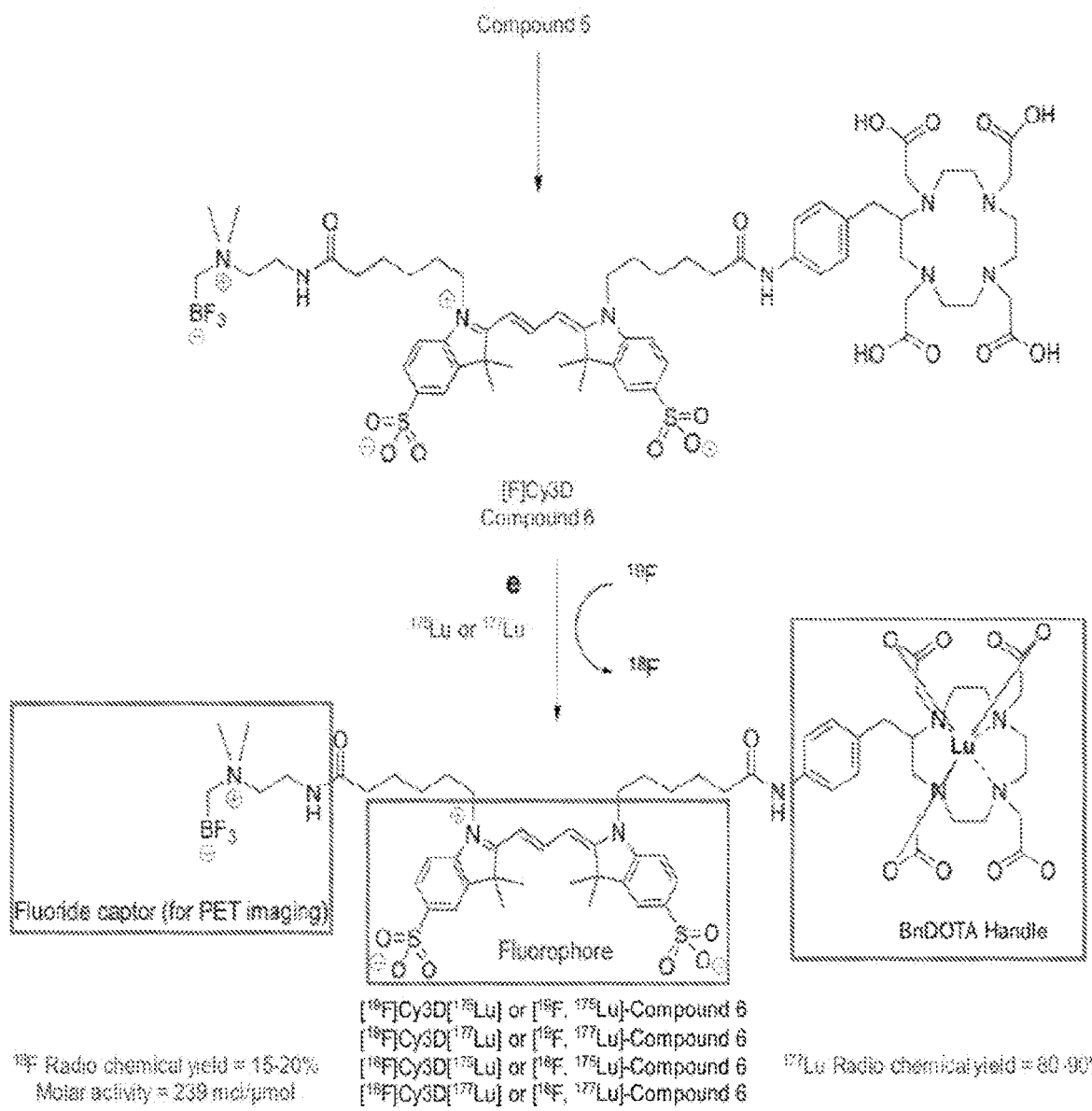

It is to be appreciated that certain aspects, modes, embodiments, variations and features of the present methods are described below in various levels of detail in order to provide a substantial understanding of the present technology.

In practicing the present methods, many conventional techniques in molecular biology, protein biochemistry, cell biology, microbiology and recombinant DNA are used. See, e.g., Sambrook and Russell eds. (2001) *Molecular Cloning: A Laboratory Manual*, 3rd edition; the series Ausubel et al. eds. (2007) *Current Protocols in Molecular Biology*; the series *Methods in Enzymology* (Academic Press, Inc., N.Y.); MacPherson et al. (1991) *PCR 1: A Practical Approach* (IRL Press at Oxford University Press); MacPherson et al. (1995) *PCR 2: A Practical Approach*; Harlow and Lane eds. (1999) *Antibodies, A Laboratory Manual*; Freshney (2005) *Culture of Animal Cells: A Manual of Basic Technique*, 5th edition; Gait ed. (1984) *Oligonucleotide Synthesis*; U.S. Pat. No. 4,683,195; Hames and Higgins eds. (1984) *Nucleic Acid Hybridization*; Anderson (1999) *Nucleic Acid Hybridization*; Hames and Higgins eds. (1984) *Transcription and Translation; Immobilized Cells and Enzymes* (IRL Press (1986)); Perbal (1984) *A Practical Guide to Molecular Cloning*; Miller and Calos eds. (1987) *Gene Transfer Vectors for Mammalian Cells* (Cold Spring Harbor Laboratory); Makrides ed. (2003) *Gene Transfer and Expression in Mammalian Cells*; Mayer and Walker eds. (1987) *Immunochemical Methods in Cell and Molecular Biology* (Academic Press, London); and Herzenberg et al. eds (1996) *Weir's Handbook of Experimental Immunology*.

The present disclosure provides a targeted agent (e.g., AMB[F]$_3$-Cy-Benzyl-DOTA[metal] (a.k.a., [F]CyD)) which combines multiple imaging and theranostic modalities into a single compound (FIG. 1). The compounds of the present disclosure are capable of simultaneously emitting positrons and fluorescence, PET or PET/CT imaging, fluorescence imaging, and recognition by the anti-DOTA antibody C825. The compounds of the present technology are superior to alternative imaging agents including; DOTA [$^{86}$Y], DOTA[$^{68}$Ga](DOTA-chelated PET isotopes) and DOTA[$^{177}$Lu] (DOTA-chelated SPECT isotopes) because [$^{18}$F] allows higher resolution with lower energy emission, is a readily available isotope, and is calibrated for use in all current clinical PET/CTs. The compounds of the present technology are superior to directly labeled antibodies or peptides (using $^{131}$I, $^{124}$I, DOTA[$^{68}$Ga] or DFO[$^{89}$Zr]) because of their higher contrast (faster clearance than labeled mAb), lower requisite doses, optimal pharmacokinetic distributions, as well as elimination of the risk of degradation of immunoreactivity or affinity, and improved tissue penetration (when compared to peptides or proteins). As demonstrated by the working examples herein, [F]Cy3D is superior to alternative fluorescent imaging agents due to its faster clearance (over directly labeled mAb) and can easily be adapted to use Cy5 or Cy7 for improved tissue penetration (when compared to labeled peptides or proteins) as well as fluorescence imaging in the surgical suite.

The compounds of the present disclosure utilize non-carbon fluoridation to stably radiolabel Benzyl-DOTA[ ] (BnDOTA) to create [$^{18}$F]CyD. Such radiolabeling employs non-traditional methods of fluoride capture (non-carbon based capture), and does not need any additional metal, allowing for the BnDOTA[ ] chelator to be left empty for additional flexibility in its use. By keeping the BnDOTA[ ] chelator open, the FCyD compounds of the present technology can be used for both diagnostics ($^{18}$F) and therapeutic ($^{177}$Lu, $^{90}$Y) targeting.

Moreover, the compounds of the present technology can be combined with a limitless number of multispecific antibodies (one specificity for tumor, and the other specificity for BnDOTA[metal]) against any cell surface target, thus avoiding the risk that chemical modifications will alter stability or immunoreactivity of the targeting moiety. Because the radiolabeling is done on a secondary agent, it does not affect immunoreactivity or affinity of the targeting agent (e.g. multispecific antibody) and thus a single batch of the compounds of the present technology can be generated, lyophilized and dispensed as unit doses for multiple independent infusions. The combination with multispecific antibodies also provides a benefit where the antibody delivers specificity, but pharmacokinetics and clearance remain dependent on the small size of the imaging agent, allowing for high contrast images, minimal toxicity and high specificity.

Definitions

Unless defined otherwise, all technical and scientific terms used herein generally have the same meaning as commonly understood by one of ordinary skill in the art to which this technology belongs. As used in this specification and the appended claims, the singular forms "a", "an" and "the" include plural referents unless the content clearly dictates otherwise. For example, reference to "a cell" includes a combination of two or more cells, and the like. Generally, the nomenclature used herein and the laboratory procedures in cell culture, molecular genetics, organic chemistry, analytical chemistry and nucleic acid chemistry and hybridization described below are those well-known and commonly employed in the art.

As used herein, the term "about" in reference to a number is generally taken to include numbers that fall within a range of 1%, 5%, or 10% in either direction (greater than or less than) of the number unless otherwise stated or otherwise evident from the context (except where such number would be less than 0% or exceed 100% of a possible value). If there are uses of the term which are not clear to persons of ordinary skill in the art, given the context in which it is used, "about" will mean up to plus or minus 10% of the particular term—for example, "about 10 wt. %" would be understood to mean "9 wt. % to 11 wt. %." It is to be understood that when "about" precedes a term, the term is to be construed as disclosing "about" the term as well as the term without modification by "about"—for example, "about 10 wt. %" discloses "9 wt. % to 11 wt. %" as well as disclosing "10 wt. %."

Pharmaceutically acceptable salts of the compounds described herein are within the scope of the present technology and include acid or base addition salts which retain the desired pharmacological activity and are not biologically undesirable (e.g., the salt is not unduly toxic, allergenic, or irritating, and is bioavailable). When the compound of the present technology has a basic group, such as, for example, an amino group, pharmaceutically acceptable salts can be formed with inorganic acids (such as hydrochloric acid, hydroboric acid, nitric acid, sulfuric acid, and phosphoric acid), organic acids (e.g., alginate, formic acid, acetic acid, benzoic acid, gluconic acid, fumaric acid, oxalic acid, tartaric acid, lactic acid, maleic acid, citric acid, succinic acid, malic acid, methanesulfonic acid, benzenesulfonic acid, naphthalene sulfonic acid, and p-toluenesulfonic acid) or acidic amino acids (such as aspartic acid and glutamic acid). When the compound of the present technology has an acidic group, such as for example, a carboxylic acid group, it can form salts with metals, such as alkali and earth alkali metals (e.g., Na$^+$, Li$^+$, K$^+$, Ca$^{2+}$, Mg$^{2+}$, Zn$^{2+}$), ammonia or organic amines (e.g., dicyclohexylamine, trimethylamine, triethylamine, pyridine, picoline, ethanolamine, diethanolamine, triethanolamine) or basic amino acids (e.g., arginine, lysine and ornithine). Such salts can be prepared in situ during isolation and purification of the compounds or by separately reacting the purified compound in its free base or free acid form with a suitable acid or base, respectively, and isolating the salt thus formed.

As used herein, the "administration" of an agent or drug to a subject includes any route of introducing or delivering to a subject a compound to perform its intended function. Administration can be carried out by any suitable route, including orally, intranasally, parenterally (intravenously, intramuscularly, intraperitoneally, or subcutaneously), rectally, or topically. Administration includes self-administration and the administration by another.

As used herein, the term "antibody" collectively refers to immunoglobulins or immunoglobulin-like molecules including by way of example and without limitation, IgA, IgD, IgE, IgG and IgM, combinations thereof, and similar molecules produced during an immune response in any vertebrate, for example, in mammals such as humans, goats, rabbits and mice, as well as non-mammalian species, such as shark immunoglobulins. As used herein, "antibodies" (includes "intact immunoglobulins") and "antigen binding fragments" specifically bind to a molecule of interest (or a group of highly similar molecules of interest) to the substantial exclusion of binding to other molecules (for example, antibodies and antibody fragments that have a binding constant for the molecule of interest that is about $10^3$ $M^{-1}$ times greater, about $10^4$ $M^{-1}$ times greater or about $10^5$ $M^{-1}$ times greater than a binding constant for other molecules in a biological sample). The term "antibody" also includes genetically engineered forms such as chimeric antibodies (for example, humanized murine antibodies), heteroconjugate antibodies (such as, bispecific antibodies). See also, Pierce Catalog and Handbook, 1994-1995 (Pierce Chemical Co., Rockford, Ill.); Kuby, J., *Immunology*, 3$^{rd}$ Ed., W.H. Freeman & Co., New York, 1997.

More particularly, antibody refers to a polypeptide ligand comprising at least a light chain immunoglobulin variable region or heavy chain immunoglobulin variable region which specifically recognizes and binds an epitope of an antigen. Antibodies are composed of a heavy and a light chain, each of which has a variable region, termed the variable heavy ($V_H$) region and the variable light ($V_L$) region. Together, the $V_H$ region and the $V_L$ region are responsible for binding the antigen recognized by the antibody. Typically, an immunoglobulin has heavy (H) chains and light (L) chains interconnected by disulfide bonds. There are two types of light chain, lambda (λ) and kappa (κ). There are five main heavy chain classes (or isotypes) which determine the functional activity of an antibody molecule: IgM, IgD, IgG, IgA and IgE. Each heavy and light chain contains a constant region and a variable region, (the regions are also known as "domains"). In combination, the heavy and the light chain variable regions specifically bind the antigen. Light and heavy chain variable regions contain a "framework" region interrupted by three hypervariable regions, also called "complementarity-determining regions" or "CDRs". The extent of the framework region and CDRs have been defined (see, Kabat et al., Sequences of Proteins of Immunological Interest, U.S. Department of Health and Human Services, 1991, which is hereby incorporated by reference). The Kabat database is now maintained online. The sequences of the framework regions of different light or heavy chains are relatively conserved within a species. The framework region of an antibody, that is the combined framework regions of the constituent light and heavy chains, largely adopt a β-sheet conformation and the CDRs form loops which connect, and in some cases form part of, the β-sheet structure. Thus, framework regions act to form a scaffold that provides for positioning the CDRs in correct orientation by inter-chain, non-covalent interactions.

The CDRs are primarily responsible for binding to an epitope of an antigen. The CDRs of each chain are typically referred to as CDR1, CDR2, and CDR3, numbered sequentially starting from the N-terminus, and are also typically identified by the chain in which the particular CDR is located. Thus, a $V_H$ CDR3 is located in the variable domain of the heavy chain of the antibody in which it is found, whereas a $V_L$ CDR1 is the CDR1 from the variable domain of the light chain of the antibody in which it is found. An antibody that binds a target protein (e.g., GD2) or molecule (e.g., DOTA) will have a specific $V_H$ region and $V_L$ region sequence, and thus specific CDR sequences. Antibodies with different specificities (i.e., different combining sites for different antigens) have different CDRs. Although it is the CDRs that vary from antibody to antibody, only a limited number of amino acid positions within the CDRs are directly involved in antigen binding. These positions within the CDRs are called specificity determining residues (SDRs). Examples of antibodies include monoclonal antibodies, polyclonal antibodies, humanized antibodies, chimeric antibodies, recombinant antibodies, multispecific antibodies, bispecific antibodies, and antibody fragments. An antibody specifically binds to an antigen.

A "bispecific antibody" is an antibody that can bind simultaneously to two different antigens. Bispecific antibodies (BsAb) and bispecific antibody fragments (BsFab) may have at least one arm that specifically binds to, for example, a tumor-associated antigen (e.g., GD2) and at least one other arm that specifically binds to a targetable conjugate that bears a therapeutic or diagnostic agent (e.g., [F]CyD). A variety of different bi-specific antibody structures are known in the art. In some embodiments, each binding moiety in a bispecific antibody comprises a $V_H$ and/or $V_L$ region from different monoclonal antibodies. In some embodiments, the bispecific antibody comprises an immunoglobulin molecule having $V_H$ and/or $V_L$ regions that contain CDRs from a first monoclonal antibody, and an antibody fragment (e.g., Fab, F(ab'), F(ab')$_2$, Fd, Fv, dAB, scFv, etc.) having $V_H$ and/or $V_L$ regions that contain CDRs from a second monoclonal antibody.

As used herein, the term "diabodies" refers to small antibody fragments with two antigen-binding sites, which fragments comprise a heavy-chain variable domain ($V_H$) connected to a light-chain variable domain ($V_L$) in the same polypeptide chain ($V_H V_L$). By using a linker that is too short to allow pairing between the two domains on the same chain, the domains are forced to pair with the complementary domains of another chain and create two antigen binding sites. Diabodies are described more fully in, e.g., EP 404,097; WO 93/11161; and 30 Hollinger et al., *Proc. Natl. Acad. Sci. USA*, 90: 6444-6448 (1993).

As used herein, the terms "single-chain antibodies" or "single-chain Fv (scFv)" refer to an antibody fusion molecule of the two domains of the Fv fragment, $V_L$ and $V_H$. Single-chain antibody molecules may comprise a polymer with a number of individual molecules, for example, dimer, trimer or other polymers. Furthermore, although the two domains of the F$_v$ fragment, $V_L$ and $V_H$, are coded for by separate genes, they can be joined, using recombinant methods, by a synthetic linker that enables them to be made as a single protein chain in which the $V_L$ and $V_H$ regions pair to form monovalent molecules (known as single-chain F$_v$ (scF$_v$)). Bird et al. (1988) *Science* 242:423-426 and Huston et al. (1988) *Proc. Natl. Acad Sci.* USA 85:5879-5883. Such single-chain antibodies can be prepared by recombinant techniques or enzymatic or chemical cleavage of intact antibodies.

As used herein, the terms "intact antibody" or "intact immunoglobulin" mean an antibody or immunoglobulin that has at least two heavy (H) chain polypeptides and two light (L) chain polypeptides interconnected by disulfide bonds. Each heavy chain is comprised of a heavy chain variable region (abbreviated herein as HCVR or $V_H$) and a heavy chain constant region. The heavy chain constant region is comprised of three domains, $CH_1$, $CH_2$ and $CH_3$. Each light chain is comprised of a light chain variable region (abbreviated herein as LCVR or $V_L$) and a light chain constant region. The light chain constant region is comprised of one domain, CL. The $V_H$ and $V_L$ regions can be further subdivided into regions of hypervariability, termed complementarity determining regions (CDR), interspersed with regions that are more conserved, termed framework regions (FR). Each $V_H$ and $V_L$ is composed of three CDRs and four FRs, arranged from amino-terminus to carboxyl-terminus in the following order: $FR_1$, $CDR_1$, $FR_2$, $CDR_2$, $FR_3$, $CDR_3$, $FR_4$. The variable regions of the heavy and light chains contain a binding domain that interacts with an antigen. The constant regions of the antibodies can mediate the binding of the immunoglobulin to host tissues or factors, including various cells of the immune system (e.g., effector cells) and the first component (Clq) of the classical complement system.

As used herein, an "antigen" refers to a molecule to which an antibody can selectively bind. The target antigen may be a protein (e.g., an antigenic peptide), carbohydrate, nucleic acid, lipid, hapten, or other naturally occurring or synthetic compound. An antigen may also be administered to an animal subject to generate an immune response in the subject.

As used herein, the term "antigen binding fragment" refers to a fragment of a whole immunoglobulin structure which possesses a part of a polypeptide responsible for binding to an antigen. Examples of the antigen binding fragment useful in the present technology include scFv, $(scFv)_2$, scFvFc, Fab, Fab' and $F(ab')_2$, diabodies; linear antibodies; single-chain antibody molecules; and multispecific antibodies formed from antibody fragments.

By "binding affinity" is meant the strength of the total noncovalent interactions between a single binding site of a molecule (e.g., an antibody) and its binding partner (e.g., an antigen). The affinity of a molecule X for its partner Y can generally be represented by the dissociation constant ($K_d$). Affinity can be measured by standard methods known in the art, including those described herein. A low-affinity complex contains an antibody that generally tends to dissociate readily from the antigen, whereas a high-affinity complex contains an antibody that generally tends to remain bound to the antigen for a longer duration.

As used herein, a "clearing agent" is an agent that binds to excess bifunctional antibody that is present in the blood compartment of a subject to facilitate rapid clearance via kidneys. The use of the clearing agent prior to hapten administration facilitates better tumor-to-background ratios in PRIT systems. Examples of clearing agents include 500 kD-dextran-DOTA-Bn(Y) (Orcutt et al., *Mol Cancer Ther.* 11(6): 1365-1372 (2012)), 500 kD aminodextran-DOTA conjugate, a glycodendrimer-based clearing agent (CA), α-thio-N-acetylgalactosamine-16-DOTA-$Y^{3+}$, galactose-albumin-DOTA-$Y^{3+}$, polystyrene beads coated with DOTA-$Y^{3+}$-conjugated albumin, antibodies against the pretargeting antibody, etc.

As used herein, a "control" is an alternative sample used in an experiment for comparison purpose. A control can be "positive" or "negative." For example, where the purpose of the experiment is to determine a correlation of the efficacy of a therapeutic agent for the treatment for a particular type of disease or condition, a positive control (a compound or composition known to exhibit the desired therapeutic effect) and a negative control (a subject or a sample that does not receive the therapy or receives a placebo) are typically employed.

As used herein, the term "effective amount" of a composition, is a quantity sufficient to achieve a desired prophylactic or therapeutic effect, e.g., an amount which results in the decrease in the symptoms associated with a disease that is being treated, e.g., the diseases or medical conditions associated with target polypeptide (e.g., breast cancer, colorectal cancer, brain cancer etc.). The amount of a composition of the present technology administered to the subject will depend on the degree, type and severity of the disease and on the characteristics of the individual, such as general health, age, sex, body weight and tolerance to drugs. The skilled artisan will be able to determine appropriate dosages depending on these and other factors. The compositions of the present technology can also be administered in combination with one or more additional therapeutic compounds.

As used herein, the term "epitope" means an antigenic determinant capable of specific binding to an antibody. Epitopes usually consist of chemically active surface groupings of molecules and usually have specific three dimensional structural characteristics, as well as specific charge characteristics.

As used herein, an "infinite binder" refers to an anti-metal chelate bispecific antibody that is characterized by the formation of a highly specific permanent bond between the bispecific antibody and the metal chelate upon binding. See Corneillie et al., *J. Inorganic Biochemistry* 100:882-890 (2006).

As used herein, the term "sample" refers to clinical samples obtained from a subject or isolated microorganisms. In certain embodiments, a sample is obtained from a biological source (i.e., a "biological sample"), such as tissue, bodily fluid, or microorganisms collected from a subject. Sample sources include, but are not limited to, tumor biopsy, mucus, sputum, bronchial alveolar lavage (BAL), bronchial wash (BW), whole blood, bodily fluids, cerebrospinal fluid (CSF), urine, plasma, serum, or tissue.

As used herein, the term "separate" therapeutic use refers to an administration of at least two active ingredients at the same time or at substantially the same time by different routes.

As used herein, the term "sequential" therapeutic use refers to administration of at least two active ingredients at different times, the administration route being identical or different. More particularly, sequential use refers to the whole administration of one of the active ingredients before administration of the other or others commences. It is thus possible to administer one of the active ingredients over several minutes, hours, or days before administering the other active ingredient or ingredients. There is no simultaneous treatment in this case.

As used herein, the term "simultaneous" therapeutic use refers to the administration of at least two active ingredients by the same route and at the same time or at substantially the same time.

As used herein, "specifically binds" refers to a molecule (e.g., an antibody) which recognizes and binds another molecule (e.g., an antigen), but does not substantially recognize and bind other molecules. The terms "specific binding," "specifically binds to," or is "specific for" a particular molecule (e.g., an antigen, or an epitope on an antigen), as used herein, can be exhibited, for example, by a molecule having a $K_d$ for the molecule to which it binds to of about $10^{-4}$ M, $10^{-5}$ M, $10^{-6}$ M, $10^{-7}$ M, $10^{-8}$ M, $10^{-9}$ M, $10^{-10}$ M, $10^{-11}$ M, or $10^{-12}$ M.

As used herein, the terms "subject," "individual," or "patient" are used interchangeably and refer to an individual organism, a vertebrate, a mammal, or a human. In certain embodiments, the individual, patient or subject is a human.

As used herein, the term "therapeutic agent" is intended to mean a compound that, when present in an effective amount, produces a desired therapeutic effect on a subject in need thereof.

"Treating" or "treatment" as used herein covers the treatment of a disease or disorder described herein, in a subject, such as a human, and includes: (i) inhibiting a disease or disorder, i.e., arresting its development; (ii) relieving a disease or disorder, i.e., causing regression of the disorder; (iii) slowing progression of the disorder; and/or (iv) inhibiting, relieving, or slowing progression of one or more symptoms of the disease or disorder. By "treating a cancer" is meant that the symptoms associated with the cancer are, e.g., alleviated, reduced, cured, or placed in a state of remission.

It is also to be appreciated that the various modes of treatment of diseases as described herein are intended to mean "substantial," which includes total but also less than total treatment, and wherein some biologically or medically relevant result is achieved. The treatment may be a continuous prolonged treatment for a chronic disease or a single, or few time administrations for the treatment of an acute condition.

Those of skill in the art will appreciate that compounds of the present technology may exhibit the phenomena of tautomerism, conformational isomerism, geometric isomerism and/or stereoisomerism. As the formula drawings within the specification and claims can represent only one of the possible tautomeric, conformational isomeric, stereochemical or geometric isomeric forms, it should be understood that the present technology encompasses any tautomeric, conformational isomeric, stereochemical and/or geometric isomeric forms of the compounds having one or more of the utilities described herein, as well as mixtures of these various different forms.

"Tautomers" refers to isomeric forms of a compound that are in equilibrium with each other. The presence and concentrations of the isomeric forms will depend on the environment the compound is found in and may be different depending upon, for example, whether the compound is a solid or is in an organic or aqueous solution. For example, in aqueous solution, quinazolinones may exhibit the following isomeric forms, which are referred to as tautomers of each other:

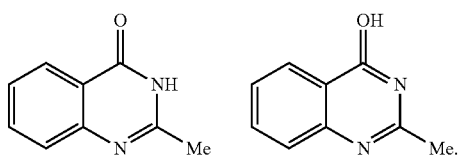

As another example, guanidines may exhibit the following isomeric forms in protic organic solution, also referred to as tautomers of each other:

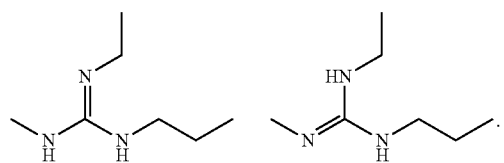

Because of the limits of representing compounds by structural formulas, it is to be understood that all chemical formulas of the compounds described herein represent all tautomeric forms of compounds and are within the scope of the present technology.

Stereoisomers of compounds (also known as optical isomers) include all chiral, diastereomeric, and racemic forms of a structure, unless the specific stereochemistry is expressly indicated. Thus, compounds used in the present technology include enriched or resolved optical isomers at any or all asymmetric atoms as are apparent from the depictions. Both racemic and diastereomeric mixtures, as well as the individual optical isomers can be isolated or synthesized so as to be substantially free of their enantiomeric or diastereomeric partners, and these stereoisomers are all within the scope of the present technology.

The compounds of the present technology may exist as solvates, especially hydrates. Hydrates may form during manufacture of the compounds or compositions comprising the compounds, or hydrates may form over time due to the hygroscopic nature of the compounds. Compounds of the present technology may exist as organic solvates as well, including DMF, ether, and alcohol solvates among others. The identification and preparation of any particular solvate is within the skill of the ordinary artisan of synthetic organic or medicinal chemistry.

Diagnostic Imaging Techniques

PET imaging provides medical practitioners with a robust and non-invasive method for imaging tissues and cells in a visual, quantitative, and reproducible way. When combined with anatomic imaging (e.g. CT), PET can become even more precise, with the PET images superimposed over an anatomical representation of the body in three dimensions. In this capacity $^{18}$F is the most commonly used isotope as it has superior resolution, and relatively fast decay, minimizing radiation exposure for both patient and personnel. Additionally, it can be produced relatively easily compared to other isotopes. While successfully incorporated into agents like $^{18}$FDG or $^{18}$FDOPA, $^{18}$F has not been successfully or routinely applied to antibodies or proteins.

Alternative PET imaging approaches, mostly use direct modification of an antibody with PET isotopes (e.g. $^{86}$Y, $^{124}$I, $^{89}$Zr, $^{64}$Cu, $^{68}$Ga), or SPECT isotopes (e.g. $^{131}$I, $^{99m}$TC, $^{111}$In). See Zeglis & Lewis, *Dalton Trans* 40, 6168-6195 (2011). Where others have been able to use two-step methods (preclinically) they have mostly been limited to inferior PET ($^{86}$Y, $^{64}$Cu) or SPECT ($^{177}$Lu) isotopes (see Cheal, S. M. et al. *Molecular Cancer Therapeutics* (2014); Cheal, S. M. et al. *Eur J Nucl Med Mol Imaging* 43, 925-937 (2016);

Zeglis, B. M. et al. *Mol Pharm* 12, 3575-3587 (2015)), or required a chemical modification of the targeting mAb (Meyer, J. P. et al. *Bioconjug Chem* 27, 298-301, (2016). Methods that necessitate chemical modification of the targeting agent can lead to possible variations between batches and reduced immunoreactivity or affinity (Meyer, J. P. et al. *Bioconjug Chem* 27, 298-301, (2016)).

Similar to PET imaging, fluorescent imaging provides medical practitioners with a non-invasive method of tissue mapping using near-infrared imaging. It is particularly relevant for the surgeons who want to remove all viable tumors in the surgical field, and whenever not surgically feasible, to direct intraoperative radiation therapy (IORT) for a total ablation. Fluorescence imaging allows for real-time imaging of tissues that shift during surgery and the observation of millimeter long post-resection/positive margin. For these applications, fluorescent imaging is superior to PET as it provides higher resolution in a surgical field and is useful along-side bright field imaging. Additionally, fluorescent tagging may be integrated into standard pathological analysis of resected tumor specimens (using tools such as fluorescent microscopy or flow cytometry) for more detailed histologic analysis.

Alternative pretargeted approaches using 18F failed to achieve low non-specific uptake in healthy tissues. Methods using click-chemistry showed substantial retention it the blood intestines and kidney at early time points, suggestive of non-specific binding to non-target tissues (Meyer, J. P. et al. *Bioconjug Chem* 27, 298-301, (2016)). Approaches using 18F labeling methods in a one-step format (no pre-targeting) without fluorescence resulted in high splenic and liver uptake (Roxin, A. et al. *Bioconjug Chem* 30, 1210-1219 (2019)).

Pretargeted Radioimmunotherapy (PRIT)

Pre-targeting is a multistep process that resolves the slow blood clearance of tumor targeting antibodies, which contributes to undesirable toxicity to normal tissues such as bone marrow. In pre-targeting, a radionuclide or other diagnostic or therapeutic agent is attached to a small hapten. A pre-targeting bispecific antibody, which has binding sites for the hapten as well as a target antigen, is administered first. Unbound antibody is then allowed to clear from circulation and the hapten is subsequently administered.

DOTA-PRIT has been used to effectively target a beta-emitting radioisotope (e.g., lutetium-177) to GD2- or GPA33-expressing human carcinoma xenografts, thus reducing toxicity to normal tissues such as bone marrow and kidney. Beta-particle emissions (e.g., from $^{177}$Lu-DOTA-Bn haptens) are considered to be low linear energy transfer, with a range of 1-10 nm and 0.1-1 MeV energy. DOTA-PRIT is optimally suited for targeting beta-particle emitting radioactive isotopes of lutetium and yttrium ($^{177}$Lu and $^{90}$Y, respectively) because anti-DOTA C825 (an anti-DOTA scFv) binds DOTA-complexes containing such radiolanthanides with pM affinity.

Compositions of the Present Technology

DOTA is a macrocyclic chelating agent that forms stable metal complexes that are irreversible under physiological conditions. DOTA has a molecular weight of 405 Daltons, and exhibits rapid diffusion and renal clearance. DOTA and its variants chelate a wide range of metals including paramagnetic metals and radionuclides. Exemplary metals include yttrium, indium, gallium, gadolinium, europium, terbium, lutetium, copper, bismuth, actinium and all lanthanide metals.

In one aspect, the present disclosure provides a compound of Formula I

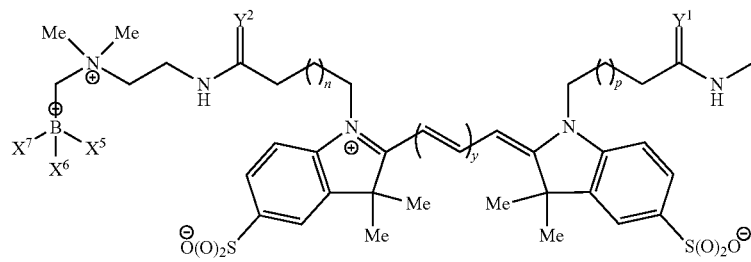
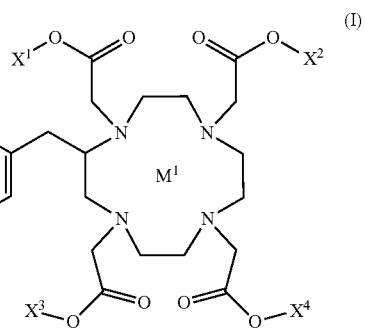

or a pharmaceutically acceptable salt thereof, wherein $X^1$, $X^2$, $X^3$, and $X^4$ are each independently a lone pair of electrons (i.e. providing an oxygen anion); $X^5$, $X^6$, and $X^7$ are each independently $^{18}$F or $^{19}$F; $Y^1$ and $Y^2$ are each independently O or S; n is 1, 2, 3, 4, 5, 6, 7, 8, 9, or 10; p is 1, 2, 3, 4, 5, 6, 7, 8, 9, or 10; and y is 1, 2, or 3.

In any embodiment herein, the compound of Formula I may be a compound according to Formula IA

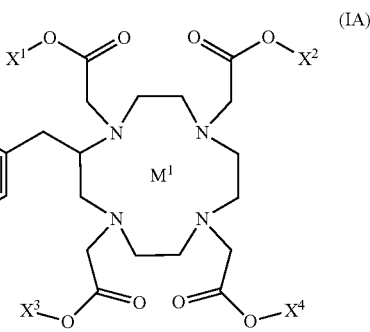
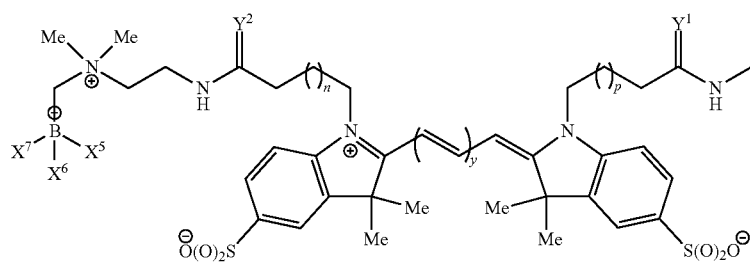

or a pharmaceutically acceptable salt thereof, wherein $M^1$ is $^{175}Lu^{3+}$, $^{177}Lu^{3+}$, $^{163}Tm^{3+}$, $^{165}Tm^{3+}$, $^{166}Tm^{3+}$, $^{168}Tm^{3+}$, $^{169}Tm^{3+}$, $^{170}Tm^{3+}$, $^{171}Tm^{3+}$, $^{172}Tm^{3+}$, $^{173}Tm^{3+}$, $^{165}Ho^{3+}$, $^{166}Ho^{3+}$, $^{167}Ho^{3+}$, $^{169}Er^{3+}$, $^{171}Er^{3+}$, $^{172}Er^{3+}$, $^{157}Dy^{3+}$, $^{155}Dy^{3+}$, $^{152}Dy^{3+}$, $^{153}Dy^{3+}$, $^{165}Dy^{3+}$, $^{166}Dy^{3+}$, $^{162}Dy^{3+}$, $^{163}Dy^{3+}$, $^{141}Pr^{3+}$, $^{142}Pr^{3+}$, $^{143}Pr^{3+}$, $^{145}Pr^{3+}$, $^{64}Cu^{3+}$, $^{67}Cu^{3+}$, $^{45}Sc^{3+}$, $^{69}Ga^{3+}$, $^{71}Ga^{3+}$, $^{86}Y^{3+}$, $^{89}Y^{3+}$, $^{90}Y^{3+}$, $^{113}In^{3+}$, $^{115}In^{3+}$, $^{139}La^{3+}$, $^{136}Ce^{3+}$, $^{138}Ce^{3+}$, $^{140}Ce^{3+}$, $^{142}Ce^{3+}$, $^{151}Eu^{3+}$, $^{153}Eu^{3+}$, $^{159}Tb^{3+}$, $^{154}Gd^{3+}$, $^{155}Gd^{3+}$, $^{156}Gd^{3+}$, $^{157}Gd^{3+}$, $^{158}Gd^{3+}$, or $^{160}Gd^{3+}$. In any embodiment herein, it may be that the compound is of Formula IA and $Y^1$ and $Y^2$ each independently are O. In any embodiment herein, it may be that the compound is of Formula IA and $M^1$ is $^{175}Lu^{3+}$ or $^{177}Lu^{3+}$.

In any embodiment herein, the compound of Formula I may be a compound according to Formula IB or Formula IC or a pharmaceutically acceptable salt thereof. In any embodiment herein, it may be that the compound is of Formula IB and $Y^1$ and $Y^2$ each independently are O. In any embodiment herein, it may be that the compound is of Formula IC and $Y^1$ and $Y^2$ each independently are O. In any embodiment herein, it may be that the compound is of Formula IC and $M^1$ is $^{175}Lu^{3+}$ or $^{177}Lu^{3+}$.

In any embodiment herein, it may be that at least two of $X^1$, $X^2$, $X^3$, and $X^4$ are each independently a lone pair of electrons. In any embodiment herein, it may be that three of $X^1$, $X^2$, $X^3$, and $X^4$ are each independently a lone pair of electrons and the remaining $X^1$, $X^2$, $X^3$, or $X^4$ is H.

In another aspect, the present disclosure provides a complex comprising a compound of Formula I (e.g., such as of Formula IA and/or of Formula IB and/or of Formula IC) and a multispecific (e.g., bispecific) antibody or antigen binding

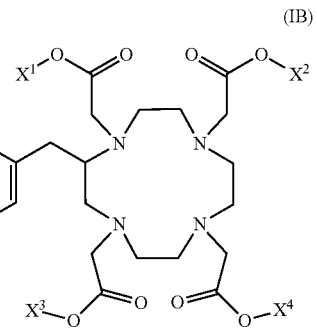
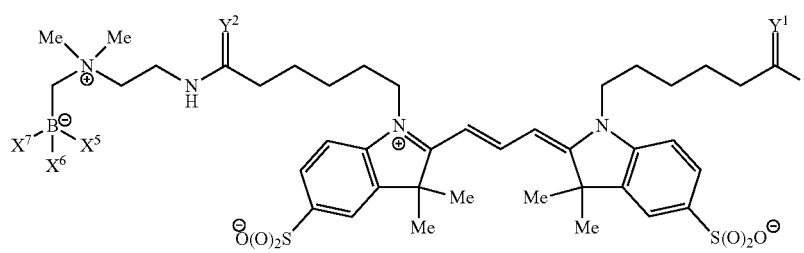

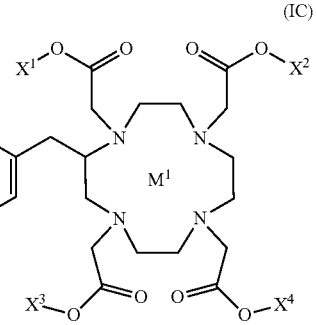
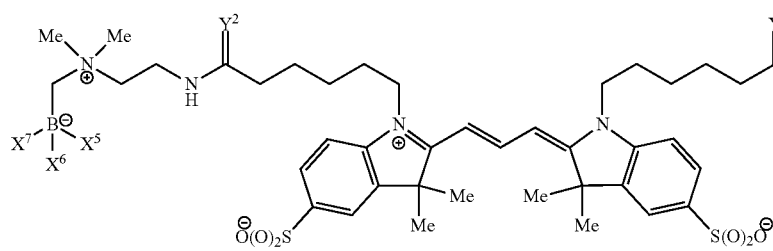

fragment thereof that recognizes and binds to the compound and an antigen target. The antigen target may be a tumor associated antigen, an immune cell antigen, a neuronal tissue antigen, a cardiac tissue antigen, a vascular tissue antigen, a fungal antigen, a bacterial antigen, or a viral antigen.

Examples of tumor associated antigens include, but are not limited to, Poly-sialic acid, GD3, STEAP1, GPA33, HER2/neu, GD2, MAGE-1, MAGE-3, BAGE, GAGE-1, GAGE-2, MUM-1, CDK4, N-acetylglucosaminyltransferase, p15, gp75, beta-catenin, ErbB2, cancer antigen 125 (CA-125), carcinoembryonic antigen (CEA), RAGE, MART (melanoma antigen), MUC-1, MUC-2, MUC-3, MUC-4, MUC-5ac, MUC-16, MUC-17, tyrosinase, Pmel 17 (gp100), GnT-V intron V sequence (N-acetylglucoaminyltransferase V intron V sequence), Prostate cancer psm, PRAME (melanoma antigen), β-catenin, EBNA (Epstein-Barr Virus nuclear antigen) 1-6, p53, lung resistance protein (LRP) Bcl-2, prostate specific antigen (PSA), Ki-67, CEACAM6, colon-specific antigen-p (CSAp), HLA-DR, CD40, CD74, CD138, EGFR, EGFRvIII, EGP-1, EGP-2, VEGF, PlGF, insulin-like growth factor (ILGF), tenascin, platelet-derived growth factor, IL-6, CD20, CD19, PSMA, CD33, CD123, MET, DLL3, DLL4, CD24, Ang-2, HER3, IGF-1R, CD30, TAG-72, SPEAP, CD45, L1-CAM, Lewis Y (Ley) antigen, E-cadherin, V-cadherin, and EpCAM.

Examples of immune cell antigens include, but are not limited to, CD2, CD3, CD4, CD8, CD14, CD15, CD16, CD19, CD20, CD24, CD25, CD32, CD56, CD64, CD123, TCR gamma/delta, NKp46, KIR, PD-1, PD-L1, and HLA-DR.

Examples of neuronal tissue antigens include, but are not limited to, N-methyl-d-aspartate (NMDA) receptors, α-amino-3-hydroxy-5-methyl-4-isoxazolepropionic acid (AMPA) receptors, γ-aminobutyric acid (GABA) receptors, leucine-rich glioma-inactivated protein 1, contactin-associated protein-like 2, a metabotropic glutamate receptor, glycine receptors, Amyloid beta, Neurofibrillary tangles, EGFR, EGFRvIII, B7H3, myelin-associated glycoprotein, CD56, and P/Q-type voltage-gated calcium channels.

Examples of cardiac tissue antigens include, but are not limited to, Oxidized low-density lipoprotein, Cardiac troponin, Creatinine kinase, and CK-MB Myoglobin.

Examples of vascular tissue antigens include, but are not limited to, inflammatory markers (e.g., C-reactive protein, Interleukin-6, Cellular adhesion molecules, Beta2-microglobulin, Monocyte chemoattractant protein-1, Soluble CD40 ligand, Myeloperoxidase, Neopterin, Osteoprotegerin, Tumor necrosis factor-alpha), thrombotic markers (e.g., Fibrinogen, D-dimer, von Willebrand factor, Tissue plasminogen activator, Plasminogen activator inhibitor), Lipoprotein metabolism markers (e.g., Lipoprotein-associated phospholipase A2, Lipoprotein(a)), Oxidative stress markers (e.g., Glutathione peroxidase 1, 8-iso-prostaglandin F2a, Vitamin C (L-ascorbic acid)), matrix remodeling markers (e.g., Matrix metalloproteinases and their inhibitors, Pregnancy-associated plasma phosphatase), angiogenesis markers (e.g., Vascular endothelial growth factor, Flt-1, Angiopoietin, Tie-1), Homocysteine and asymmetric dimethylarginine.

Examples of fungal antigens include, but are not limited to, *Aspergillus fumigatus, Aspergillus restrictus* Restrictocin, *Aspergillus giganteus* Alpha-Sarcin, *Aspergillus niger* Glucose oxidase, Pectolyase Y-23, HSP104, GLC8, thioredoxin reductase, TRX1, TRX2, glutathione reductase, ATP-sulfurylase/MET3, *S. cerevisiae* SUMO E1, ubiquitin, Aha1, alcohol dehydrogenase, Glutaredoxin 1, or *S. cerevisiae* Histone H2A.

Examples of viral antigens include antigens that are present in Adenovirus, Astrovirus, Cytomegalovirus, Feline Immunodeficiency Virus (FIV), Human Cytomegalovirus, Coronavirus, Coxsackie Virus, Dengue Virus, Epstein-Barr Virus, Enterovirus 71 Virus, Ebola Virus, Hantavirus, Hepatitis A Virus, Hepatitis B Virus, Hepatitis C Virus, Hepatitis D Virus, Hepatitis E Virus, Human Immunodeficiency Virus (HIV), Human Metapneumovirus, Human Papillomavirus, Human Rhinovirus, Human herpesvirus-8, Herpes Simplex Virus, Human T-lymphotropic Virus, Influenza Virus, Japanese Encephalitis Virus, Leukemia Virus, Measles Virus, Mumps Virus, Parvovirus, Rabies Virus, Respiratory Syncytial Virus, Rubella Virus, Rotavirus, Tick-Borne Encephalitis Virus, Varicella Zoster Virus, West Nile virus, and Zika virus.

Examples of bacterial antigens include antigens that are present in *Bacillus, Borrelia, Bordetella pertussis, Campylobacter jejuni, Chlamydophila pneumonia, Chlamydia trachomatis, Clostridium, Corynebacterium diphtheriae, Escherichia coli, Haemophilus influenzae, Helicobacter pylori, Legionella Pneumophila, Listeria monocytogenes, Mycobacterium, Pseudomonas aeruginosa, Salmonella, Staphylococcus, Streptococcus pneumonia, Treponema pallidum, Yersinia Enterocolitica, Klebsiella pneumonia, Neisseria gonorrhoeae,* and *Mycoplasma* pneumonia.

Additionally or alternatively, in some embodiments, the compound comprises a DOTA epitope and/or a cyanine epitope. In certain embodiments, the multispecific (e.g., bispecific) antibody or antigen binding fragment binds to the DOTA epitope or the cyanine epitope of the compound.

In any of the above embodiments of the complexes disclosed herein, the multispecific (e.g., bispecific) antibody or antigen binding fragment may be an infinite binder. In some embodiments, the multispecific (e.g., bispecific) antibody or antigen binding fragment comprises an antigen binding fragment of C825 (See Cheal et al., *Mol Cancer Ther.* 13(7):1803-12 (2014)) or 2D12.5 (Corneillie et al., *J. Inorganic Biochemistry* 100:882-890 (2006)). Additionally or alternatively, in any of the above embodiments of the complexes disclosed herein, the multispecific (e.g., bispecific) antibody or antigen binding fragment comprises an antigen binding fragment of C825 with a G54C substitution. Additionally or alternatively, in any of the above embodiments of the complexes disclosed herein, the multispecific (e.g., bispecific) antibody or antigen binding fragment comprises an antigen binding fragment of 2D12.5 with a G54C substitution.

In any of the above embodiments of the complexes disclosed herein, the multispecific (e.g., bispecific) antibody or antigen binding fragment binds to the compound with a $K_d$ that is lower than or equal to 100 nM-95 nM, 95-90 nM, 90-85 nM, 85-80 nM, 80-75 nM, 75-70 nM, 70-65 nM, 65-60 nM, 60-55 nM, 55-50 nM, 50-45 nM, 45-40 nM, 40-35 nM, 35-30 nM, 30-25 nM, 25-20 nM, 20-15 nM, 15-10 nM, 10-5 nM, 5-1 nM, 1 nM-950 pM, 950 pM-900 pM, 900 pM-850 pM, 850 pM-800 pM, 800 pM-750 pM, 750 pM-700 pM, 700 pM-650 pM, 650 pM-600 pM, 600 pM-550 pM, 550 pM-500 pM, 500 pM-450 pM, 450 pM-400 pM, 400 pM-350 pM, 350 pM-300 pM, 300 pM-250 pM, 250 pM-200 pM, 200 pM-150 pM, 150 pM-100 pM, 100 pM-50 pM, 50 pM-40 pM, 40 pM-30 pM, 30 pM-20 pM, 20 pM-10 pM, 9 pM, 8 pM, 7 pM, 6 pM, 5 pM, 4 pM, 3 pM, 2.5 pM, 2 pM, 1.5 pM, or 1 pM.

Diagnostic and Therapeutic Methods of the Present Technology

In one aspect, the present disclosure provides a method for detecting solid tumors in a subject in need thereof comprising (a) administering to the subject an effective amount of a complex comprising a compound of Formula I, Formula IA, Formula IB, or Formula IC, and a multispecific (e.g., bispecific) antibody or antigen binding fragment thereof that binds to the compound and a tumor associated antigen, wherein the complex is configured to localize to a solid tumor expressing the tumor associated antigen recognized by the multispecific (e.g., bispecific) antibody or antigen binding fragment of the complex; and (b) detecting the presence of solid tumors in the subject by detecting radioactive levels or fluorescence levels emitted by the complex that are higher than a reference value. In some embodiments, the subject is human. Additionally, the method further comprises determining the location and/or stage (e.g., Stage I, Stage II, Stage III, or Stage IV) of the solid tumors.

In one aspect, the present disclosure provides a method for determining surgical tissue margins in a subject comprising (a) administering to the subject an effective amount of a complex comprising a compound of Formula I, Formula IA, Formula IB, or Formula IC, and a multispecific (e.g., bispecific) antibody or antigen binding fragment thereof that binds to the compound and a tumor associated antigen, wherein the complex is configured to localize to a solid tumor expressing the tumor associated antigen recognized by the multispecific (e.g., bispecific) antibody or antigen binding fragment of the complex; and (b) determining surgical tissue margins in the subject by detecting radioactive levels or fluorescence levels emitted by the complex that are higher than a reference value. In some embodiments, the subject is human.

In another aspect, the present disclosure provides a method for selecting a subject for pretargeted radioimmunotherapy comprising (a) administering to the subject an effective amount of a complex comprising a compound of Formula I, Formula IA, Formula IB, or Formula IC, and a multispecific (e.g., bispecific) antibody or antigen binding fragment thereof that binds to the compound and a tumor associated antigen, wherein the complex is configured to localize to a solid tumor expressing the tumor associated antigen recognized by the multispecific (e.g., bispecific) antibody or antigen binding fragment of the complex; (b) detecting radioactive levels or fluorescence levels emitted by the complex; and (c) selecting the subject for pretargeted radioimmunotherapy when the radioactive levels or fluorescence levels emitted by the complex are higher than a reference value. In some embodiments, the subject is human.

In any of the preceding embodiments of the methods disclosed herein, the subject is diagnosed with, or is suspected of having cancer. The cancer may be breast cancer, colorectal cancer, cervical cancer, ovarian cancer, liver cancer, bladder cancer, hepatoma, hepatocellular carcinoma, brain cancer, lung cancer, gastric or stomach cancer, pancreatic cancer, thyroid cancer, kidney or renal cancer, prostate cancer, melanoma, sarcomas, carcinomas, Wilms tumor, endometrial cancer, glioblastoma, squamous cell cancer, astrocytomas, salivary gland carcinoma, vulvar cancer, penile carcinoma, and head-and-neck cancer. In certain embodiments, the brain cancer is a pituitary adenoma, a meningioma, a neuroblastoma, or a craniopharyngioma.

In another aspect, the present disclosure provides a method for detecting brain disease in a subject in need thereof comprising (a) administering to the subject an effective amount of a complex comprising a compound of Formula I, Formula IA, Formula IB, or Formula IC, and a multispecific (e.g., bispecific) antibody or antigen binding fragment thereof that binds to the compound and a neuronal tissue antigen, wherein the complex is configured to localize to a brain region expressing the neuronal tissue antigen recognized by the multispecific (e.g., bispecific) antibody or antigen binding fragment of the complex; and (b) detecting the presence of brain disease in the subject by detecting radioactive levels or fluorescence levels emitted by the complex that are higher than a reference value. Examples of brain disease include, but are not limited to, Alzheimer's disease, brain cancer or metastases, Parkinson's disease, depression, anxiety, encephalopathy, dementia, and stroke. In some embodiments, the subject is human.

In yet another aspect, the present disclosure provides a method for detecting cardiovascular disease in a subject in need thereof comprising (a) administering to the subject an effective amount of a complex comprising a compound of Formula I, Formula IA, Formula IB, or Formula IC, and a multispecific (e.g., bispecific) antibody or antigen binding fragment thereof that binds to the compound and a cardiac tissue antigen, wherein the complex is configured to localize to cardiac tissue expressing the cardiac tissue antigen recognized by the multispecific (e.g., bispecific) antibody or antigen binding fragment of the complex; and (b) detecting the presence of cardiovascular disease in the subject by detecting radioactive levels or fluorescence levels emitted by the complex that are higher than a reference value. Examples of cardiovascular disease include, but are not limited to, arteriosclerosis or atherosclerosis. In some embodiments, the subject is human.

In any and all embodiments of the methods disclosed herein, the radioactive levels emitted by the complex are detected using positron emission tomography or single photon emission computed tomography. Additionally or alternatively, in some embodiments of the methods disclosed herein, the fluorescence levels emitted by the complex are detected using fluorescent imaging.

In any and all embodiments of the methods disclosed herein, the complex is administered into the cerebral spinal fluid or blood of the subject. Additionally or alternatively, in some embodiments of the methods disclosed herein, the complex is administered intravenously, intramuscularly, intraarterially, intrathecally, intracapsularly, intraorbitally, intradermally, intraperitoneally, transtracheally, subcutaneously, intracerebroventricularly, orally or intranasally.

Additionally or alternatively, in some embodiments of the methods disclosed herein, the radioactive levels or fluorescence levels emitted by the complex are detected between 4 hours to 6 months after the complex is administered. In certain embodiments of the methods disclosed herein, the radioactive levels or fluorescence levels emitted by the complex are detected about 4 hours, about 6 hours, about 8 hours, about 12 hours, about 24 hours, about 48 hours, about 72 hours, about 96 hours, about 1 week, about 2 weeks, about 3 weeks, about 4 weeks, about 5 weeks, about 6 weeks, about 1 month, about 1.5 months, about 2 months, about 2.5 months, about 3 months, about 3.5 months, about 4 months, about 4.5 months, about 5 months, about 5.5 months, or about 6 months after the complex is administered.

Additionally or alternatively, in certain embodiments of the methods disclosed herein, the radioactive levels emitted by the complex are expressed as the percentage injected dose per gram tissue (% ID/g). The reference value may be calculated by measuring the radioactive levels or fluorescence levels present in non-tumor (normal) tissues, and computing the average radioactive levels or fluorescence levels present in non-tumor (normal) tissues±standard deviation. In some embodiments, the reference value is the standard uptake value (SUV). See Thie J A, *J Nucl Med.* 45(9):1431-4 (2004). In some embodiments, the ratio of radioactive levels or fluorescence levels between a tumor and normal tissue is about 2:1, 3:1, 4:1, 5:1, 6:1, 7:1, 8:1, 9:1, 10:1, 15:1, 20:1, 25:1, 30:1, 35:1, 40:1, 45:1, 50:1, 55:1, 60:1, 65:1, 70:1, 75:1, 80:1, 85:1, 90:1, 95:1 or 100:1.

In another aspect, the present disclosure provides a method for increasing tumor sensitivity to radiation therapy in a subject diagnosed with cancer comprising (a) administering an effective amount of an anti-DOTA or anti-cyanine multispecific (e.g., bispecific) antibody or antigen binding fragment thereof to the subject, wherein the anti-DOTA or anti-cyanine multispecific (e.g., bispecific) antibody or antigen binding fragment is configured to localize to a tumor expressing a tumor associated antigen; and (b) administering an effective amount of a compound of Formula I, Formula IA, Formula IB, or Formula IC to the subject, wherein the compound is configured to bind to the anti-DOTA or anti-cyanine multispecific (e.g., bispecific) antibody or antigen binding fragment. In some embodiments, the subject is human. The anti-DOTA or anti-cyanine multispecific (e.g., bispecific) antibody or antigen binding fragment is administered under conditions and for a period of time (e.g., according to a dosing regimen) sufficient for it to saturate tumor cells. In some embodiments, unbound anti-DOTA or anti-cyanine multispecific (e.g., bispecific) antibody or antigen binding fragment is removed from the blood stream after administration of the anti-DOTA or anti-cyanine multispecific (e.g., bispecific) antibody or antigen binding fragment. In some embodiments, the compound of Formula I, Formula IA, Formula IB, or Formula IC is administered after a time period that may be sufficient to permit clearance of unbound anti-DOTA or anti-cyanine multispecific (e.g., bispecific) antibody or antigen binding fragment.

The compound of Formula I, Formula IA, Formula IB, or Formula IC may be administered at any time between 1 minute to 4 or more days following administration of the anti-DOTA or anti-cyanine multispecific (e.g., bispecific) antibody or antigen binding fragment. For example, in some embodiments, the compound may be administered 1 minute, 2 minutes, 3 minutes, 4 minutes, 5 minutes, 10 minutes, 15 minutes, 20 minutes, 25 minutes, 30 minutes, 35 minutes, 40 minutes, 45 minutes, 50 minutes, 55 minutes, 1 hour, 1.25 hours, 1.5 hours, 1.75 hours, 2 hours, 2.5 hours, 3 hours, 3.5 hours, 4 hours, 4.5 hours, 5 hours, 5.5 hours, 6 hours, 6.5 hours, 7 hours, 7.5 hours, 8 hours, 8.5 hours, 9 hours, 9.5 hours, 10 hours, 11 hours, 12 hours, 13 hours, 14 hours, 15 hours, 16 hours, 17 hours, 18 hours, 19 hours, 20 hours, 21 hours, 22 hours, 23 hours, 24 hours, 48 hours, 72 hours, 96 hours, or any range therein, following administration of the anti-DOTA or anti-cyanine multispecific (e.g., bispecific) antibody or antigen binding fragment. Alternatively, the compound may be administered at any time after 4 or more days following administration of the anti-DOTA or anti-cyanine multispecific (e.g., bispecific) antibody or antigen binding fragment.

Additionally or alternatively, in some embodiments, the method further comprises administering an effective amount of a clearing agent to the subject prior to administration of the compound of Formula I, Formula IA, Formula IB, or Formula IC. In some embodiments, the clearing agent is no more than 2000 kD, 1500 kD, 1000 kD, 900 kD, 800 kD, 700 kD, 600 kD, 500 kD, 400 kD, 300 kD, 200 kD, 100 kD, 90 kD, 80 kD, 70 kD, 60 kD, 50 kD, 40 kD, 30 kD, 20 kD, 10 kD, or 5 kD. A clearing agent can be any molecule (dextran or dendrimer or polymer) that can be conjugated with C825-hapten or a hapten that specifically binds to an anti-cyanine antibody. See U.S. Pat. No. 6,908,903, Orcutt et al., *Mol Cancer Ther.* 11(6):1365-72 (2012), Rossin et al., *J Nucl Med.* 54(11):1989-95 (2013)). In some embodiments, the clearing agent is a 500 kD aminodextran-DOTA conjugate (e.g., 500 kD dextran-DOTA-Bn (Y), 500 kD dextran-DOTA-Bn (Lu), or 500 kD dextran-DOTA-Bn (In) etc.), glycodendrimer-based clearing agent (CA), α-thio-N-acetylgalactosamine-16-DOTA-$Y^{3+}$, galactose-albumin-DOTA-$Y^{3+}$, or polystyrene beads coated with DOTA-$Y^{3+}$-conjugated albumin.

In some embodiments, the clearing agent and the compound of Formula I, Formula IA, Formula IB, or Formula IC are administered without further administration of the anti-DOTA or anti-cyanine multispecific (e.g., bispecific) antibody or antigen binding fragment. For example, in some embodiments, an anti-DOTA or anti-cyanine multispecific (e.g., bispecific) antibody or antigen binding fragment is administered according to a regimen that includes at least one cycle of: (i) administration of the anti-DOTA or anti-cyanine multispecific (e.g., bispecific) antibody or antigen binding fragment (optionally so that relevant tumor cells are saturated); (ii) administration of a compound of Formula I, Formula IA, Formula IB, or Formula IC and, optionally a clearing agent; (iii) optional additional administration of a compound of Formula I, Formula IA, Formula IB, or Formula IC and/or the clearing agent, without additional administration of the anti-DOTA or anti-cyanine multispecific (e.g., bispecific) antibody or antigen binding fragment. In some embodiments, the method may comprise multiple such cycles (e.g., 1, 2, 3, 4, 5, 6, 7, 8, 9, 10 or more cycles).

Additionally or alternatively, in some embodiments of the method, the anti-DOTA or anti-cyanine multispecific (e.g., bispecific) antibody or antigen binding fragment and/or the compound of Formula I, Formula IA, Formula IB, or Formula IC is administered intravenously, intramuscularly, intraarterially, intrathecally, intracapsularly, intraorbitally, intradermally, intraperitoneally, transtracheally, subcutaneously, intracerebroventricularly, orally or intranasally.

In one aspect, the present disclosure provides a method for increasing tumor sensitivity to radiation therapy in a subject diagnosed with cancer comprising administering to the subject an effective amount of a complex comprising a compound of Formula I, Formula IA, Formula IB, or Formula IC and a multispecific (e.g., bispecific) antibody or antigen binding fragment thereof that recognizes and binds to the compound and a tumor associated antigen, wherein the complex is configured to localize to a tumor expressing the tumor associated antigen recognized by the multispecific (e.g., bispecific) antibody or antigen binding fragment of the complex. The complex may be administered intravenously, intramuscularly, intraarterially, intrathecally, intracapsularly, intraorbitally, intradermally, intraperitoneally, transtracheally, subcutaneously, intracerebroventricularly, orally or intranasally. In some embodiments, the subject is human.

In another aspect, the present disclosure provides a method for treating cancer in a subject in need thereof comprising (a) administering an effective amount of an anti-DOTA or anti-cyanine multispecific (e.g., bispecific) antibody or antigen binding fragment thereof to the subject, wherein the anti-DOTA or anti-cyanine multispecific (e.g., bispecific) antibody or antigen binding fragment is configured to localize to a tumor expressing a tumor associated antigen; and (b) administering an effective amount of a compound of Formula I, Formula IA, Formula IB, or Formula IC to the subject, wherein the compound is configured to bind to the anti-DOTA or anti-cyanine multispecific (e.g., bispecific) antibody or antigen binding fragment. The anti-DOTA or anti-cyanine multispecific (e.g., bispecific) antibody or antigen binding fragment is administered under conditions and for a period of time (e.g., according to a dosing regimen) sufficient for it to saturate tumor cells. In some embodiments, unbound anti-DOTA or anti-cyanine multispecific (e.g., bispecific) antibody or antigen binding fragment is removed from the blood stream after administration of the anti-DOTA or anti-cyanine multispecific (e.g., bispecific) antibody or antigen binding fragment. In some embodiments, the compound of Formula I, Formula IA, Formula IB, or Formula IC is administered after a time period that may be sufficient to permit clearance of unbound anti-DOTA or anti-cyanine multispecific (e.g., bispecific) antibody or antigen binding fragment. In some embodiments, the subject is human.

Accordingly, in some embodiments, the method further comprises administering an effective amount of a clearing agent to the subject prior to administration of the compound of Formula I, Formula IA, Formula IB, or Formula IC. The compound may be administered at any time between 1 minute to 4 or more days following administration of the anti-DOTA or anti-cyanine multispecific (e.g., bispecific) antibody or antigen binding fragment. For example, in some embodiments, the compound of Formula I, Formula IA, Formula IB, or Formula IC may be administered 1 minute, 2 minutes, 3 minutes, 4 minutes, 5 minutes, 10 minutes, 15 minutes, 20 minutes, 25 minutes, 30 minutes, 35 minutes, 40 minutes, 45 minutes, 50 minutes, 55 minutes, 1 hour, 1.25 hours, 1.5 hours, 1.75 hours, 2 hours, 2.5 hours, 3 hours, 3.5 hours, 4 hours, 4.5 hours, 5 hours, 5.5 hours, 6 hours, 6.5 hours, 7 hours, 7.5 hours, 8 hours, 8.5 hours, 9 hours, 9.5 hours, 10 hours, 11 hours, 12 hours, 13 hours, 14 hours, 15 hours, 16 hours, 17 hours, 18 hours, 19 hours, 20 hours, 21 hours, 22 hours, 23 hours, 24 hours, 48 hours, 72 hours, 96 hours, or any range therein, following administration of the anti-DOTA or anti-cyanine multispecific (e.g., bispecific) antibody or antigen binding fragment. Alternatively, the compound of Formula I, Formula IA, Formula IB, or Formula IC may be administered at any time after 4 or more days following administration of the anti-DOTA or anti-cyanine multispecific (e.g., bispecific) antibody or antigen binding fragment.

In some embodiments, the clearing agent and a compound of Formula I, Formula IA, Formula IB, or Formula IC are administered without further administration of the anti-DOTA or anti-cyanine multispecific (e.g., bispecific) antibody or antigen binding fragment. For example, in some embodiments, an anti-DOTA or anti-cyanine multispecific (e.g., bispecific) antibody or antigen binding fragment is administered according to a regimen that includes at least one cycle of: (i) administration of the anti-DOTA or anti-cyanine multispecific (e.g., bispecific) antibody or antigen binding fragment (optionally so that relevant tumor cells are saturated); (ii) administration of a compound of Formula I, Formula IA, Formula IB, or Formula IC and, optionally a clearing agent; (iii) optional additional administration of a compound of Formula I, Formula IA, Formula IB, or Formula IC and/or the clearing agent, without additional administration of the anti-DOTA or anti-cyanine multispecific (e.g., bispecific) antibody or antigen binding fragment. In some embodiments, the method may comprise multiple such cycles (e.g., 1, 2, 3, 4, 5, 6, 7, 8, 9, 10 or more cycles). The clearing agent may be a 500 kD aminodextran-DOTA conjugate (e.g., 500 kD dextran-DOTA-Bn (Y), 500 kD dextran-DOTA-Bn (Lu), or 500 kD dextran-DOTA-Bn (In) etc.), a glycodendrimer-based clearing agent (CA), α-thio-N-acetylgalactosamine-16-DOTA-$Y^{3+}$ galactose-albumin-DOTA-$Y^{3+}$, or a polystyrene bead coated with DOTA-$Y^{3+}$-conjugated albumin.

Also provided herein are methods for treating cancer in a subject in need thereof comprising administering to the subject an effective amount of a complex comprising a compound of Formula I, Formula IA, Formula IB, or Formula IC and a multispecific (e.g., bispecific) antibody or antigen binding fragment thereof that recognizes and binds to the compound of Formula I, Formula IA, Formula IB, or Formula IC and a tumor associated antigen, wherein the complex is configured to localize to a tumor expressing the tumor associated antigen recognized by the multispecific (e.g., bispecific) antibody or antigen binding fragment of the complex. The therapeutic effectiveness of such a complex may be determined by computing the area under the curve (AUC) tumor: AUC normal tissue ratio. In some embodiments, the complex has a AUC tumor: AUC normal tissue ratio of about 2:1, 3:1, 4:1, 5:1, 6:1, 7:1, 8:1, 9:1, 10:1, 15:1, 20:1, 25:1, 30:1, 35:1, 40:1, 45:1, 50:1, 55:1, 60:1, 65:1, 70:1, 75:1, 80:1, 85:1, 90:1, 95:1 or 100:1.

The methods for treating cancer may further comprise sequentially, separately, or simultaneously administering to the subject at least one additional therapeutic agent, such as chemotherapeutic agents and/or immune checkpoint inhibitors. Examples of chemotherapeutic agents include, but are not limited to, nitrogen mustards, ethylenimine derivatives, alkyl sulfonates, nitrosoureas, gemcitabine, triazenes, folic acid analogs, anthracyclines, taxanes, COX-2 inhibitors, topoisomerase inhibitors, pyrimidine analogs, purine analogs, antibiotics, enzyme inhibitors, epipodophyllotoxins, platinum coordination complexes, vinca alkaloids, substituted ureas, methyl hydrazine derivatives, adrenocortical suppressants, hormone antagonists, endostatin, taxols, camptothecins, SN-38, doxorubicin, doxorubicin analogs, antimetabolites, alkylating agents, antimitotics, anti-angiogenic agents, tyrosine kinase inhibitors, mTOR inhibitors, heat shock protein (HSP90) inhibitors, proteosome inhibitors, HDAC inhibitors, pro-apoptotic agents, methotrexate and CPT-11.

Examples of immune checkpoint inhibitors include immuno-modulating/stimulating antibodies such as an anti-PD-1 antibody, an anti-PD-L1 antibody, an anti-PD-L2 antibody, an anti-CTLA-4 antibody, an anti-TIM3 antibody, an anti-4-1BB antibody, an anti-CD73 antibody, an anti-GITR antibody, an anti-B7-H3 antibody, an anti-B7-H4 antibody, an anti-TIGIT antibody, an anti-CD80 antibody, an anti-CD86 antibody, an anti-ICOS antibody, an anti-BTLA antibody, and an anti-LAG-3 antibody. Specific immune checkpoint inhibitors include ipilimumab, nivolumab, pidilizumab, lambrolizumab, pembrolizumab, atezolizumab, avelumab, durvalumab, MPDL3280A, BMS-936559, MEDI-4736, MSB 00107180, AMP-224, MDX-1105, arelumab, tremelimumab, IMP321, MGA271, BMS-986016, lirilumab, urelumab, PF-05082566, IPH2101, MEDI-6469, CP-870,893, Mogamulizumab, Varlilumab, Galiximab, AMP-514, AUNP 12, Indoximod, NLG-919, INCB024360, DLBCL inhibitors, and any combination thereof.

In any and all embodiments of the methods disclosed herein, the tumor associated antigen is selected from the group consisting of Poly-sialic acid, GD3, STEAP1, GPA33, HER2/neu, GD2, MAGE-1, MAGE-3, BAGE, GAGE-1, GAGE-2, MUM-1, CDK4, N-acetylglucosaminyltransferase, p15, gp75, beta-catenin, ErbB2, cancer antigen 125 (CA-125), carcinoembryonic antigen (CEA), RAGE, MART (melanoma antigen), MUC-1, MUC-2, MUC-3, MUC-4, MUC-5ac, MUC-16, MUC-17, tyrosinase, Pmel 17

(gp100), GnT-V intron V sequence (N-acetylglucoaminyl-transferase V intron V sequence), Prostate cancer psm, PRAME (melanoma antigen), β-catenin, EBNA (Epstein-Barr Virus nuclear antigen) 1-6, p53, lung resistance protein (LRP) Bcl-2, prostate specific antigen (PSA), Ki-67, CEACAM6, colon-specific antigen-p (CSAp), HLA-DR, CD40, CD74, CD138, EGFR, EGFRvIII, EGP-1, EGP-2, VEGF, PlGF, insulin-like growth factor (ILGF), tenascin, platelet-derived growth factor, IL-6, CD20, CD19, PSMA, CD33, CD123, MET, DLL3, DLL4, CD24, Ang-2, HER3, IGF-1R, CD30, TAG-72, SPEAP, CD45, L1-CAM, Lewis Y (Ley) antigen, E-cadherin, V-cadherin, and EpCAM.

In another aspect, the present disclosure provides a method for determining the efficacy of an anticancer therapy in a subject in need thereof comprising: (a) administering to the subject a complex comprising a compound of Formula I, Formula IA, Formula IB, or Formula IC, and a multispecific (e.g., bispecific) antibody or antigen binding fragment thereof that binds to the compound and a tumor associated antigen at a first time point after the subject has received the anticancer therapy, wherein the complex is configured to localize to a solid tumor expressing the tumor associated antigen recognized by the multispecific (e.g., bispecific) antibody or antigen binding fragment of the complex; (b) detecting radioactive levels or fluorescence levels emitted by the complex at the first time point; (c) administering the complex to the subject at a second time point following step (b); and (d) detecting radioactive levels or fluorescence levels emitted by the complex at the second time point, wherein the anticancer therapy is effective when the radioactive levels or fluorescence levels emitted by the complex at the second time point are reduced compared to the first time point.

Examples of anticancer therapy include the compound of Formula I, Formula IA, Formula IB, or Formula IC, as well as chemotherapy, radiation therapy and surgery. Examples of chemotherapeutic agents include, but are not limited to, nitrogen mustards, ethylenimine derivatives, alkyl sulfonates, nitrosoureas, gemcitabine, triazenes, folic acid analogs, anthracyclines, taxanes, COX-2 inhibitors, topoisomerase inhibitors, pyrimidine analogs, purine analogs, antibiotics, enzyme inhibitors, epipodophyllotoxins, platinum coordination complexes, vinca alkaloids, substituted ureas, methyl hydrazine derivatives, adrenocortical suppressants, hormone antagonists, endostatin, taxols, camptothecins, SN-38, doxorubicin, doxorubicin analogs, antimetabolites, alkylating agents, antimitotics, anti-angiogenic agents, tyrosine kinase inhibitors, mTOR inhibitors, heat shock protein (HSP90) inhibitors, proteosome inhibitors, HDAC inhibitors, pro-apoptotic agents, methotrexate and CPT-11.

In another aspect, the present disclosure provides a method for monitoring cancer progression in a subject in need thereof comprising: (a) administering to the subject a complex comprising a compound of Formula I, Formula IA, Formula IB, or Formula IC, and a multispecific (e.g., bispecific) antibody or antigen binding fragment thereof that binds to the compound and a tumor associated antigen at a first time point, wherein the complex is configured to localize to a solid tumor expressing the tumor associated antigen recognized by the multispecific (e.g., bispecific) antibody or antigen binding fragment of the complex; (b) detecting radioactive levels or fluorescence levels emitted by the complex at the first time point; (c) administering the complex to the subject at a second time point following step (b); and (d) detecting radioactive levels or fluorescence levels emitted by the complex at the second time point, wherein the cancer has metastasized or progressed when the radioactive levels or fluorescence levels emitted by the complex at the second time point are elevated compared to the first time point.

In any and all embodiments of the methods disclosed herein, the cancer is breast cancer, colorectal cancer, cervical cancer, ovarian cancer, liver cancer, bladder cancer, hepatoma, hepatocellular carcinoma, brain cancer, lung cancer, gastric or stomach cancer, pancreatic cancer, thyroid cancer, kidney or renal cancer, prostate cancer, melanoma, sarcomas, carcinomas, Wilms tumor, endometrial cancer, glioblastoma, squamous cell cancer, astrocytomas, salivary gland carcinoma, vulvar cancer, penile carcinoma, or head-and-neck cancer. In certain embodiments, the brain cancer is a pituitary adenoma, a meningioma, a neuroblastoma, or a craniopharyngioma. Additionally or alternatively, in some embodiments, the subject is human.

Kits

The present technology provides kits containing components suitable for treating, detecting, visualizing and/or monitoring a disease disclosed herein (e.g., cancer, brain disease, cardiovascular disease) in a patient. In one aspect, the kits comprise a [F]CyD compound of the present technology (e.g., Formula I, Formula IA, Formula IB, or Formula IC), and instructions for using the same to treat, detect, visualize and/or monitor a disease disclosed herein (e.g., cancer, brain disease, cardiac disease). The kits may further comprise at least one anti-DOTA or anti-cyanine multispecific antibody (e.g., a BsAb) or antigen binding fragment, and/or a clearing agent (e.g., 500 kDa aminodextran conjugated to DOTA, 500 kD dextran-DOTA-Bn (Y), glycodendrimer-based clearing agent (CA), α-thio-N-acetylgalactosamine-16-DOTA-$Y^{3+}$, galactose-albumin-DOTA-$Y^{3+}$, polystyrene beads coated with DOTA-$Y^{3+}$-conjugated albumin) and/or one or more radionuclides.

Additionally or alternatively, in some embodiments, the at least one anti-DOTA or anti-cyanine multispecific antibody (e.g., a BsAb) or antigen binding fragment binds to a tumor associated antigen, an immune cell antigen, a neuronal tissue antigen, a cardiac tissue antigen, a vascular tissue antigen, a fungal antigen, a bacterial antigen, or a viral antigen.

In certain embodiments, the at least one anti-DOTA or anti-cyanine multispecific antibody (e.g., a BsAb) or antigen binding fragment binds to a tumor associated antigen selected from the group consisting of Poly-sialic acid, GD3, STEAP1, GPA33, HER2/neu, GD2, MAGE-1, MAGE-3, BAGE, GAGE-1, GAGE-2, MUM-1, CDK4, N-acetylglucosaminyltransferase, p15, gp75, beta-catenin, ErbB2, cancer antigen 125 (CA-125), carcinoembryonic antigen (CEA), RAGE, MART (melanoma antigen), MUC-1, MUC-2, MUC-3, MUC-4, MUC-5ac, MUC-16, MUC-17, tyrosinase, Pmel 17 (gp100), GnT-V intron V sequence (N-acetylglucoaminyltransferase V intron V sequence), Prostate cancer psm, PRAME (melanoma antigen), β-catenin, EBNA (Epstein-Barr Virus nuclear antigen) 1-6, p53, lung resistance protein (LRP) Bcl-2, prostate specific antigen (PSA), Ki-67, CEACAM6, colon-specific antigen-p (CSAp), HLA-DR, CD40, CD74, CD138, EGFR, EGFRvIII, EGP-1, EGP-2, VEGF, PlGF, insulin-like growth factor (ILGF), tenascin, platelet-derived growth factor, IL-6, CD20, CD19, PSMA, CD33, CD123, MET, DLL3, DLL4, CD24, Ang-2, HER3, IGF-1R, CD30, TAG-72, SPEAP, CD45, L1-CAM, Lewis Y (Ley) antigen, E-cadherin, V-cadherin, and EpCAM.

In certain embodiments, the at least one anti-DOTA or anti-cyanine multispecific antibody (e.g., a BsAb) or antigen binding fragment binds to a neuronal tissue antigen selected from the group consisting of a N-methyl-D-aspartate (NMDA) receptor, an α-amino-3-hydroxy-5-methyl-4-isoxazolepropionic acid (AMPA) receptor, a γ-aminobutyric acid (GABA) receptor, leucine-rich glioma-inactivated protein 1, contactin-associated protein-like 2, a metabotropic glutamate receptor, a glycine receptor, Amyloid beta, a Neurofibrillary tangle, EGFR, EGFRvIII, B7H3, myelin-associated glycoprotein, CD56, and a P/Q-type voltage-gated calcium channel.

In other embodiments, the at least one anti-DOTA or anti-cyanine multispecific antibody (e.g., a BsAb) or antigen binding fragment binds to a cardiac tissue antigen selected from the group consisting of Oxidized low-density lipoprotein, Cardiac troponin, Creatinine kinase, and CK-MB Myoglobin.

In some embodiments, the at least one anti-DOTA or anti-cyanine multispecific antibody (e.g., a BsAb) or antigen binding fragment binds to a vascular tissue antigen selected from the group consisting of inflammatory markers (e.g., C-reactive protein, Interleukin-6, Cellular adhesion molecules, Beta2-microglobulin, Monocyte chemoattractant protein-1, Soluble CD40 ligand, Myeloperoxidase, Neopterin, Osteoprotegerin, Tumor necrosis factor-alpha), thrombotic markers (e.g., Fibrinogen, D-dimer, von Willebrand factor, Tissue plasminogen activator, Plasminogen activator inhibitor), Lipoprotein metabolism markers (e.g., Lipoprotein-associated phospholipase A2, Lipoprotein(a)), Oxidative stress markers (e.g., Glutathione peroxidase 1, 8-isoprostaglandin F2a, Vitamin C (L-ascorbic acid)), matrix remodeling markers (e.g., Matrix metalloproteinases and their inhibitors, Pregnancy-associated plasma phosphatase), angiogenesis markers (e.g., Vascular endothelial growth factor, Flt-1, Angiopoietin, Tie-1), Homocysteine and asymmetric dimethylarginine.

The at least one anti-DOTA or anti-cyanine multispecific antibody (e.g., a BsAb) or antigen binding fragment may be provided in the form of a prefilled syringe or autoinjection pen containing a sterile, liquid formulation or lyophilized preparation of the antibody (e.g., Kivitz et al., *Clin. Ther.* 28:1619-29 (2006)).

Additionally or alternatively, in some embodiments of the kits of the present technology, the one or more radionuclides are selected from among is $^{175}Lu^{3+}$, $^{177}Lu^{3+}$, $^{163}Tm^{3+}$, $^{165}Tm^{3+}$, $^{166}Tm^{3+}$, $^{168}Tm^{3+}$, $^{169}Tm^{3+}$, $^{170}Tm^{3+}$, $^{171}Tm^{3+}$, $^{172}Tm^{3+}$, $^{173}Tm^{3+}$, $^{165}Ho^{3+}$, $^{166}Ho^{3+}$, $^{167}Ho^{3+}$, $^{169}Er^{3+}$, $^{171}Er^{3+}$, $^{172}Er^{3+}$, $^{157}Dy^{3+}$, $^{155}Dy^{3+}$, $^{152}Dy^{3+}$, $^{153}Dy^{3+}$, $^{165}Dy^{3+}$, $^{166}Dy^{3+}$, $^{162}Dy^{3+}$, $^{163}Dy^{3+}$, $^{141}Pr^{3+}$, $^{142}Pr^{3+}$, $^{143}Pr^{3+}$, $^{145}Pr^{3+}$, $^{64}Cu^{3+}$, $^{67}Cu^{3+}$, $^{45}Sc^{3+}$, $^{69}Ga^{3+}$, $^{71}Ga^{3+}$, $^{86}Y^{3+}$, $^{89}Y^{3+}$, $^{90}Y^{3+}$, $^{113}In^{3+}$, $^{115}In^{3+}$, $^{139}La^{3+}$, $^{136}Ce^{3+}$, $^{138}Ce^{3+}$, $^{140}Ce^{3+}$, $^{142}Ce^{3+}$, $^{151}Eu^{3+}$, $^{153}Eu^{3+}$, $^{159}Tb^{3}$, $^{154}Gd^{3+}$, $^{155}Gd^{3+}$, $^{156}Gd^{3+}$, $^{157}Gd^{3+}$, $^{158}Gd^{3+}$, or $^{160}Gd^{3+}$.

If the kit components are not formulated for oral administration, a device capable of delivering the kit components through some other route may be included. Examples of such devices include syringes (for parenteral administration) or inhalation devices. The kit components may be packaged together or separated into two or more containers. In some embodiments, the containers may be vials that contain sterile, lyophilized formulations of a [F]CyD compound of the present technology (e.g., Formula I, Formula IA, Formula IB, or Formula IC), and/or an anti-DOTA or anti-cyanine multispecific antibody (e.g., a BsAb) or antigen binding fragment composition that are suitable for reconstitution. A kit may also contain one or more buffers suitable for reconstitution and/or dilution of other reagents. Other containers that may be used include, but are not limited to, a pouch, tray, box, tube, or the like. Kit components may be packaged and maintained sterilely within the containers.

EXAMPLES

Example 1: Utility of a Multimodal Small Molecule for Pretargeted Fluorescence, PET and Radioimmunotherapy FIG. 1 shows several examples of the utility of a multi-modality small molecule such as [F]Cy3D. Through pretargeting with multispecific antibodies, the therapeutics with binding against DOTA[metal] or BnDOTA[metal], [F]Cy3D [metal] can be targeted directly to any cell of interest. [F]Cy3D can easily be labeled with $^{18F}$ through isotope exchange, providing the opportunity to image the targeted cells by PET ([$^{18}$F]Cy3D). In addition, as a precursor the [F]Cy3D has inherent fluorescence in the Cy3 channel, providing the options to guide surgery, determine disease margins, or identify metastases. Finally the BnDOTA arm can be filled with a radiometal such as $^{177}$Lu, $^{90}$Y or others, to emit therapeutic doses of radiation to the targeted cells ([F]Cy3D[$^{177}$Lu]).

Example 2: Representative Synthesis of Compounds of the Present Technology: [F]Cy3D and [$^{18}$F]Cy3D FIG. 2 shows a representative chemical synthesis of the [F]Cy3D, both as the [$^{19}$F]Cy3D (Compound 6) precursor and PET probe [$^{18}$F]Cy3D ([$^{18}$F]-Compound 6) for imaging. The listed chemicals where were purchased from ACROS, Aldrich, Combi-blocks, TCI or Alfa Aesar, with the exception that S-2-(4-Aminobenzyl)-1,4,7,10-tetraazacyclododecane tetra-tert-butylacetate (compound 2), was purchased from Macrocyclics (p-NH$_2$-Bn-DOTA-tetra(tBu ester), Cat No. B201, CAS No. 446061-19-4) and sterile, endotoxin and mycoplasma free, isotonic, 1×PBS was purchased from Sigma Aldrich (St. Louis, MO) (pH 7.4±0.1, Corning Cellgro 21-040-CM). Analytical, reverse phase UPLC-MS were performed on a Waters Acquity H class HPLC/SQD2 mass spectrometer and a Phenomenex Kinetex 1.7 μm C18 100 Å, 50 cm×2.1 mm I.D. column (00B-4475-AN), with a 1.5 min, a 10-90% H$_2$O:Acetonitrile (ACN) (0.05% TFA) gradient and a flow rate of 0.6 mL/min (unless stated otherwise). Preparative HPLC was performed on a Agilent 1260 Series HPLC equipped with a Phenomenex Luna C18(2) 100 Å, 250 cm×21.20 mm I.D. 10 m reverse phase column (00G-4253-P0 AX), with a 20 min, a 10-90% H$_2$O:ACN (0.05% TFA) gradient and a flow rate of 12 mL/min. Purity of radiolabeling was determined on a Varian Reverse phase HPLC, using an Waters Sunfire™ C18 3.5 μm 4.6×50 mm column (186002551), an attached radio detector, and a 10-90% H$_2$O:ACN (0.05% TFA) elution gradient and a flow rate of 2 mL/min. $^{1}$H, $^{13}$C, and $^{19}$F-NMR were performed on a 500 MHz Bruker spectrometer. Thermo Scientific 5 mL React-Vial #13223 was used for fluoride concentration.

To a solution of CY3.18.OH (Compound 1), (24 mg, 33 μmol, CAS No. 146397-17-3, synthesis adapted from Mujumdar et al., 1993), in 4 mL of dry DMF, in an oven dried 5 mL round bottom flask, p-NH$_2$-Bn-DOTA-tetra(t-Bu ester) (Compound 2), (28 mg, 33 μmol), 1-Hydroxybenzotriazole (13 mg, 100 μmols) and 6 μL pyridine was added before condensation was started with N-3(-dimethylaminopropyl)-N'-ethyl carbodiimide hydrochloride (EDC.HCl) (25 mg, 133 μmols, Fluka 03450). The reaction was allowed to proceed for 5 hours at RT under magnetic stirring under nitrogen atmosphere, after which a new peak corresponding to mono-substituted Cy3-BnDOTA (Compound 3) was observed by UPLC/MS.

At 5 hours, 2-(dimethylamino)ethylamine (5.8 mg, 66 µmol) and additional EDC.HCl (13 mg, 133 µmols) was added to the rbf and the reaction was allowed to proceed for 4 more hours at 28° C. The resulting solution was diluted with DMF (5 mL) and the mixture was loaded onto a preparative HPLC column. (OtBu)DOTA-Cy3-tert-Amine (Compound 4) was isolated using a $H_2O$:ACN (0.05% TFA), 50 min elution gradient at a flow rate of 12 mL/min. A linear gradient of increasing ACN from 10% to 80% between 0 to 40 min, followed by a linear gradient of increasing ACN from 80% to 90% between 40 to 50 min, was used to elute Compound 4, where fractions containing Compound 4 were lyophilized in vacuo to yield pure Compound 4 as a stable pink powder. Isolated yield (18 mg, 37%).

To a room temperature, magnetically stirred solution of Compound 4 (15 mg, 9.9 µmol) in dimethylformamide (DMF, 2.0 mL), added a neat diisopropylethylamine (2 µL, 9.9 µmol), followed by addition of (bromomethyl)boronic acid pinacol ester (2.6 mg, 12.0 µmol, CAS No. 166330-03-6). The reaction was allowed to proceed at RT for 2.0 hours or until complete consumption of starting material and formation of desired N-alkylated product was observed by UPLC-MS.

Without further purification, the boronate was converted to a trifluoroborane as follows: a 1 M solution of potassium hydrogen fluoride ($KHF_2$, 20 µL) followed by 3 M of hydrochloric acid (HCl, 10 µL) was added to the reaction pot at 0° C. The reaction was stirred for 1 hour at room temperature, under ambient atmosphere. The formation of AMB[F]3-Cy3-(OtBu)DOTA (Compound 5) was confirmed by UPLC-MS. The resulting solution was quenched with 5 µL of 28% Conc. $NH_4OH$, filtered, diluted with DMF (1.5 mL), and purified by preparative HPLC, using a $H_2O$:ACN (0.05% TFA), 50 min elution gradient at a flow rate of 12 mL/min. A linear gradient of increasing ACN from 10% to 70% between 0 to 40 min, followed by a linear gradient of increasing ACN from 70% to 90% between 40 to 50 min, was used to elute 5, where the fractions containing the desired product were lyophilized in vacuo to yield pure Compound 5 as a stable pink powder. Isolated yield (10 mg, 64%)

Neat trifluoroacetic acid (TFA) (1.0 mL) was added to a stirred solution of Compound 5 (8.0 mg, 5.0 µmol) at 0° C. Under continuous stirring, the reaction was warmed to room temperature (25° C.) over a 1-hour period. A clean conversion of the tBOC protected acid into a corresponding tetraacid, was observed by UPLC/MS. TFA was removed from the mixture under vacuum. The resulting solid was dissolved in DMF (1.0 mL), loaded onto preparative HPLC and [$^{19}$F]Cy3D (Compound 6) was isolated using a $H_2O$:ACN (0.05% TFA), 50 min elution gradient at a flow rate of 12 mL/min. A linear gradient of increasing ACN from 10% to 60% between 0 to 40 min, followed by a linear increase of ACN from 60% to 90% between 40 to 50 min. The fractions containing the desired product were lyophilized in vacuo to yield chemically pure Compound 6 as a hygroscopic pink powder that was stored under inert conditions. Isolated yield (4.8 mg, 69.9%).

Radiosynthesis (TOS=0 min) was initiated with the addition of 15 to 20 µL of concentrated, but not fully evaporated [$^{18}$F]-fluoride-ion-containing water to [$^{19}$F, $^{175}$Lu]-Compound 6. Typically, ~35 mCi of [$^{18}$F]-fluoride-ion-containing water was added to a 1500 µL poly propylene tube containing 100 µg (78 nmol) of [$^{19}$F, $^{175}$Lu]-Compound 6 in 10 µl of DMSO. The reaction was initiated with 10 µL of aqueous pyridazine HCl (1.25 M, pH 2.5). The resulting mixture was heated at 80-90° C. for 25 min. The reaction was cooled to room temperature (end of synthesis, TOS=25 min) by adding 1.0 mL of distilled water, which results in a suspension. The aqueous solution was loaded into a 10 mL syringe with an additional 7 mL of deionized water. The entire syringe containing 8.0 mL of crude solution and an additional 1.0 mL gap of air was flushed through a C-18 cartridge (waters Oasis HLB (30 mg) light cartridge, waters, #186005125) to separate [$^{18}$F, $^{175}$Lu]-Compound 6 from contaminating [$^{18}$F]-fluoride ion. This was achieved by placing the 10 mL syringe on a syringe pump that was turned 90 degrees, and set to drive the syringe at a flow rate of 40 mL/hr. Following loading of [$^{18}$F, $^{175}$Lu]-Compound 6 on the oasis cartridge, another 20 mL of deionized water was driven through the cartridge (using the syringe pump) to remove unreacted [$^{18}$F]-fluoride ion completely. Pure [$^{18}$F, $^{175}$Lu]-Compound 6 was eluted from the cartridge and through a 0.2 sterile micron filter using 3.0 mmol of 500 µL HCl/EtOH. The resulting solution (450 µL) was diluted 10 fold with 1×PBS (4.5 mL to give a neutral pH 7.0 solution, ready for in vivo use. Notably, the use of a syringe pump is suitable to automate [$^{18}$F, $^{175}$Lu]-Compound 6 purification; further notable is that sudden movements during manual preparation result in [$^{18}$F]-fluoride ion contamination. PBS solutions of [$^{18}$F, $^{175}$Lu]-Compound 6 further were generally diluted to concentrations of ~1.5 mCi/mL for in vivo use.

Characterization of (OtBu)DOTA-Cy3-Tert-Amine (Compound 4)

Figure 3A:
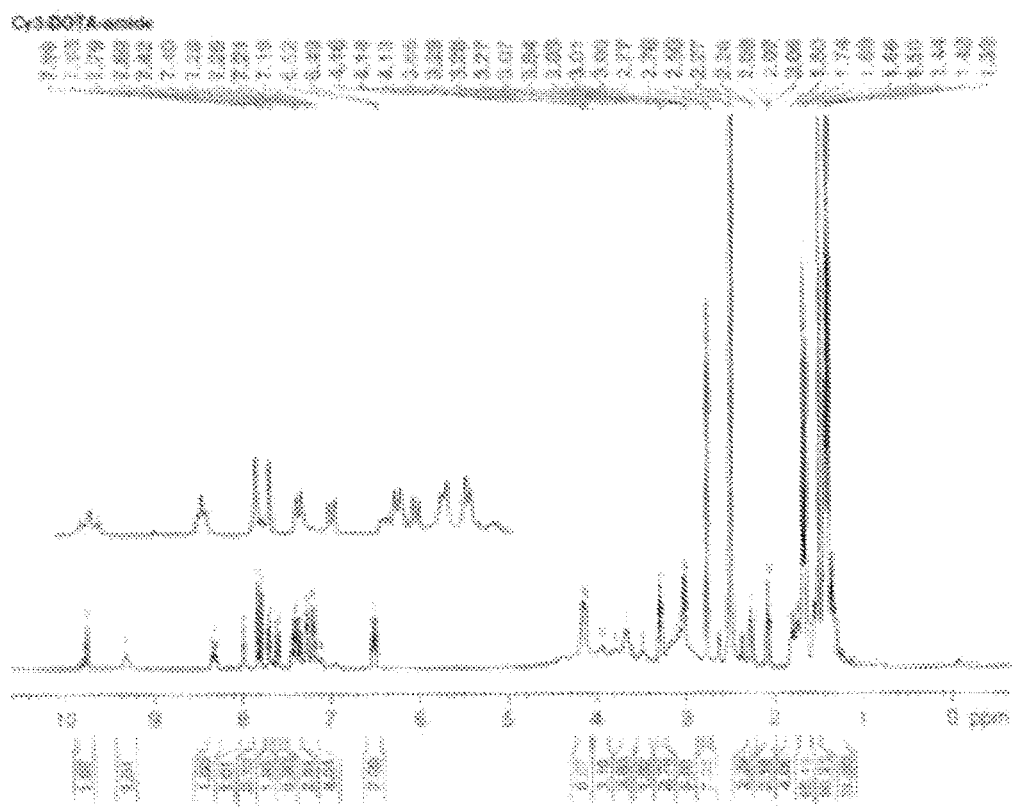
FIGS. 3A-3B provide the spectra of (O'Bu)DOTA-Cy3-tert-Amine (Compound 4) by $^1$H NMR (FIG. 3A) and $^{13}$C NMR (FIG. 3B), according to the working examples.
Figure 3B:
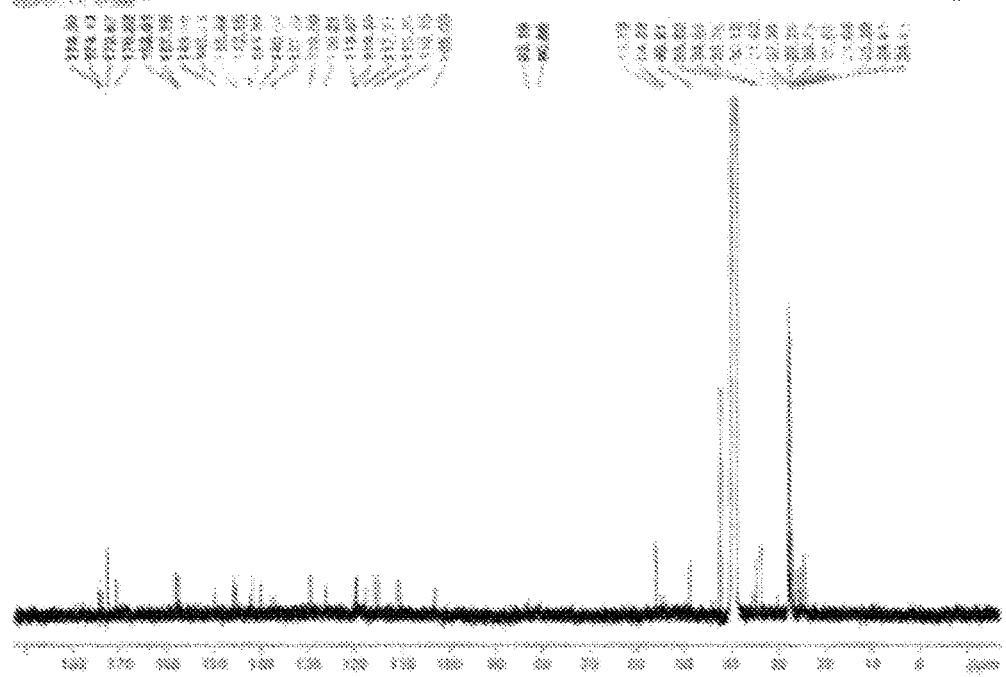

FIGS. 3A-3B provide the $^1$H and $^{13}$C NMR spectra of Compound 4.

As shown in FIG. 3A, the $^1$H NMR (DMSO-d6, 500 MHz, 21° C.) of Compound 4 showed the following peaks: (500 MHz, DMSO-d6): δ 9.75 (s, 1H), 9.30 (bs, 1H), 8.32 (t, 1H, J=13.0 Hz), 7.99 (t, 1H, J=6.0 Hz), 7.84-7.78 (m, 2H), 7.71-7.69 (m, 1H), 7.60 (d, 1H, J=9.0 Hz), 7.45-7.34 (m, 3H), 7.27 (d, 2H, J=8.0 Hz), 7.19 (d, 2H, J=8.0 Hz), 6.51 (t, 2H, J=8.0 Hz), 4.23-4.04 (m, 6H), 4.02-3.88 (m, 3H), 3.80-3.57 (m, 4H), 3.55-3.34 (m, 2H), 3.36-3.23 (m, 3H), 3.25-2.85 (m, 10H), 2.81-2.71 (m, 7H), 2.32-2.22 (m, 2H), 2.07 (t, 2H, J=7.5 Hz), 1.90-1.83 (m, 4H), 1.83-1.70 (m, 15H), 1.70-1.50 (m, 17H), 1.50-1.20 (m, 31H).

As shown in FIG. 3B, the $^{13}$C NMR (DMSO-d6, 125 MHz, 21° C.) of Compound 4 showed the following peaks: $^{13}$C NMR (125 MHz, DMSO-d6):174.3, 174.1, 172.6, 170.8, 158.0, 157.7, 149.8, 145.7, 145.4, 142.1, 141.9, 140.0, 137.4, 129.4, 126.2, 119.8, 119.5, 117.7, 115.3, 110.7, 103.2, 83.1, 80.8, 55.7, 54.2, 48.9, 35.6, 34.8, 33.7, 30.1, 27.4, 27.3, 27.2, 26.7, 26.6, 25.6, 25.3, 24.6, 24.4.

The HRMS (ESI) characterization of Compound 4 provided the following data: m/z calculated for [M]: $C_{78}H_{120}N_9O_{16}S_2$: 1502.8367; [M]$^+$: [$C_{78}H_{121}N_9O_{15}S_2$]$^+$: 1503.8367, found: 1503.8296 (Δ 4.74 ppm); [M+H]$^{2+}$: [$C_{78}H_{122}N_9O_{16}S_2$]$^{2+}$: 751.9181, found: 751.9187 (Δ 0.81 ppm).

These data demonstrate that the process described herein is useful for the synthesis of (OtBu)DOTA-Cy3-tert-Amine (Compound 4).

Characterization of AMB[F]$_3$-Cy3-(O$^t$Bu)DOTA[ ] (Compound 5)

Figure 4A:
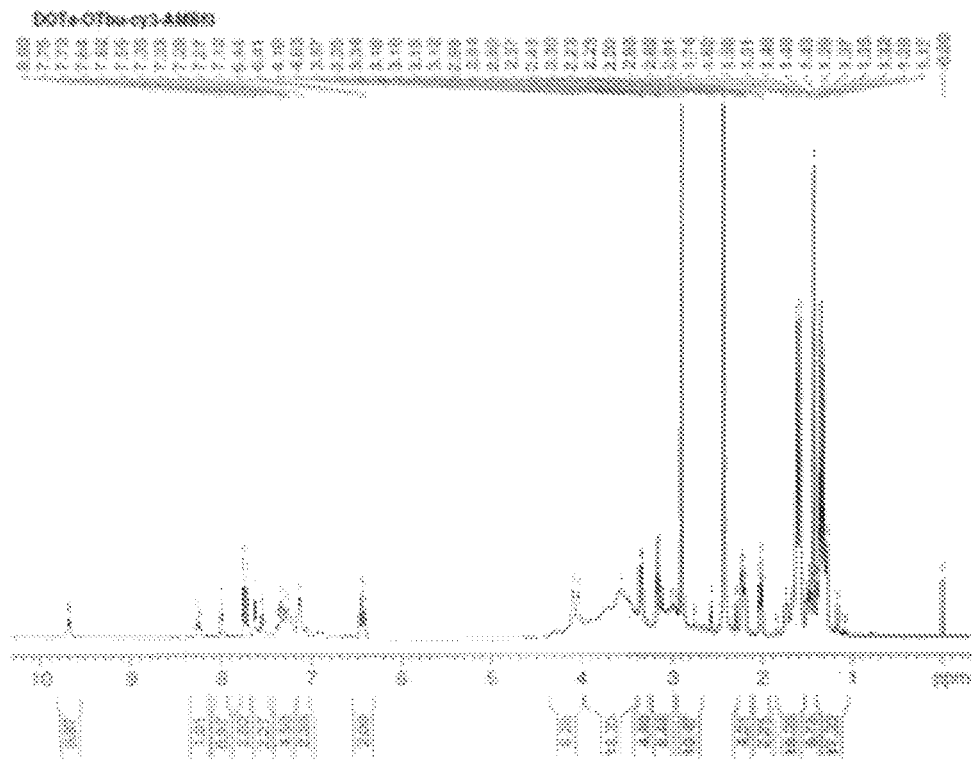
FIGS. 4A-B provide the spectra of AMB[F]$_3$-Cy3-(O'Bu)DOTA (Compound 5) by $^1$H NMR (FIG. 4A) and $^{19}$F NMR (FIG. 4B), according to the working examples.

FIG. 4A provides $^1$H NMR spectra of Compound 5. As shown in FIG. 4A, the $^1$H NMR of Compound 5 provided the following peaks: (500 MHz, DMSO-d6): δ 9.78 (s, 1H), 8.30 (t, 1H, J=13.5 Hz), 8.06 (t, 1H, J=5.5 Hz), 7.81 (d, 2H, J=10.5 Hz), 7.72-7.60 (m, 2H), 7.48-7.32 (m, 4H), 7.22-7.06 (bs, 2H), 6.62-6.40 (m, 2H), 4.47-3.94 (m, 6H), 3.94-3.45 (m, 18H), 3.45-3.25 (m, 4H), 3.25-3.05 (m, 9H), 3.05-2.67 (m, 10H), 2.25-2.15 (m, 4H), 2.13-1.95 (m, 2H), 1.90-1.52 (m, 18H), 1.52-1.40 (m, 9H), 1.05-1.40 (m, 17H).

Figure 4B:
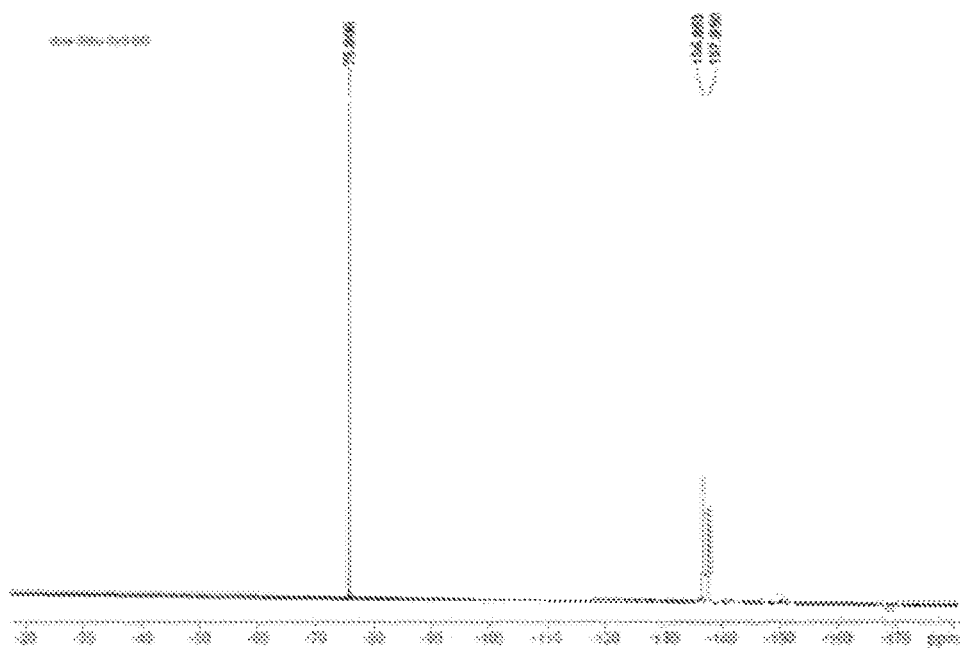

FIG. 4B provides the $^{19}$F NMR (DMSO-d6, 470 MHz, 21° C., TFA reference) spectra of Compound 5, which provided the following peaks: $^{19}$F NMR (470 MHz, DMSO-d6): δ 136-137.

The HRMS (ESI) characterization of Compound 5 provided the following data: m/z calculated for [M]: $C_{79}H_{122}BF_3N_9O_{16}S_2$: 1585.82; [M+H]$^{+2}$: calculated 793.4, found: 793.4.

These data demonstrate that the process described herein is useful for the synthesis of AMB[F]3-Cy3-(O$^t$Bu)DOTA[ ] (Compound 5).

Characterization of [$^{19}$F]Cy3D (Compound 6)

Figure 5A:
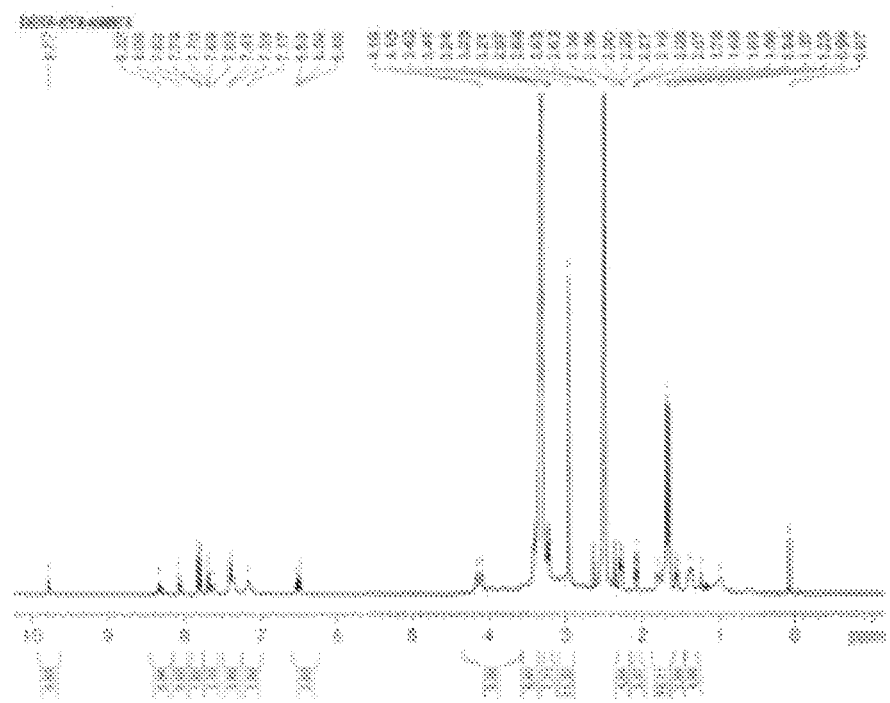
FIGS. 5A-5B provide the spectra of [F]Cy3D (Compound 6), an embodiment of the compounds of the present technology, by $^1$H NMR (FIG. 5A) and $^{19}$F NMR (FIG. 5B), according to the working examples.
Figure 5B:
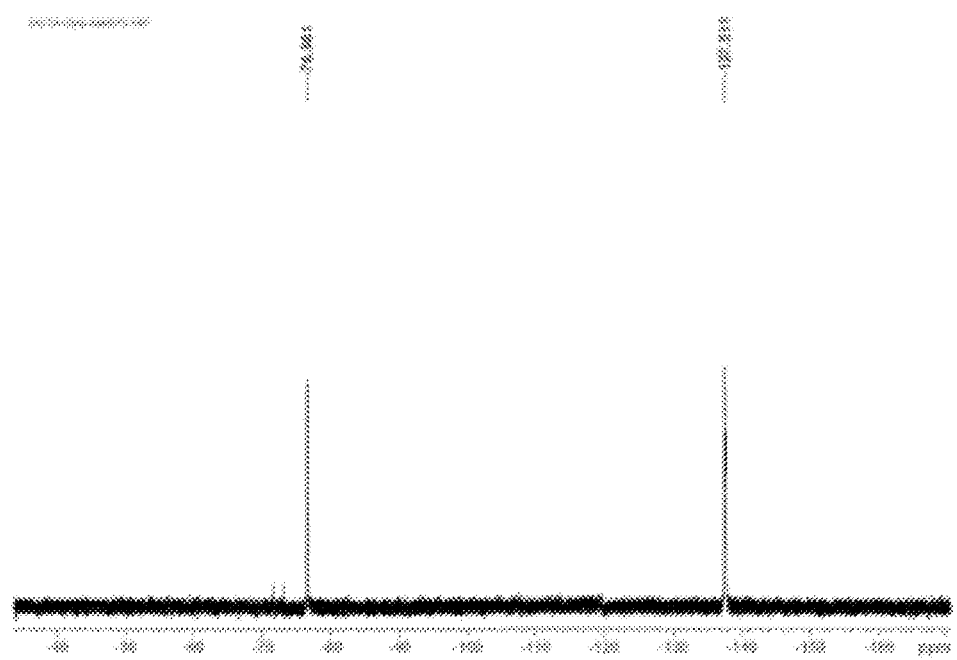

FIGS. 5A-5B provide the $^1$H and $^{19}$F NMR spectra for Compound 6.

As shown in FIG. 5A, the $^1$H NMR (DMSO-d6, 500 MHz, 21° C.) spectra of Compound 6 showed the following peaks: $^1$H NMR (500 MHz, DMSO-d6): δ 9.77 (bs, 1H), 8.32 (t, 1H, J=13.0 Hz), 8.07 (t, 1H, J=6.0 Hz), 7.81 (d, 2H, J=8.7 Hz), 7.69 (t, 1H, J=8.0 Hz), 7.65-757 (m, 1H), 7.47-7.29 (m, 4H), 7.26-7.08 (bs, 2H), 6.50 (t, 2H, J=14.0 Hz), 4.32-3.70 (m, 9H), 3.70-3.42 (m, 8H), 3.35-3.15 (m, 8H), 3.12-2.90 (m, 11H), 2.34-2.28 (t, 5H), 2.15-2.01 (m, 2H), 1.90-1.72 (m, 19H), 1.72-1.45 (t, 3H), 1.45-1.35 (m, 5H), 1.05-0.80 (bs, 3H).

As shown in FIG. 5B, the $^{19}$F NMR (DMSO-d6, 470 MHz, 21° C., TFA reference) spectra of Compound 6 showed the following peaks: $^{19}$F NMR (470 MHz, DMSO-d6): δ 137.51.

The HRMS (ESI) characterization of Compound 6 provided the following data: m/z calculated for [M]: $C_{63}H_{90}BF_3N_9O_{10}S_2$: 1359.5950; [M−H]$^-$: calculated 1358.5950, found: 1358.5923 (Δ 1.97 ppm); [M+2H]$^{-2}$: calculated 678.7889, found: 678.7879 (Δ 1.57 ppm).

These data demonstrate that the process described herein is useful for the synthesis of [F]Cy3D (Compound 6). Accordingly, the process disclosed herein is useful in the methods of synthesis of the compounds of the present technology.

Compound 6 Stability at Physiological pH

Figure 6:
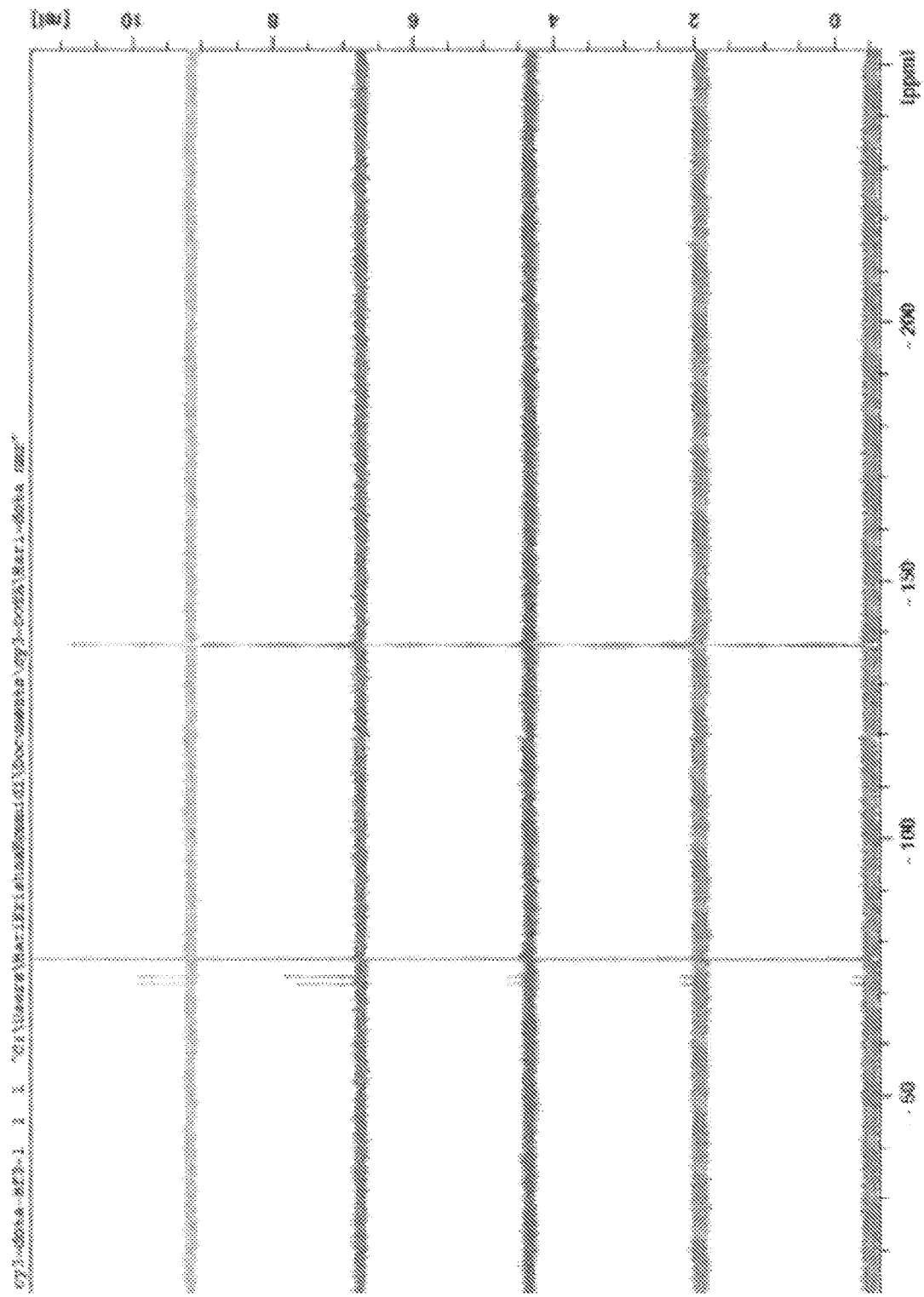
FIG. 6 illustrates the stability of Compound 6 at physiological pH as provided in the working examples.

To characterize the stability of Compound 6 at physiological pH, the fluorine labeling on to Compound 6 was studied by isotope exchange. The stability of Compound 6 was evaluated by $^{19}$F-NMR in a 50% DMSO-d6:FBS (fetal bovine serum) solution (1:1) at pH=7.5. As shown in FIG. 6, there was a lack of change in the $^{19}$F-NMR spectra even after 7 days of incubation at 21° C. ($t_{1/2}$ defluoridation >7 days) indicating a lack for defluoridation. Therefore, Compound 6 was stable even after 7 days of incubation at 21° C. ($t_{1/2}$ defluoridation >7 days).

These data demonstrate that Compound 6 is stable at physiological pH. Accordingly, the compounds of the present technology are useful in the methods disclosed herein.

UPLC Absorbance and Mass Spectra of [$^{19}$F]Cy3D (Compound 6)

Figure 7:
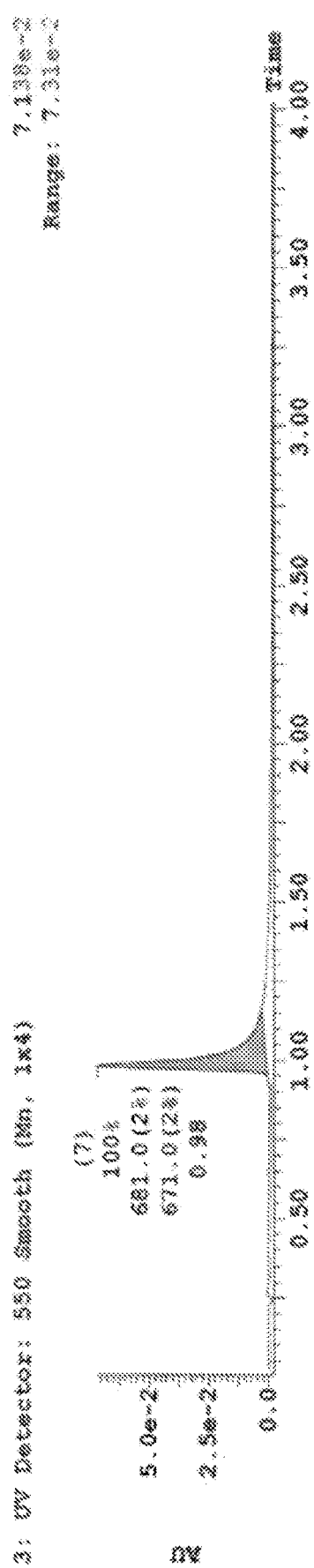
FIG. 7 provides the UPLC absorbance and mass spectra of [F]Cy3D (Compound 6), according to the working examples.

To further characterize the product of synthesis of Compound 6 described herein, the product was subjected to UPLC Absorbance and Mass Spectroscopy. Analytical, reverse phase ultrahigh pressure liquid chromatography UPLC-MS was performed using a Waters Acquity H class HPLC/SQD2 mass spectrometer and a Phenomenex Kinetex 1.7 μm C18 100 Å, 50 cm×2.1 mm I.D. column (00B-4475-AN), with a 1.5 min, a 10-90% H$_2$O:Acetonitrile (ACN) (0.05% TFA) gradient and a flow rate of 0.6 mL/min. As shown in FIG. 7, UPLC UV-absorption (550 nm) showed a >99.9% purity of the product resulting from the described synthesis of Compound 6. The single peak eluted at 0.98 min has a desired mass of 681 m/z (FIG. 7).

These data demonstrate that the process described herein is useful for preparing at least 90% or at least 95% pure [F]Cy3D (Compound 6). Accordingly, the process disclosed herein is useful in the methods of synthesis of at least 90% or at least 95% pure compounds of the present technology.

Fluorescence Properties of [$^{19}$F]Cy3D (Compound 6)

Figure 8:
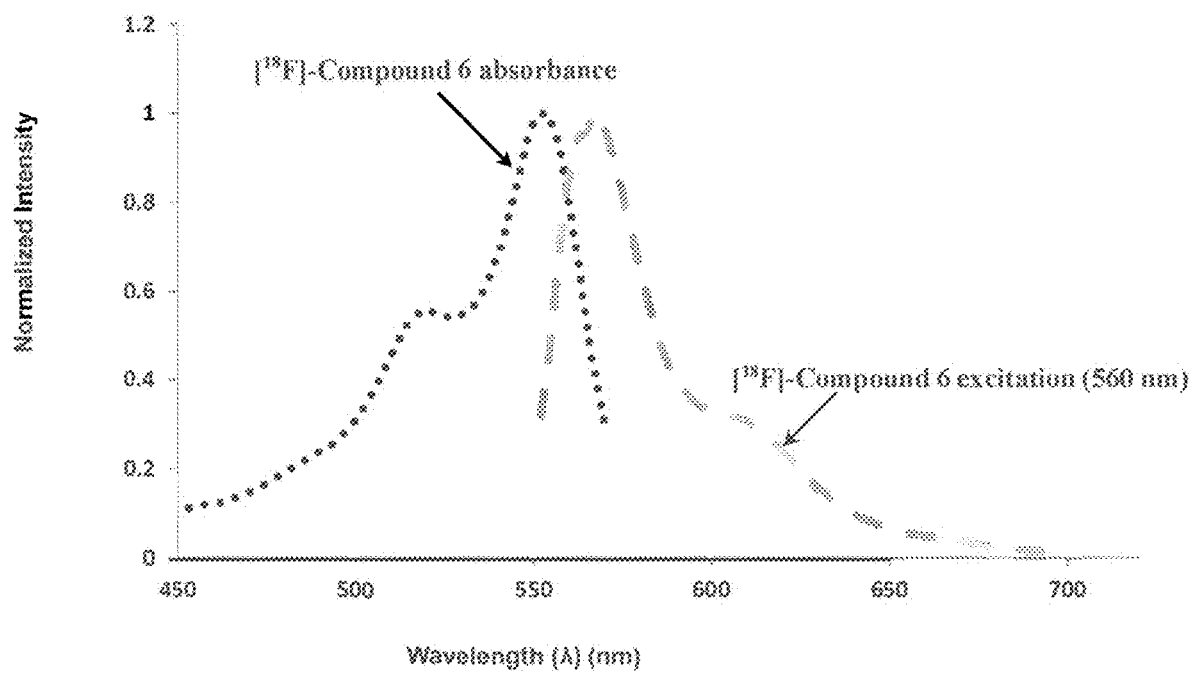
FIG. 8 provides the fluorescent optical properties of [F]Cy3D (Compound 6) as measured on a Cary Eclipse spectrophotometer, with 5 nm slit widths, and excitation at 560 nm, in PBS (1 mM, pH 7.4), according to the working examples.

To characterize Compound 6 further, the fluorescent optical properties of Compound 6 were determined. The normalized excitation and emission spectra of Compound 6 as measured on a Cary Eclipse spectrophotometer, with 5 nm slit widths, and excitation at 560 nm, in PBS (1 mM, pH 7.4) are shown in FIG. 8.

These data demonstrate that Compound 6 shows fluorescence spectra corresponding to its structure.

Reverse-Phase HPLC of Radiolabeled [$^{18}$F]Cy3D ([$^{18}$F]-Compound 6)

Figure 9:
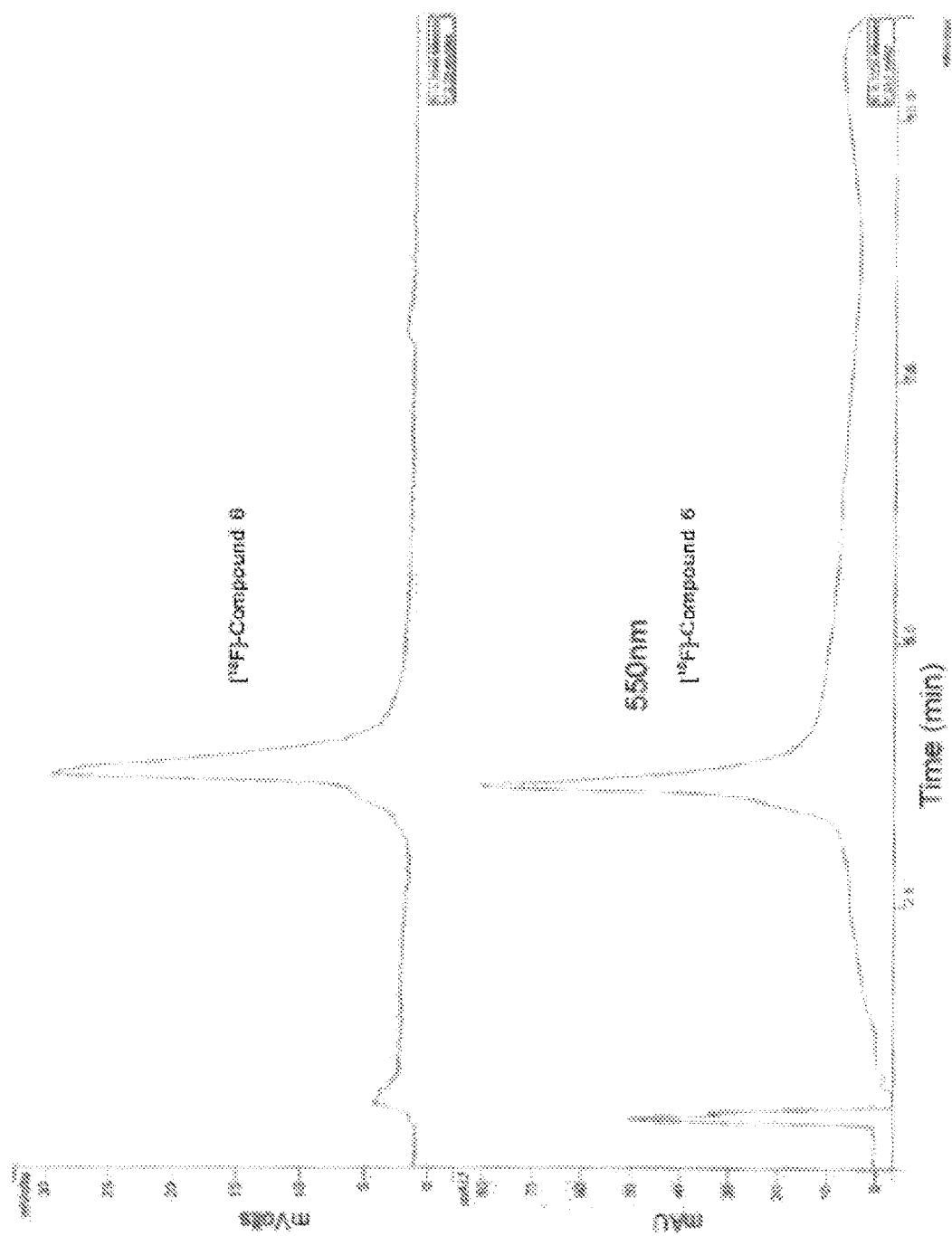
FIG. 9 shows the reverse-phase HPLC of radiolabeled [$^{18F}$]Cy3D ([$^{18F}$]-Compound 6), according to the working examples.
Figure 10:
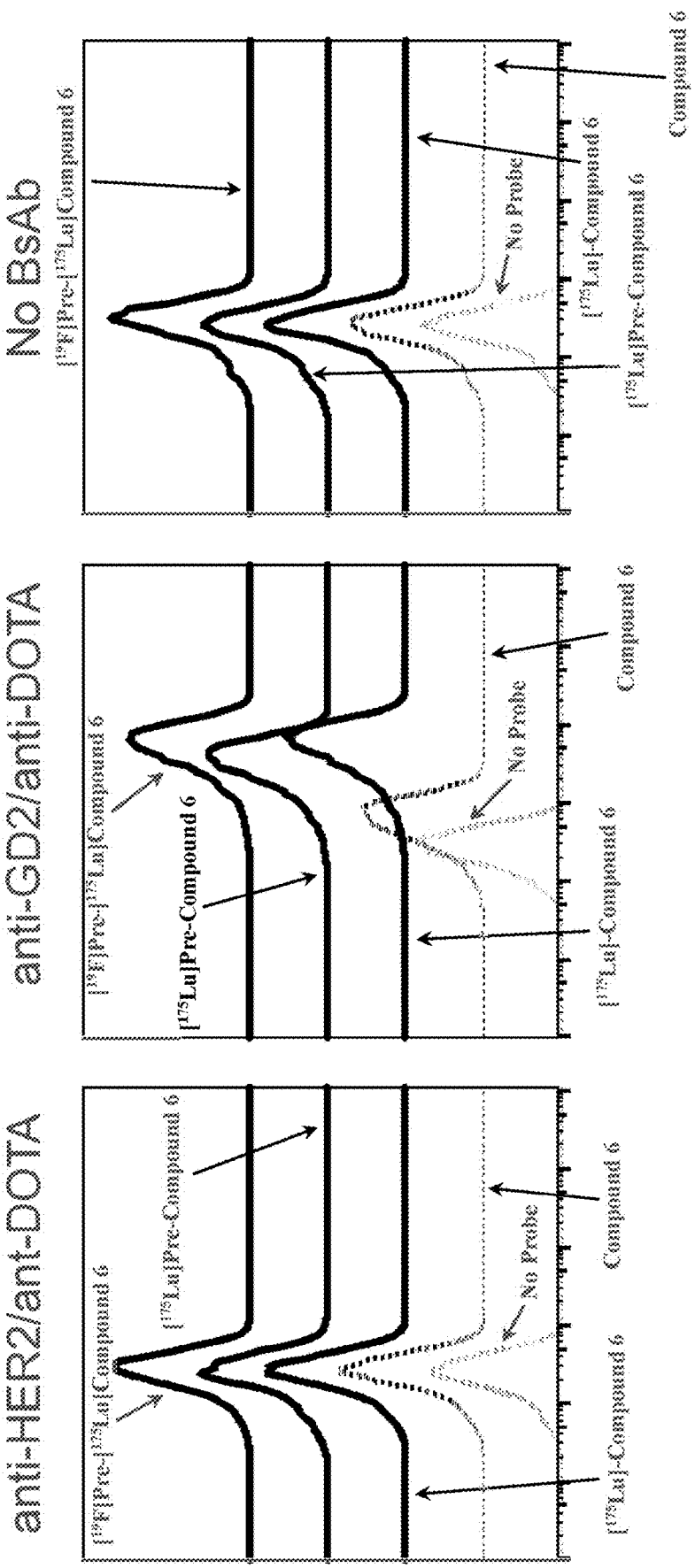

FIG. 9 shows a pure, one peak isotopic exchange $^{18}$F-radiolabeling and purification of Compound 6 using an HPLC equipped with in line 550 nm absorbance and radio detection. Purity of radiolabeling was verified on a Varian Reverse phase HPLC, using a Waters Sunfire™ C18 3.5 μm 4.6×50 mm column (186002551), an attached radio detector, and a 10-90% H$_2$O:ACN (0.05% TFA) elution gradient and a flow rate of 2 mL/min. A clean, single peak radiosynthesis was achieved. Optical properties of [$^{18}$F]-Compound 6 were identified and compared with Compound 1 in pH=7.4 (1×PBS buffer) and in absolute ethanol. The individual values are shown in FIG. 20. As shown in FIG. 20, the $^{18}$F-radiolabeling and purification of Compound 6 produced $^{18}$F-radiolabeled Compound 6 having optical properties similar to CY3.18.OH (Compound 1).

These data demonstrate that the process disclosed herein is useful in the methods of synthesis of $^{18}$F-radiolabeled Compound 6.

Summary of Multiple $^{18}$F Radiolabeling of [F]Cy3D (Compound 6)

$^{18}$F-radiolabeled Compound 6 was prepared multiple times using the methods disclosed herein. As shown in FIG. 21, the detailed results from multiple replicates of $^{18}$F radiolabeling Compound 6 showed reproducible results. These data demonstrate that the process disclosed herein is useful in the methods of synthesis of $^{18}$F-radiolabeled Compound 6.

$^{177}$Lu Radiolabeling of [F]Cy3D (Compound 6)

$^{177}$Lu radiolabeling of [F]Cy3D (Compound 6) was performed as follows. Compound 6 was dissolved to a final concentration of 10 mg/mL in an Eppendorf® tube in 0.5 M ammonium acetate (pH 5.3). $^{177}$LuCl$_3$ was obtained from Perkin Elmer (lot #L070417; specific activity 32.9 Ci/mg on Jul. 3, 2017 13:00 ET) at an activity concentration of ~2 mCi/μL in 0.05M HCl. First, 0.5 μL (801.9 μCi) of $^{177}$LuCl$_3$ in 0.05M HCl was transferred to a 2 mL metal-free Eppendorf® tube. Then 20 μL of 0.5 M ammonium acetate pH 5.3 was added, pH was confirmed to be ~5.3. Next, 1 μL of stock Compound 6 was added. The reaction was incubated at 60° C. for 1 hr. As shown in Table 1, successful of radiolabeling of Compound 6 with radiometal $^{177}$Lu was achieved.

TABLE 1

Summary of $^{177}$Lu radiolabeling of [F]Cy3D (Compound 6)

| | |
|---|---|
| Labeled compound- Loading | 648.3 μCi |
| Follow-through - Wash | 106.7 μCi (16.5%) |
| Elute | 522.3 μCi (80.6%) |
| Left over in column | 19.8 μCi (3.1%) |

Following the radiolabeling, the reaction mixture containing [F]Cy3D[$^{177}$Lu]([$^{177}$Lu]-Compound 6) was run through a Strata-X cartridge (33 μm Polymeric RP C-18, 30 mg/1 mL #8B-S100-TAK, Phenomenex Inc., Torrance, CA USA). The cartridge was pre activated and equilibrated using 1 ml ethanol and 2.5 ml of pure water. After loading the labeled compound, the cartridge was rinsed with 3 ml of water to remove any residual free $^{177}$Lu. Purified [$^{177}$Lu]-Compound 6 was then eluted using 200 μL of ethanol. Aforementioned binding assay was performed with sep-pak purified compound.

These data demonstrate that the process disclosed herein is useful in the methods of synthesis of $^{177}$Lu-radiolabeled Compound 6.

Example 3: In Vitro Fluorescence Activity of [F]Cy3D[$^{175}$Lu] ([$^{175}$Lu]-Compound 6) Against GD2 and GPA33 Expressing Cell Lines The cell binding activity of [F]Cy3D (Compound 6) was assayed with an anti-tumor/anti-DOTA bispecific antibody (BsAb). See FIGS. 11-16. To detect binding of Compound 6 to GD2-expressing IMR32Luc neuroblastoma cells using an anti-GD2/anti-DOTA BsAb or a control BsAb (anti-HER2/anti-DOTA), cells were incubated with 1 μg of BsAb or PBS, washed and then incubated with several versions of Compound 6: (1) Compound 6, (2) [$^{175}$Lu]Pre-Compound 6 where $^{175}$Lu was added before a mock $^{19}$F isotope exchange, (3) [$^{19}$F]Pre-[$^{175}$Lu]Compound 6, where a mock $^{19}$F isotope exchange was done before $^{175}$Lu was added, and (4) [$^{175}$Lu]-Compound 6 where $^{175}$Lu was directly added to Compound 6 without isotope exchange. Cells were analyzed by FACS or fluorescent microscopy. As shown in FIG. 11, negative controls (no BsAb, or control BsAb) showed no binding to cells, suggesting Compound 6 alone did not bind cells non-specifically. However addition of the anti-GD2/anti-DOTA BsAb led to binding of each Compound 6 version with $^{175}$Lu added, compared to the anti-HER2/anti-DOTA BsAb, which does not bind IMR32Luc neuroblastoma cells. Isotope exchange with $^{19}$F did not affect binding activity when done before or after $^{175}$Lu labeling. Critically, the specificity of the BsAb was confirmed with the control condition of Compound 6, which does not contain $^{175}$Lu and therefore does not bind the BsAb and shows no fluorescence.

Figure 12:
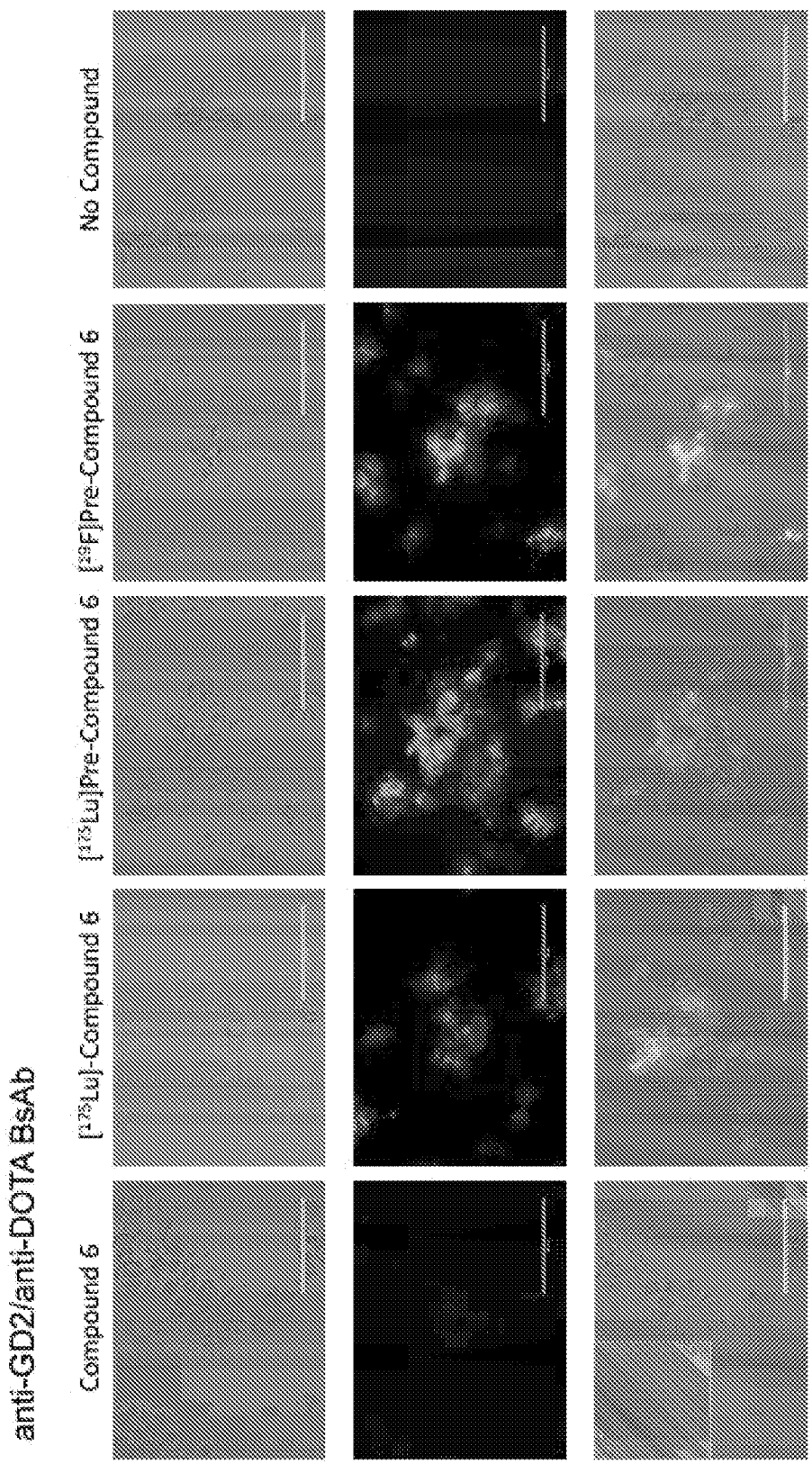
FIGS. 12-14 show the cell binding of Compound 6 and [$^{175}$Lu]-Compound 6 to GD2-expressing IMR32Luc neuroblastoma cells using an anti-GD2/anti-DOTA BsAb (FIG. 12), a control BsAb (anti-HER2/anti-DOTA) (FIG. 13), or no BsAb (FIG. 14), as determined via fluorescent microscopy.
Figure 13:
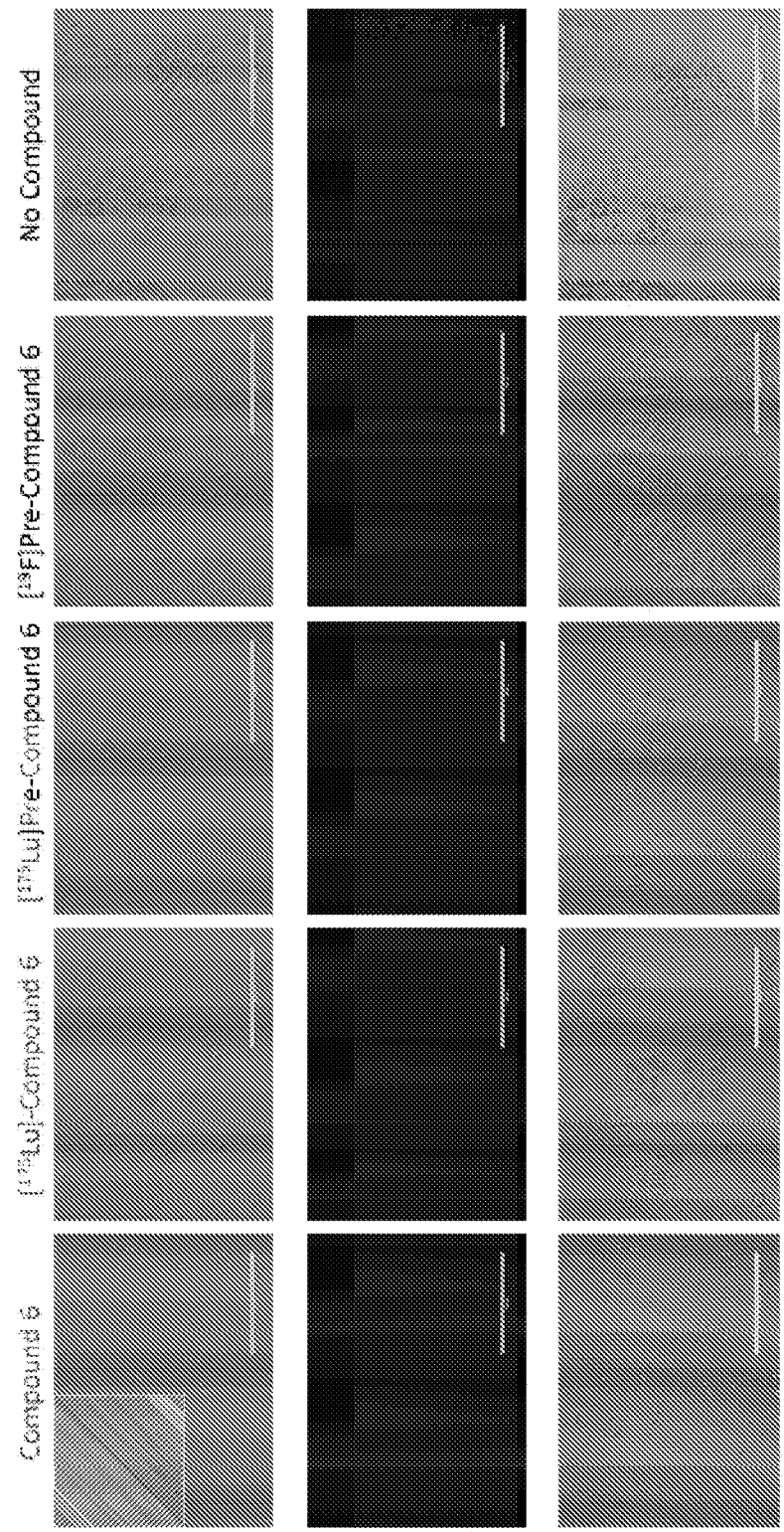
Figure 14:
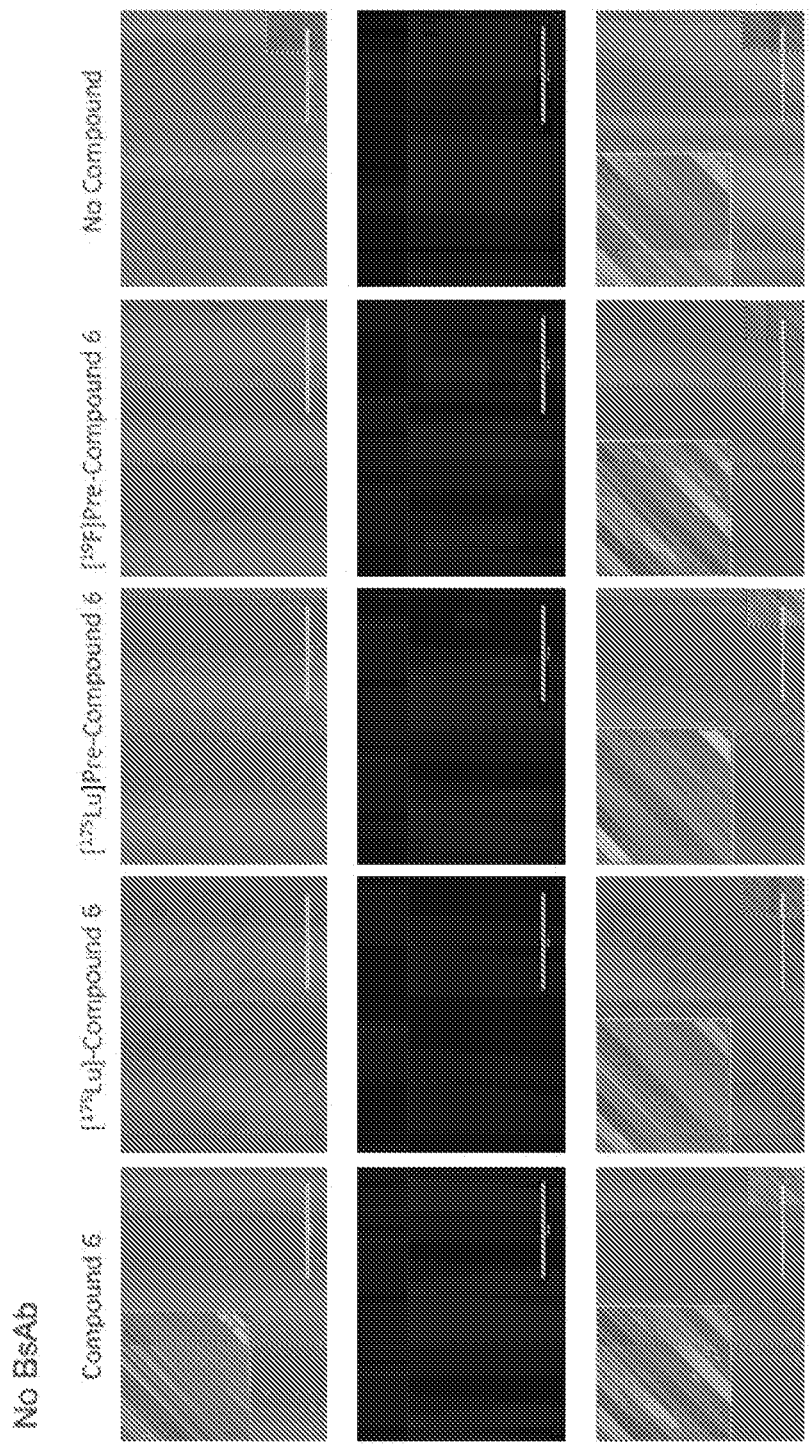
Figure 15:
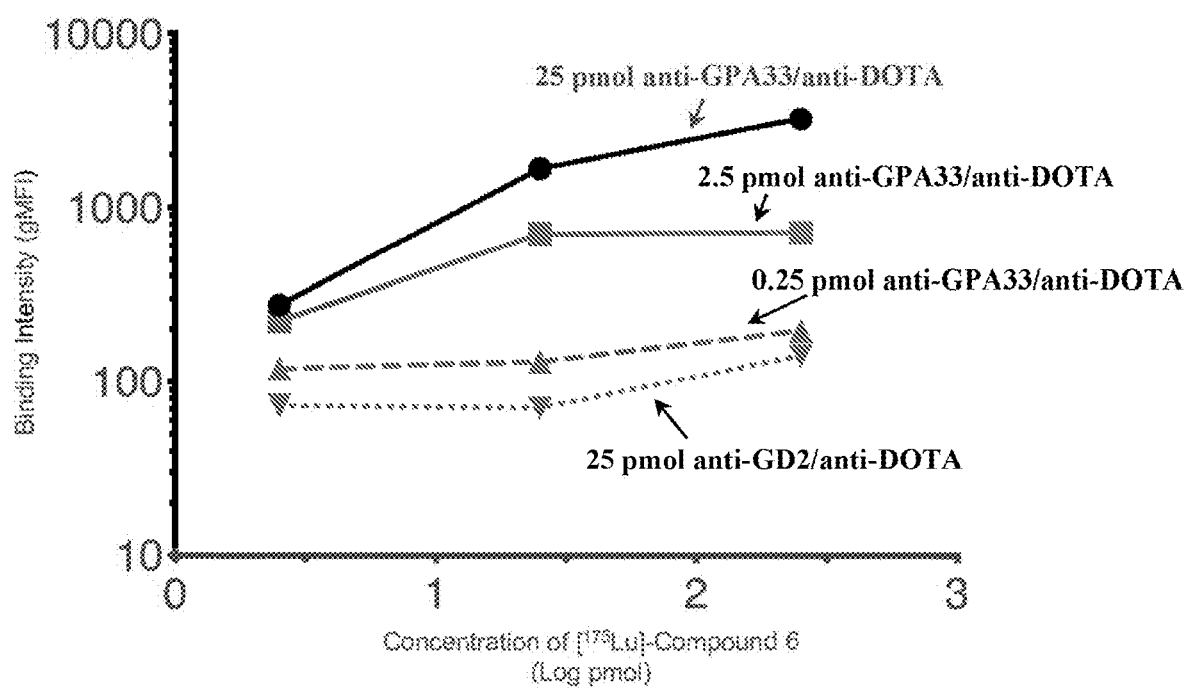
FIGS. 15-16 show [$^{175}$Lu]-Compound 6 binding to GPA33 expressing SW1222 colon cancer cells at different concentrations of an anti-GPA33/anti-DOTA BsAb, or a control BsAb (anti-GD2/anti-DOTA) as determined by fluorescence-activated cell sorting (FACS) flow cytometry.

The cell binding of Compound 6 and [$^{175}$Lu]-Compound 6 variants was then studied using fluorescent microscopy. IMR32luc cells were incubated with Anti-GD2/Anti-DOTA BsAb, a control anti-DOTA BsAb or no BsAb, followed by incubation with Compound 6 or [$^{175}$Lu]-Compound 6 variants. See FIGS. 12-14, where the top row shows the cells by bright field, the middle row is fluorescent channel, and the bottom row is the overlay. As shown in FIG. 12, IMR32luc cells exhibited fluorescence when they were incubated with Anti-GD2/Anti-DOTA BsAb. Binding was not detected when a control anti-DOTA BsAb was added (FIG. 14) or no BsAb was added (FIG. 15). As shown in FIG. 12, only cells incubated with anti-GD2/anti-DOTA BsAb and $^{175}$Lu labeled variants of Compound 6 show binding to cells. Cells incubated with Compound 6 (lacking $^{175}$Lu) or cells incubated with [$^{175}$Lu]-Compound 6 variants but without anti-GD2/anti-DOTA BsAb did not show binding.

Figure 16:
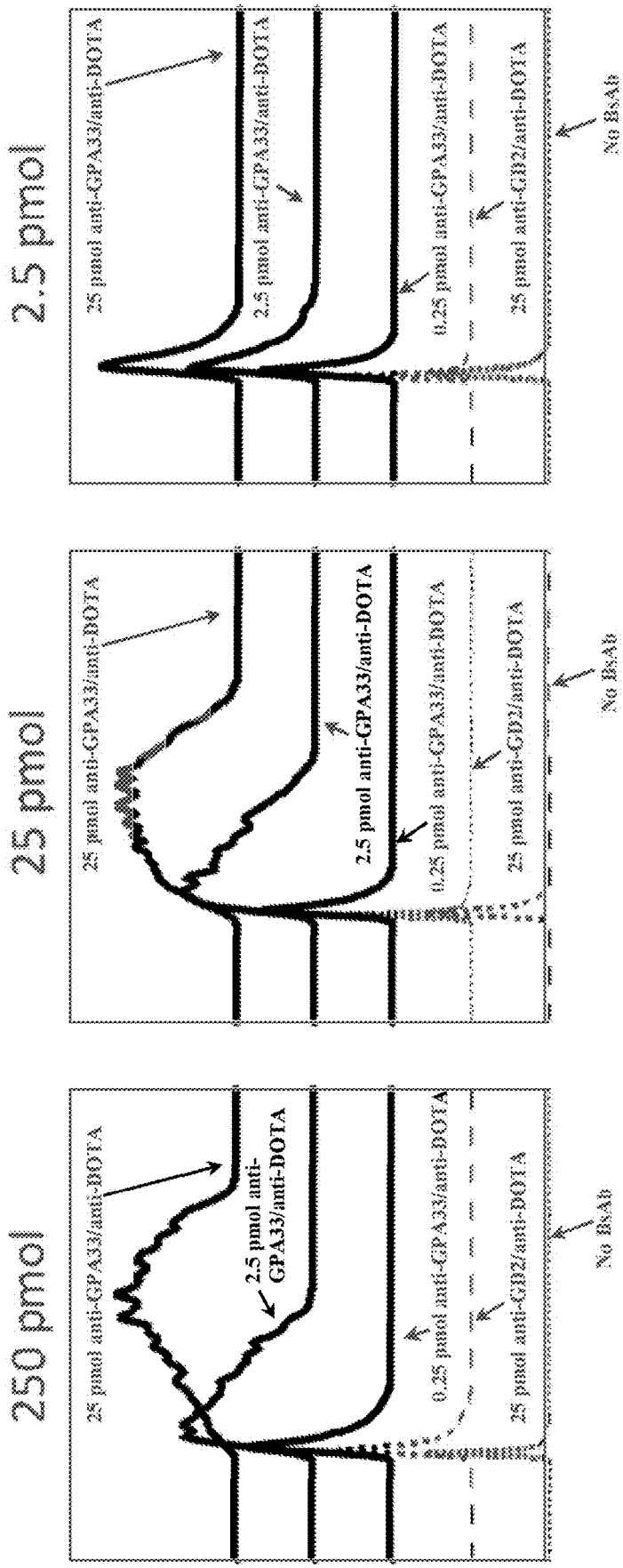

Next [$^{175}$Lu]-Compound 6 binding to GPA33-expressing SW1222 colon cancer cells was investigated. SW1222 cells were incubated with 25, 2.5 or 0.25 pmol of anti-GPA33/Anti-DOTA BsAb, or a control (anti-GD2/anti-DOTA) BsAb, washed and mixed with 50, 5 or 0.5 pmol of [$^{175}$Lu]-Compound 6. As shown in FIG. 15, the mean fluorescence (MFI) of binding was proportionate to the amount of [$^{175}$Lu]-Compound 6. The anti-GD2/anti-DOTA BsAb, which does not bind SW1222 cells showed no binding. FIG. 16 shows the histogram overlays confirming the specificity and dose-dependent binding.

These data demonstrate that the modifications of the BnDOTA[ ] precursor to create Compound 6 did not create any non-specific binding activities to either cell lines or BsAbs. Accordingly, the probe was specific for the anti-DOTA binding site of the BsAb and the Cy3 fluorescence permitted strong and clear detection in vitro. Accordingly, the compounds of the present technology are useful for diagnostic imaging methods.

Example 4: In Vivo Biodistribution (Tumor Free) and Pharmacokinetics of [F]Cy3D [$^{177}$Lu] ([$^{177}$Lu]-Compound 6)

Figure 17A:
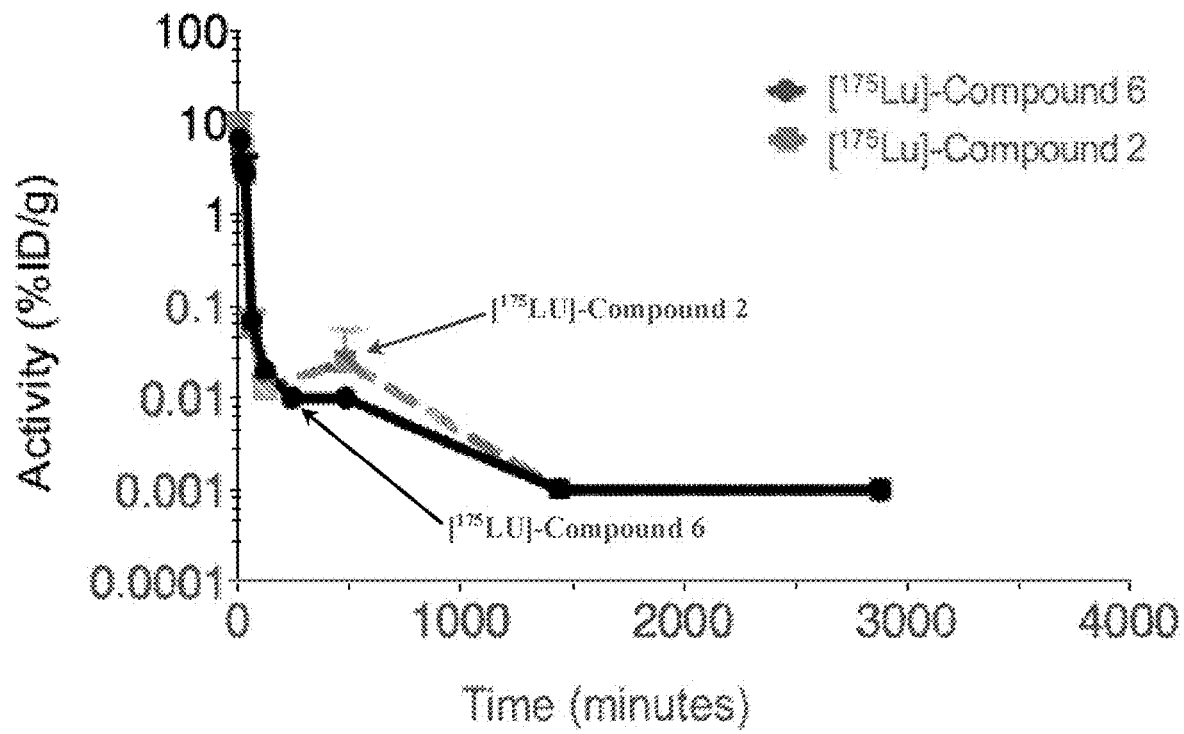
FIGS. 17A-17B show the in vivo biodistribution (tumor free) and pharmacokinetics of [F]Cy3D [$^{177}$Lu]([$^{177}$Lu]-Compound 6), according to the working examples.
Figure 17B:
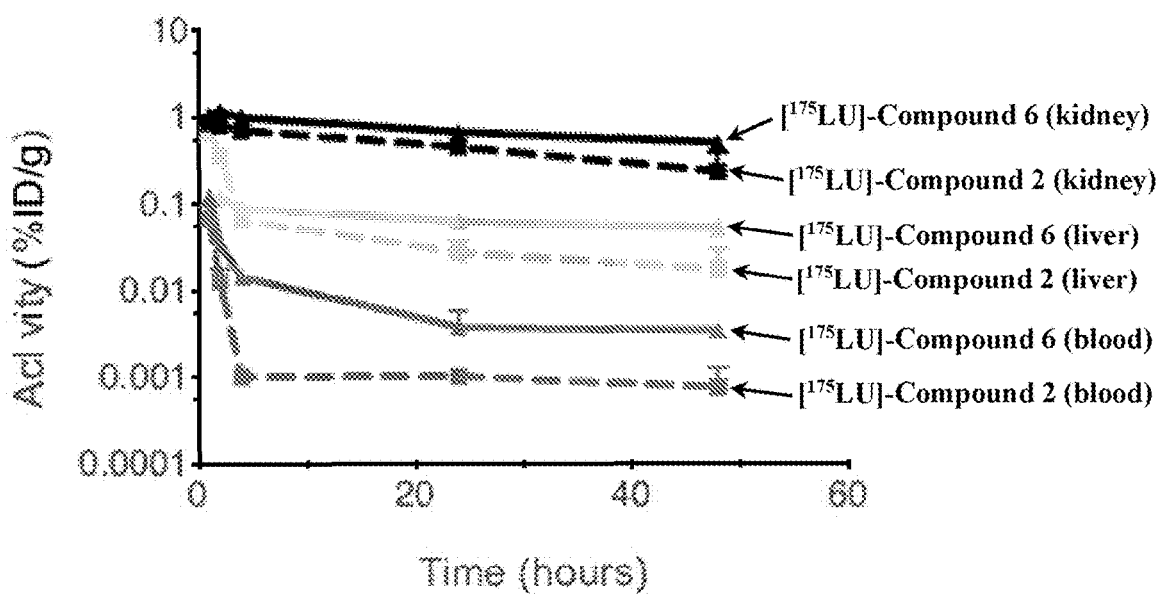

The in vivo biodistribution and pharmacokinetics of ([$^{177}$Lu]-Compound 6) and BnDOTA[$^{177}$Lu] was investigated in tumor free mice. See FIGS. 17A-17B and Tables 2 and 3. Mice were dosed with radiolabeled probes at t=0 and sacrificed at various time points. Organs were harvested and activity was counted by gamma counter. Tables 2-3 show the serial biodistribution data for the analyzed organs of Compound 6 and Compound 2, respectively. FIG. 17A overlays the time course in activity in either vital tissues (left panel) or the blood (right panel) between the two probes. Both [$^{177}$Lu]-Compound 2 and [$^{177}$Lu]-Compound 6 cleared at similar rates. Likewise, as shown in FIG. 17B, [$^{177}$Lu]-Compound 2 and [$^{177}$Lu]-Compound 6 showed comparable biodistribution. These data show that the modifications to the BnDOTA[ ] precursor to create Compound 6 ($^{19}$F and Cy3 modifications) did not alter the tissue biodistribution.

TABLE 2

Summary of [F]Cy3D[$^{177}$Lu] biodistribution ([$^{177}$Lu]-Compound 6)

| | Compound 6 Uptake (% injected Dose/gram) Time After Dosing (hour) | | | | |
|---|---|---|---|---|---|
| | 1 h | 2 h | 4 h | 24 h | 48 h |
| Blood | 0.122 ± 0.005 | 0.034 ± 0.005 | 0.014 ± 0.001 | 0.004 ± 0.002 | 0.003 ± 0 |
| Brain | 0.007 ± 0.001 | 0.014 ± 0.01 | 0.004 ± 0 | 0.001 ± 0.001 | 0.001 ± 0 |
| Heart | 0.056 ± 0.006 | 0.027 ± 0.004 | 0.017 ± 0 | 0.008 ± 0.006 | 0.009 ± 0 |
| Lungs | 0.142 ± 0.017 | 0.071 ± 0.01 | 0.041 ± 0.004 | 0.023 ± 0.005 | 0.017 ± 0.001 |
| Liver | 0.119 ± 0.015 | 0.12 ± 0.025 | 0.088 ± 0.009 | 0.063 ± 0.007 | 0.052 ± 0.007 |
| Spleen | 0.06 ± 0.008 | 0.048 ± 0.021 | 0.032 ± 0.004 | 0.029 ± 0.002 | 0.022 ± 0.001 |
| Stomach | 0.734 ± 1.363 | 0.985 ± 0.861 | 0.186 ± 0.256 | 0.02 ± 0.011 | 0.019 ± 0 |
| Sm. Intestine | 0.914 ± 0.311 | 0.958 ± 0.379 | 0.169 ± 0.258 | 0.022 ± 0.007 | 0.016 ± 0.003 |

TABLE 2-continued

Summary of [F]Cy3D[$^{177}$Lu] biodistribution ([$^{177}$Lu]-Compound 6)

Compound 6 Uptake (% injected Dose/gram)
Time After Dosing (hour)

| | 1 h | 2 h | 4 h | 24 h | 48 h |
|---|---|---|---|---|---|
| Lg. Intestine | 0.046 ± 0.009 | 2.577 ± 0.409 | 2.356 ± 1.032 | 0.047 ± 0.016 | 0.035 ± 0.021 |
| Kidneys | 1.021 ± 0.096 | 1.147 ± 0.184 | 0.989 ± 0.1 | 0.66 ± 0.07 | 0.5 ± 0.05 |
| Muscle | 0.04 ± 0.009 | 0.032 ± 0.014 | 0.023 ± 0.013 | 0.008 ± 0.003 | 0.007 ± 0 |
| Bone | 0.065 ± 0.009 | 0.043 ± 0.007 | 0.038 ± 0.012 | 0.019 ± 0.003 | 0.021 ± 0.001 |
| Tail | 0.279 ± 0.079 | 0.237 ± 0.128 | 0.154 ± 0.102 | 0.079 ± 0.026 | 0.018 ± 0.016 |

TABLE 3

Summary of BnDOTA[$^{177}$Lu] biodistribution ([$^{177}$Lu]-Compound 2)

BnDOTA[ ] Uptake (% injected Dose/gram)
Time After Dosing (hour)

| | 1 h | 2 h | 4 h | 24 h | 48 h |
|---|---|---|---|---|---|
| Blood | 0.068 ± 0.029 | 0.013 ± 0.005 | 0.001 ± 0 | 0.001 ± 0 | 0.001 ± 0.001 |
| Brain | 0.015 ± 0.006 | 0.025 ± 0.01 | 0.01 ± 0 | 0.001 ± 0 | 0.001 ± 0.001 |
| Heart | 0.033 ± 0.013 | 0.023 ± 0.005 | 0.01 ± 0 | 0.01 ± 0 | 0.016 ± 0.03 |
| Lungs | 0.083 ± 0.032 | 0.048 ± 0.005 | 0.023 ± 0.005 | 0.013 ± 0.005 | 0.01 ± 0 |
| Liver | 0.658 ± 0.074 | 0.358 ± 0.083 | 0.065 ± 0.024 | 0.028 ± 0.01 | 0.018 ± 0.012 |
| Spleen | 0.06 ± 0.041 | 0.053 ± 0.005 | 0.025 ± 0.01 | 0.023 ± 0.005 | 0.01 ± 0.012 |
| Stomach | 0.06 ± 0.055 | 0.2 ± 0.071 | 0.045 ± 0.017 | 0.01 ± 0 | 0.013 ± 0.013 |
| Sm. Intestine | 1.493 ± 0.554 | 0.86 ± 0.389 | 0.128 ± 0.05 | 0.01 ± 0 | 0.005 ± 0.006 |
| Lg. Intestine | 0.088 ± 0.083 | 2.878 ± 2.718 | 1.865 ± 0.963 | 0.02 ± 0 | 0.018 ± 0.013 |
| Kidneys | 0.86 ± 0.177 | 0.8 ± 0.065 | 0.695 ± 0.106 | 0.448 ± 0.109 | 0.233 ± 0.153 |
| Muscle | 0.028 ± 0.01 | 0.043 ± 0.013 | 0.013 ± 0.005 | 0.003 ± 0.005 | 0.051 ± 0.1 |
| Bone | 0.04 ± 0.012 | 0.325 ± 0.276 | 0.015 ± 0.013 | 0.01 ± 0.008 | 0.018 ± 0.028 |
| Tail | 0.245 ± 0.179 | 0.183 ± 0.056 | 0.118 ± 0.041 | 0.065 ± 0.044 | 0.01 ± 0.008 |

These data demonstrate that the Compound 6 (with $^{19}$F and Cy3 modifications) showed a biodistribution comparable to BnDOTA precursor. Accordingly, the compounds of the present technology are useful for diagnostic imaging methods.

Example 5: In Vivo Tumor Uptake of [F]Cy3D [$^{177}$Lu] ([$^{177}$Lu]-Compound 6) Using 3-Step PRIT The in vivo tumor uptake of [F]Cy3D [$^{177}$Lu] ([$^{177}$Lu]-Compound 6) was analyzed in tumor-bearing (SW-1222) mice. See Table 4. Tumor bearing mice were pretreated with (1) anti-GPA33/anti-DOTA BsAb, (2) DOTA-dendrimer clearing agent (glycodendrimer-based CA α-thio-N-acetyl-galactosamine-16-DOTA-Y$^3$; see WO2020014386) (24 h later) and followed with the (3)$^{177}$Lu radiolabeled probes ([$^{177}$Lu]-Compound 6 or BnDOTA[$^{177}$Lu]. At each given time point, mice were sacrificed, and tumors were harvested. Activity was measured using a gamma counter. These data show that the probes of present disclosure, including [$^{177}$Lu]-Compound 6, bound with equal specificity and efficacy to a BsAb-treated tumor in vivo, compared to the standard BnDOTA[$^{177}$Lu]. As shown in Table 4, non-specific uptake was limited, and tumor uptake was strong.

TABLE 4

Summary of [F]Cy3D[$^{177}$Lu] tumor uptake ([$^{177}$Lu]-Compound 6)

| Tumor Uptake | [$^{177}$Lu]-Compound 5 | [$^{177}$Lu]-Compound 6 |
|---|---|---|
| 1 h | 24.22 ± 3.5 | 25.24 ± 4.49 |
| 4 h | 26.87 ± 4.53 | 21.93 ± 2.25 |
| 24 h | 27.4 ± 4.17 | 23.17 ± 4.83 |
| 48 h | 18.24 ± 2.89 | 22.13 ± 5.37 |

These data demonstrate that the probes of present disclosure, including [$^{177}$Lu]-Compound 6, can be effectively used in a pre-targeting context as a theranostic. Accordingly, the compounds of the present technology are useful for pretargeted radioimmunotherapy methods.

Example 6: $^{18}$F-PET Imaging of GD2-Positive Subcutaneous Tumor Using [$^{18}$F]Cy3D[$^{175}$Lu] ([$^{175}$Lu][F]-Compound 6)

Figure 18:
FIG. 18 shows the $^{18}$F-PET imaging of GD2-positive subcutaneous tumor using [$^{18F}$]Cy3D[$^{175}$Lu] ([$^{175}$Lu][$^{18}$F]-Compound 6), according to the working examples.
Figure 19:
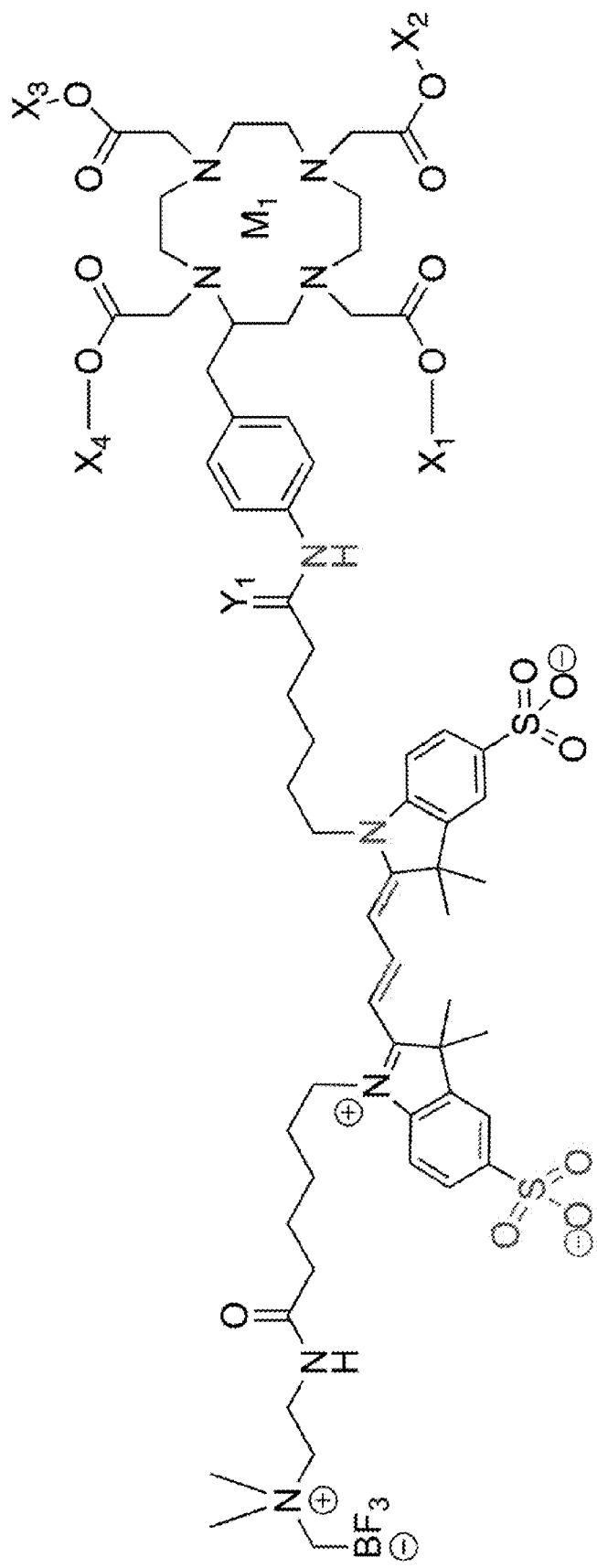
FIG. 19 provides an exemplary embodiment of the multimodal fluorine-Cy3-DOTA-hapten of the present technology.

A pilot PET study using ([$^{175}$Lu][$^{18}$F]-Compound 6) was carried out. For that purpose, a mouse bearing a subcutaneous GD2-expressing tumor (IMR32Luc) was pretreated (24 hours pre PET) with an anti-GD2/anti-DOTA BsAb and followed with DOTA-dendrimer clearing agent (glycodendrimer-based CA α-thio-N-acetylgalactosamine-16-DOTA-Y$^3$; see WO2020014386) (4 hours before PET) and [$^{175}$Lu][$^{18}$F]-Compound 6. After 2 hours the image was collected by a PET scan. As shown in FIG. 18, [$^{175}$Lu][$^{18}$F]-Compound 6 specifically targeted to the BsAb-treated tumor. This shows that as a PET reagent, the probe specifically targeted the BsAb-treated tumor effectively. Moreover, the small size of [¹⁷⁵Lu][¹⁸F]-Compound 6 reduced background activity dramatically in a short amount of time.

These data demonstrate that the probes of present disclosure, including [¹⁷⁷Lu]-Compound 6, are useful as PET reagents. Accordingly, the compounds of the present technology are useful for diagnostic imaging methods.

Example 7: Ex Vivo Biodistribution of [F]CyD [¹⁷⁷Lu] ([¹⁷⁷Lu]-Compound 6) Using 3-Step PRIT For ¹⁸F theranostics, a single molecular multimodal radiohapten precursor AMB[F]3-Cy-Benzyl-DOTA[metal] was synthesized, where metal=Lu or Y (a.k.a., [F]CyD). [¹⁸F]CyD was prepared via ¹⁹F-¹⁸F isotopic exchange procedure of [F]CyD (n=8; 83±9 nmol, range: 78-101 nmol) in the presence of no-carrier-added [¹⁸F]fluoride anion (1332±407 MBq (36±11 mCi), range: 703-2072 MBq (19-56 mCi)), followed with C-18 cartridge purification, addition of excess non-radioactive ¹⁷⁵Lu to form DOTA[¹⁷⁵Lu] complex (time of synthesis: 63±6 min, range: 55-70 min; decay-uncorrected radiochemical yield (RCY): 20±6%, range: 4.3-31.2%; AM=5.55±2.59 MBq (0.15±0.07) mCi/nmol, range: 2.997-10.101 MBq (0.081-0.273 mCi)/nmol)). Radiochemical purity (RCP) was evaluated by radio-reverse-phase (RP)-HPLC and was typically >90%.

In vivo pretargeting of [¹⁸F]CyD for PET imaging of human colorectal cancer xenograft (SW1222 human carcinoma cell line). Athymic nude mice bearing the GPA33-expressing human colorectal cancer SW1222 subcutaneous xenograft were used as a model for anti-GPA33 DOTA-PRIT. The groups were intravenously (i.v.) injected with BsAb huA33-C825 (250 µg, 1.19 nmol), followed 24 h later with i.v. injection of dendron CA (25 pg, 2.76 nmol; (glycodendrimer-based CA α-thio-N-acetylgalactosamine-16-DOTA-Y³; see WO2020014386)) and after an additional 4 h, i.v. injection of [¹⁸F]CyD (1.295 MBq (35 µCi), 0.23 nmol). Non-invasive PET/CT imaging was performed using a preclinical Inveon PET/CT system at ~1 h post-injection (p.i.) of [¹⁸F]CyD (see FIG. 23), followed with ex vivo biodistribution assay of radioactivity.

Figure 22:
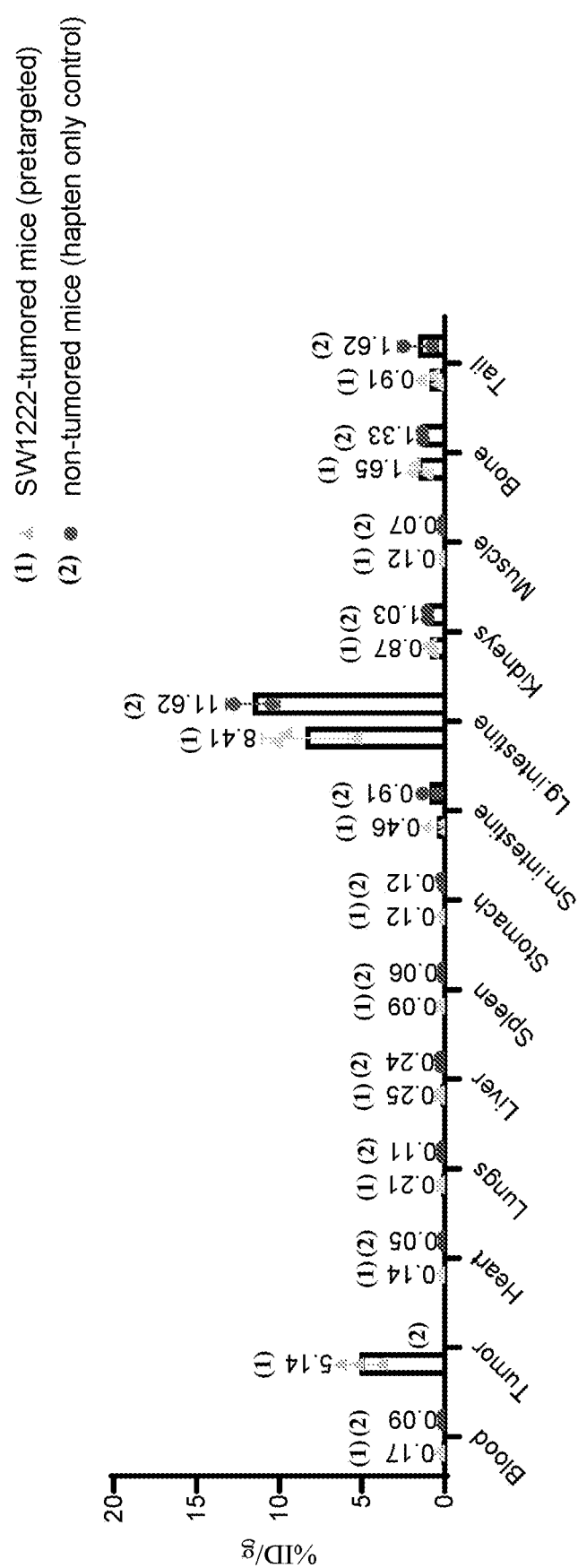
FIG. 22 shows an ex vivo biodistribution assay performed 2 h p.i. of either: anti-GPA33 pretargeted [$^{18}$F]CyD (n=3; SW1222-tumor bearing mice) or [$^{18}$F]CyD alone (n=2; non-tumor bearing mice). Annotations are average values.
Figure 23:
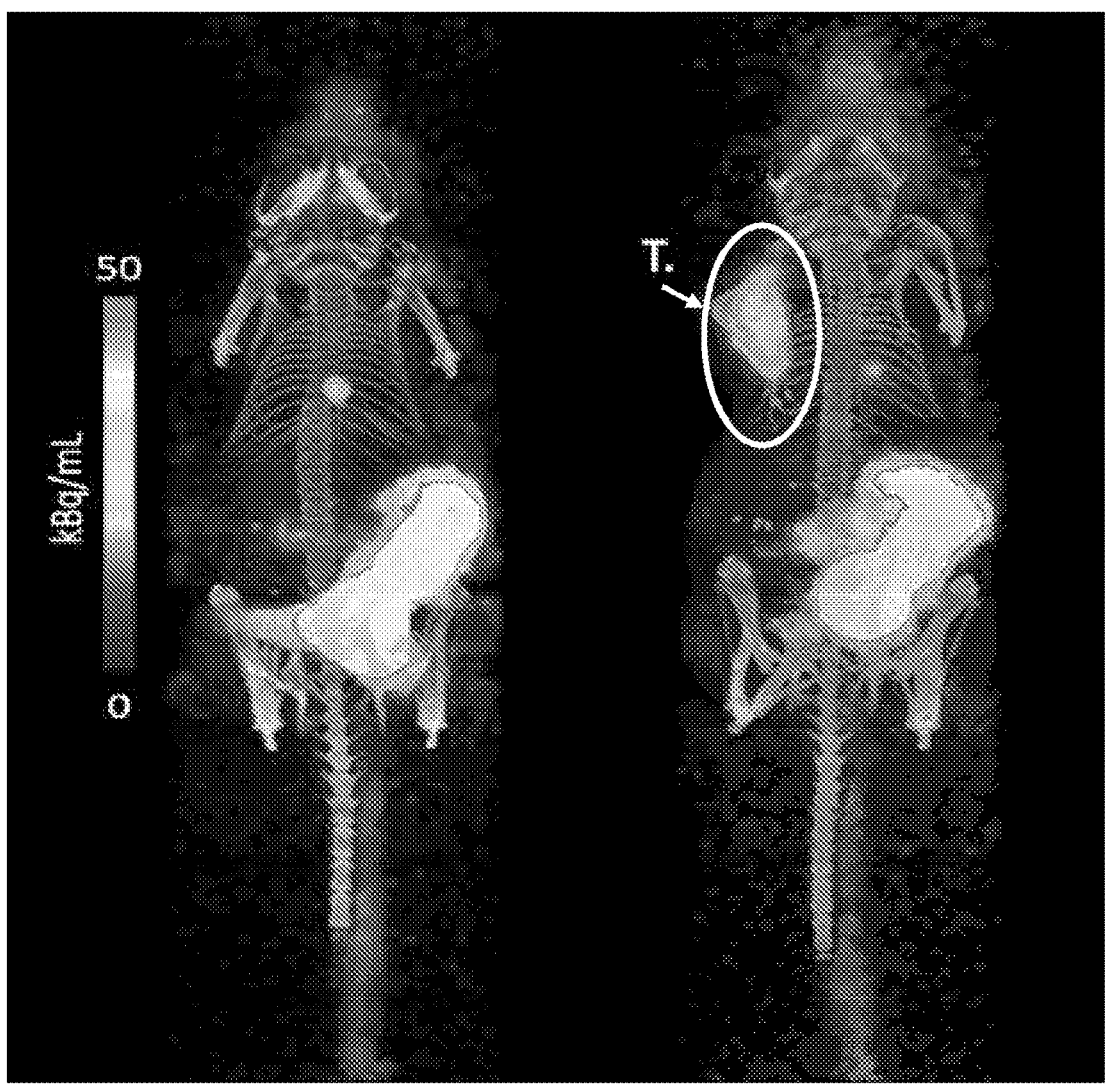
FIG. 23 shows exemplary maximum intensity projection images of a non-tumor bearing mouse (left) and a mouse bearing the GPA33-expressing human colorectal cancer SW1222 subcutaneous xenograft, imaged approximately 1 h after pretargeting (tumored-mice only) and i.v. injection of [$^{18}$F]CyD (1.295 MBq (35 µCi), 0.23 nmol) (right). High activity is present in the tumor (T.)

FIG. 23 demonstrates that high activity is present in the tumor (T) approximately 1 h after i.v. injection of [¹⁸F]CyD (1.295 MBq (35 µCi), 0.23 nmol) in pretargeted tumor-bearing mice (right). For pretargeted [¹⁸F]CyD (n=3) in mice, the blood, tumor, and kidney uptakes at 2 h p.i. were 0.17±0.12% ID/g, 5.14±1.24% ID/g, and 0.87±0.11% ID/g, respectively, corresponding to T:NT of 31±13 and 6±1 for blood and kidney, respectively. See FIG. 22. Notably, relatively high uptake of [¹⁸F]CyD tracer was observed for the large intestine (8.41±2.62% ID/g) and bone (1.65±0.48% ID/g) (FIG. 22), suggesting hepatobiliary probe clearance and probe defluorination in vivo, respectively.

These data demonstrate that the probes of present disclosure, including [¹⁷⁷Lu]-Compound 6, can be effectively used in a pre-targeting context as a theranostic. Accordingly, the compounds of the present technology are useful for pretargeted radioimmunotherapy methods.

EQUIVALENTS

The present technology is not to be limited in terms of the particular embodiments described in this application, which are intended as single illustrations of individual aspects of the present technology. Many modifications and variations of this present technology can be made without departing from its spirit and scope, as will be apparent to those skilled in the art. Functionally equivalent methods and apparatuses within the scope of the present technology, in addition to those enumerated herein, will be apparent to those skilled in the art from the foregoing descriptions. Such modifications and variations are intended to fall within the scope of the present technology. It is to be understood that this present technology is not limited to particular methods, reagents, compounds compositions or biological systems, which can, of course, vary. It is also to be understood that the terminology used herein is for the purpose of describing particular embodiments only, and is not intended to be limiting.

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, particularly in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like, include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

All patents, patent applications, provisional applications, and publications referred to or cited herein are incorporated by reference in their entirety, including all figures and tables, to the extent they are not inconsistent with the explicit teachings of this specification.

The invention claimed is:
1. A compound of Formula I

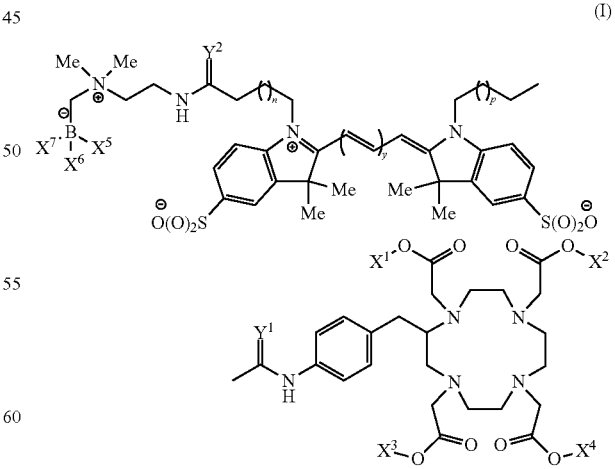

or a pharmaceutically acceptable salt thereof, wherein
$X^1$, $X^2$, $X^3$, and $X^4$ are each independently a lone pair of electrons (i.e. providing an oxygen anion);
$X^5$, $X^6$, and $X^7$ are each independently ¹⁸F or ¹⁹F;

$Y^1$ and $Y^2$ are each independently O or S;
n is 1, 2, 3, 4, 5, 6, 7, 8, 9, or 10;
p is 1, 2, 3, 4, 5, 6, 7, 8, 9, or 10; and
y is 1, 2, or 3.

2. The compound of claim 1, wherein the compound of Formula I is a compound according to Formula IA

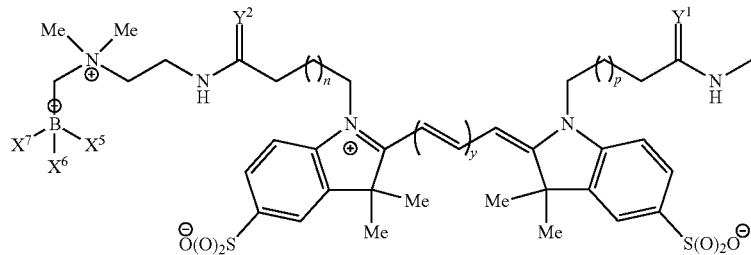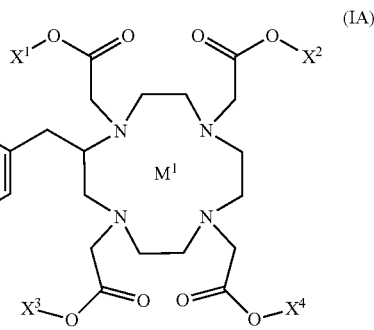

(IA)

or a pharmaceutically acceptable salt thereof, wherein $M^1$ is $^{175}Lu^{3+}$, $^{77}Lu^{3+}$, $^{63}Tm^{3+}$, $^{165}Tm^{3+}$, $^{166}Tm^{3+}$, $^{168}Tm^{3+}$, $^{169}Tm^{3+}$, $^{170}Tm^{3+}$, $^{171}Tm^{3+}$, $^{172}Tm^{3+}$, $^{173}Tm^{3+}$, $^{165}Ho^{3+}$, $^{166}Ho^{3+}$, $^{167}Ho^{3+}$, $^{169}Er^{3+}$, $^{171}Er^{3+}$, $^{172}Er^{3+}$, $^{157}Dy^{3+}$, $^{155}Dy^{3+}$, $^{152}Dy^{3+}$, $^{153}Dy^{3+}$, $^{165}Dy^{3+}$, $^{166}Dy^{3+}$, $^{162}Dy^{3+}$, $^{163}Dy^{3+}$, $^{141}Pr^{3+}$, $^{142}Pr^{3+}$, $^{143}Pr^{3+}$, $^{145}Pr^{3+}$, $^{64}Cu^{2+}$, $^{67}Cu^{3+}$, $^{45}Sc^{3+}$, $^{69}Ga^{3+}$, $^{71}Ga^{3+}$, $^{86}Y^{3+}$, $^{89}Y^{3+}$, $^{90}Y^{3+}$, $^{113}In^{3+}$, $^{115}In^{3+}$, $^{139}La^{3+}$, $^{136}Ce^{3+}$, $^{138}Ce^{3+}$, $^{140}Ce^{3+}$, $^{142}Ce^{3+}$, $^{151}Eu^{3+}$, $^{153}Eu^{3+}$, $^{159}Tb^{3+}$, $^{154}Gd^{3+}$, $^{155}Gd^{3+}$, $^{156}Gd^{3+}$, $^{157}Gd^{3+}$, $^{158}Gd^{3+}$, or $^{160}Gd^{3+}$; or wherein the compound of Formula I is a compound according to Formula IB or Formula IC

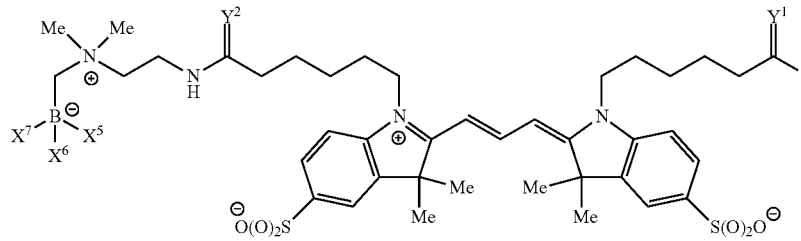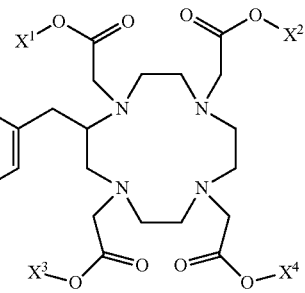

(IB)

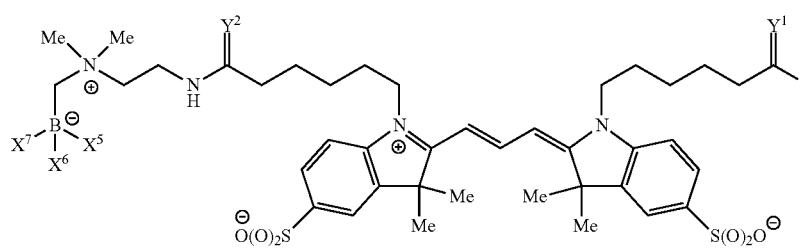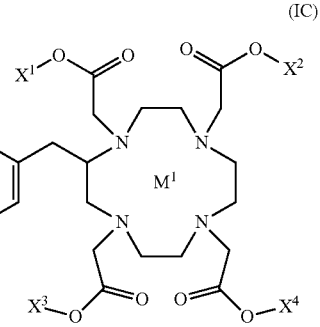

(IC)

or a pharmaceutically acceptable salt thereof.

3. The compound of claim 2, wherein $Y^1$ and $Y^2$ each independently are O; or
wherein $M^1$ is $175Lu^{3+}$ or $^{177}Lu^{3+}$.

4. A complex comprising the compound of claim 1 and a multispecific antibody or antigen binding fragment thereof that recognizes and binds to the compound and an antigen target; or
wherein the multispecific antibody or antigen binding fragment binds to the compound with a $K_d$ that is less than or equal to 100 nM-95 nM, 95-90 nM, 90-85 nM, 85-80 nM, 80-75 nM, 75-70 nM, 70-65 nM, 65-60 nM, 60-55 nM, 55-50 nM, 50-45 nM, 45-40 nM, 40-35 nM, 35-30 nM, 30-25 nM, 25-20 nM, 20-15 nM, 15-10 nM, 10-5 nM, 5-1 nM, 1 nM-950 pM, 950 pM-900 pM, 900 pM-850 pM, 850 pM-800 pM, 800 pM-750 pM, 750 pM-700 pM, 700 pM-650 pM, 650 pM-600 pM, 600 pM-550 pM, 550 pM-500 pM, 500 pM-450 pM, 450 pM-400 pM, 400 pM-350 pM, 350 pM-300 pM, 300 pM-250 pM, 250 pM-200 pM, 200 pM-150 pM, 150 pM-100 pM, 100 pM-50 pM, 50 pM-40 pM, 40 pM-30 pM, 30 pM-20 pM, 20 pM-10 pM, 9 pM, 8 pM, 7 pM, 6 pM, 5 pM, 4 pM, 3 pM, 2.5 pM, 2 pM, 1.5 pM, or 1 pM.

5. The complex of claim 4, wherein the antigen target is a tumor associated antigen, an immune cell antigen, a neuronal tissue antigen, a cardiac tissue antigen, a vascular tissue antigen, a fungal antigen, a bacterial antigen, or a viral antigen, optionally wherein
the immune cell antigen is selected from the group consisting of CD2, CD3, CD4, CD8, CD14, CD15, CD16, CD19, CD20, CD24, CD25, CD32, CD56, CD64, CD123, TCR gamma/delta, NKp46, KIR, PD-1, PD-L1, and HLA-DR; or
the neuronal tissue antigen is a N-methyl-d-aspartate (NMDA) receptor, an α-amino-3-hydroxy-5-methyl-4-isoxazolepropionic acid (AMPA) receptors, a γ-aminobutyric acid (GABA) receptor, leucine-rich glioma-inactivated protein 1, contactin-associated protein-like 2, a metabotropic glutamate receptor, a glycine receptor, Amyloid beta, a Neurofibrillary tangle, EGFR, EGFRvIII, B7H3, myelin-associated glycoprotein, CD56, and a P/Q-type voltage-gated calcium channel; or
the fungal antigen is *Aspergillus fumigatus*, *Aspergillus restrictus* Restrictocin, *Aspergillus giganteus* Alpha-Sarcin, *Aspergillus niger* Glucose oxidase, Pectolyase Y-23, HSP104, GLC8, thioredoxin reductase, TRX1, TRX2, glutathione reductase, ATP-sulfurylase/MET3, *S. cerevisiae* SUMO E1, ubiquitin, Aha1, alcohol dehydrogenase, Glutaredoxin 1, or *S. cerevisiae* Histone H2A; or
the viral antigen is present in a virus selected from the group consisting of Adenovirus, Astrovirus, Cytomegalovirus, Feline Immunodeficiency Virus (FIV), Human Cytomegalovirus, Coronavirus, Coxsackie Virus, Dengue Virus, Epstein-Barr Virus, Enterovirus 71 Virus, Ebola Virus, Hantavirus, Hepatitis A Virus, Hepatitis B Virus, Hepatitis C Virus, Hepatitis D Virus, Hepatitis E Virus, Human Immunodeficiency Virus (HIV), Human Metapneumovirus, Human Papillomvirus, Human Rhinovirus, Human herpesvirus-8, Herpes Simplex Virus, Human T-lymphotropic Virus, Influenza Virus, Japanese Encephalitis Virus, Leukemia Virus, Measles Virus, Mumps Virus, Parvovirus, Rabies Virus, Respiratory Syncytial Virus, Rubella Virus, Rotavirus, Tick-Borne Encephalitis Virus, Varicella Zoster Virus, West Nile virus, and Zika virus; or
the bacterial antigen is present in bacteria selected from the group consisting of *Bacillus*, *Borrelia*, *Bordetella pertussis*, *Campylobacter jejuni*, *Chlamydophila pneumonia*, *Chlamydia trachomatis*, *Clostridium*, *Corynebacterium diphterie*, *Escherichia coli*, *Haemophilus influenzae*, *Helicobacter pylori*, *Legionella Pneumophila*, *Listeria monocytogenes*, *Mycobacterium*, *Pseudomonas aeruginosa*, *Salmonella*, *Staphylococcus*, *Streptococcus pneumonia*, *Treponema pallidum*, *Yersinia Enterocolitica*, *Klebsiella pneumonia*, *Neisseria gonorrhoeae*, and *Mycoplasma pneumonia*, or
the cardiac tissue antigen is selected from the group consisting of Oxidized low-density lipoprotein, Cardiac troponin, Creatinine kinase, and CK-MB Myoglobin; or
the vascular tissue antigen is selected from the group consisting of C-reactive protein, Interleukin-6, Cellular adhesion molecules, Beta2-microglobulin, Monocyte chemoattractant protein-1, Soluble CD40 ligand, Myeloperoxidase, Neopterin, Osteoprotegerin, Tumor necrosis factor-alpha, Fibrinogen, D-dimer, von Willebrand factor, Tissue plasminogen activator, Plasminogen activator inhibitor, Lipoprotein-associated phospholipase A2, Lipoprotein (a), Glutathione peroxidase 1, 8-iso-prostaglandin F2a, Vitamin C (L-ascorbic acid), Matrix metalloproteinases and their inhibitors, Pregnancy-associated plasma phosphatase, Vascular endothelial growth factor, Flt-1, Angiopoietin, Tie-1, Homocysteine and asymmetric dimethylarginine; or
the tumor associated antigen is selected from the group consisting of Poly-sialic acid, GD3, STEAP1, GPA33, HER2/neu, GD2, MAGE-1, MAGE-3, BAGE, GAGE-1, GAGE-2, MUM-1, CDK4, N-acetylglucosaminyl-transferase, p15, gp75, beta-catenin, ErbB2, cancer antigen 125 (CA-125), carcinoembryonic antigen (CEA), RAGE, MART (melanoma antigen), MUC-1, MUC-2, MUC-3, MUC-4, MUC-5ac, MUC-16, MUC-17, tyrosinase, Pmel 17 (gp100), GnT-V intron V sequence (N-acetylglucoaminyltransferase V intron V sequence), Prostate cancer psm, PRAME (melanoma antigen), β-catenin, EBNA (Epstein-Barr Virus nuclear antigen) 1-6, p53, lung resistance protein (LRP) Bcl-2, prostate specific antigen (PSA), Ki-67, CEACAM6, colon-specific antigen-p (CSAp), HLA-DR, CD40, CD74, CD138, EGFR, EGFRvIII, EGP-1, EGP-2, VEGF, PlGF, insulin-like growth factor (ILGF), tenascin, platelet-derived growth factor, IL-6, CD20, CD19, PSMA, CD33, CD123, MET, DLL3, DLL4, CD24, Ang-2, HER3, IGF-1R, CD30, TAG-72, SPEAP, CD45, L1-CAM, Lewis Y (Ley) antigen, E-cadherin, V-cadherin, and EpCAM.

6. A method for detecting solid tumors or determining surgical tissue margins in a subject in need thereof comprising
(a) administering an effective amount of the complex of claim 5 to the subject, wherein the antigen target is a tumor associated antigen and wherein the complex localizes to a solid tumor expressing the tumor associated antigen recognized by the multispecific antibody or antigen binding fragment of the complex; and
(b) detecting the presence of solid tumors or determining surgical tissue margins in the subject by detecting radioactive levels or fluorescence levels emitted by the complex that are higher than a reference value, optionally wherein the method further comprises determining the location and/or stage of the solid tumors.

7. A method for detecting brain disease in a subject in need thereof comprising
   (a) administering an effective amount of the complex of claim 5 to the subject, wherein the antigen target is a neuronal tissue antigen and wherein the complex localizes to a brain region expressing the neuronal tissue antigen recognized by the multispecific antibody or antigen binding fragment of the complex; and
   (b) detecting the presence of brain disease in the subject by detecting radioactive levels or fluorescence levels emitted by the complex that are higher than a reference value, optionally wherein the brain disease is selected from the group consisting of Alzheimer's disease, brain cancer or metastases, Parkinson's disease, depression, anxiety, encephalopathy, dementia, and stroke.

8. A method for detecting cardiovascular disease in a subject in need thereof comprising
   (a) administering an effective amount of the complex of claim 5 to the subject, wherein the antigen target is a cardiac tissue antigen and wherein the complex localizes to cardiac tissue expressing the cardiac tissue antigen recognized by the multispecific antibody or antigen binding fragment of the complex; and
   (b) detecting the presence of cardiovascular disease in the subject by detecting radioactive levels or fluorescence levels emitted by the complex that are higher than a reference value, optionally wherein the cardiovascular disease is arteriosclerosis or atherosclerosis.

9. A method for selecting a subject for pretargeted radioimmunotherapy comprising
   (a) administering an effective amount of the complex of claim 5 to the subject, wherein the antigen target is a tumor associated antigen and wherein the complex localizes to a solid tumor expressing the tumor associated antigen recognized by the multispecific antibody or antigen binding fragment of the complex;
   (b) detecting radioactive levels or fluorescence levels emitted by the complex; and
   (c) selecting the subject for pretargeted radioimmunotherapy when the radioactive levels or fluorescence levels emitted by the complex are higher than a reference value.

10. The method of claim 6, wherein the subject is diagnosed with, or is suspected of having cancer, optionally wherein the cancer is selected from the group consisting of breast cancer, colorectal cancer, cervical cancer, ovarian cancer, liver cancer, bladder cancer, hepatoma, hepatocellular carcinoma, brain cancer, pituitary adenoma, meningioma, neuroblastoma, craniopharyngioma, lung cancer, gastric or stomach cancer, pancreatic cancer, thyroid cancer, kidney or renal cancer, prostate cancer, melanoma, sarcomas, carcinomas, Wilms tumor, endometrial cancer, glioblastoma, squamous cell cancer, astrocytomas, salivary gland carcinoma, vulvar cancer, penile carcinoma, and head-and-neck cancer.

11. The method of claim 6, wherein the complex is administered intravenously, intramuscularly, intraarterially, intrathecally, intracapsularly, intraorbitally, intradermally, intraperitoneally, transtracheally, subcutaneously, intracerebroventricularly, orally or intranasally; and
   wherein the radioactive levels emitted by the complex are detected using positron emission tomography or single photon emission computed tomography; or
   wherein the fluorescence levels emitted by the complex are detected using fluorescent imaging; or
   wherein the radioactive levels or fluorescence levels emitted by the complex are detected between 4 hours to 6 months after the complex is administered; or
   wherein the radioactive levels emitted by the complex are expressed as the percentage injected dose per gram tissue ("% ID/g); or
   wherein the ratio of radioactive levels or fluorescence levels between a tumor and normal tissue is about 2:1, 3:1, 4:1, 5:1, 6:1, 7:1, 8:1, 9:1, 10:1, 15:1, 20:1, 25:1, 30:1, 35:1, 40:1, 45:1, 50:1, 55:1, 60:1, 65:1, 70:1, 75:1, 80:1, 85:1, 90:1, 95:1 or 100:1.

12. A method for treating cancer in a subject in need thereof or increasing tumor sensitivity to radiation therapy in a subject diagnosed with cancer comprising
   (a) administering an effective amount of an anti-DOTA or anti-cyanine multispecific antibody or antigen binding fragment thereof to the subject, wherein the anti-DOTA or anti-cyanine multispecific antibody or antigen binding fragment is configured to localize to a tumor expressing a tumor associated antigen; and
   (b) administering an effective amount of the compound of claim 2 to the subject, wherein the compound is configured to bind to the anti-DOTA or anti-cyanine multispecific antibody or antigen binding fragment.

13. The method of claim 12, further comprising administering an effective amount of a clearing agent to the subject prior to administration of the compound, optionally wherein the clearing agent is a 500 kD aminodextran-DOTA conjugate, a glycodendrimer-based clearing agent, α-thio-N-acetylgalactosamine-16-DOTA-$Y^{3+}$, galactose-albumin-DOTA-$Y^{3+}$, or a polystyrene bead coated with DOTA-$Y^{3+}$-conjugated albumin.

14. The method of claim 12, wherein the anti-DOTA or anti-cyanine multispecific antibody or antigen binding fragment is administered intravenously, intramuscularly, intraarterially, intrathecally, intracapsularly, intraorbitally, intradermally, intraperitoneally, transtracheally, subcutaneously, intracerebroventricularly, orally or intranasally; or
   wherein the compound is administered intravenously, intramuscularly, intraarterially, intrathecally, intracapsularly, intraorbitally, intradermally, intraperitoneally, transtracheally, subcutaneously, intracerebroventricularly, orally or intranasally.

15. A method for treating cancer in a subject in need thereof or increasing tumor sensitivity to radiation therapy in a subject diagnosed with cancer comprising
   administering an effective amount of the complex of claim 5 to the subject, wherein the antigen target is a tumor associated antigen and wherein the complex localizes to the tumor expressing the tumor associated antigen recognized by the multispecific antibody or antigen binding fragment of the complex, optionally wherein the complex is administered intravenously, intramuscularly, intraarterially, intrathecally, intracapsularly, intraorbitally, intradermally, intraperitoneally, transtracheally, subcutaneously, intracerebroventricularly, orally or intranasally.

16. The method of claim 12, further comprising administering an effective amount of a clearing agent to the subject prior to administration of the compound or sequentially, separately, or simultaneously administering to the subject at least one additional therapeutic agent.

17. A kit comprising a compound of claim 1 and instructions for use.

18. The kit of claim 17, further comprising at least one anti-DOTA or anti-cyanine multispecific antibody or antigen binding fragment thereof, a clearing agent and/or one or more radionuclides.

19. A method for determining the efficacy of an anticancer therapy in a subject in need thereof comprising:
   (a) administering the complex of claim 5 to the subject at a first time point after the subject has received the anticancer therapy, wherein the antigen target is a tumor associated antigen and wherein the complex localizes to a solid tumor expressing the tumor associated antigen recognized by the multispecific antibody or antigen binding fragment of the complex;
   (b) detecting radioactive levels or fluorescence levels emitted by the complex at the first time point;
   (c) administering the complex to the subject at a second time point following step (b); and
   (d) detecting radioactive levels or fluorescence levels emitted by the complex at the second time point, wherein the anticancer therapy is effective when the radioactive levels or fluorescence levels emitted by the complex at the second time point are reduced compared to the first time point.

20. A method for monitoring cancer progression in a subject in need thereof comprising:
   (a) administering the complex of claim 5 to the subject at a first time point, wherein the antigen target is a tumor associated antigen and wherein the complex localizes to a solid tumor expressing the tumor associated antigen recognized by the multispecific antibody or antigen binding fragment of the complex;
   (b) detecting radioactive levels or fluorescence levels emitted by the complex at the first time point;
   (c) administering the complex to the subject at a second time point following step (b); and
   (d) detecting radioactive levels or fluorescence levels emitted by the complex at the second time point, wherein the cancer has metastasized or progressed when the radioactive levels or fluorescence levels emitted by the complex at the second time point are elevated compared to the first time point.

* * * * *